US006957191B1

(12) United States Patent
Belcsak et al.

(10) Patent No.: US 6,957,191 B1
(45) Date of Patent: Oct. 18, 2005

(54) AUTOMATED FINANCIAL SCENARIO MODELING AND ANALYSIS TOOL HAVING AN INTELLIGENT GRAPHICAL USER INTERFACE

(75) Inventors: Ladislav V. Belcsak, San Francisco, CA (US); Luke Lee, Fairfield, CA (US); David J. Collop, Oakland, CA (US); Mark R Bewsher, Tilburon, CA (US); Thadeus H Niemira, San Bruno, CA (US); Dennis D. Moritz, San Rafael, CA (US); Stephen G. Cohn, Orinda, CA (US)

(73) Assignee: Babcock & Brown LP, San Francisco, CA (US)

( * ) Notice: Subject to any disclaimer, the term of this patent is extended or adjusted under 35 U.S.C. 154(b) by 0 days.

(21) Appl. No.: 09/530,040

(22) PCT Filed: Feb. 3, 2000

(86) PCT No.: PCT/US00/02776

§ 371 (c)(1),
(2), (4) Date: Sep. 14, 2000

(87) PCT Pub. No.: WO00/46717

PCT Pub. Date: Aug. 10, 2000

Related U.S. Application Data
(60) Provisional application No. 60/118,743, filed on Feb. 5, 1999.

(51) Int. Cl.$^7$ .............................................. G06F 17/60
(52) U.S. Cl. ........................... 705/38; 705/39; 715/700
(58) Field of Search ............................. 705/36, 37, 38, 705/42, 35, 5; 715/700, 531

(56) References Cited

U.S. PATENT DOCUMENTS 5,233,514 A   8/1993   Ayyoubi et al.

(Continued)

FOREIGN PATENT DOCUMENTS

WO      WO 97/38383      10/1997

(Continued)

OTHER PUBLICATIONS $21^{st}$ Century; Money, Banking and Commerce; Thomas P. Vartanian; Fried, Frank, Harris, Shriver & Jacobson; 1998; p. 13.*

*Primary Examiner*—Robert P. Olszewski
*Assistant Examiner*—Elaine Gort
(74) *Attorney, Agent, or Firm*—Nixon and Vanderhye P.C.

(57) ABSTRACT

A financial scenario modeling and analysis tool, including a graphical user interface which enables a user of the tool to create a graphical model of a financial scenario, generally including at least one financial transaction, on a display screen, and an engine operable, in response to creation of the graphical model, to automatically generate information, such as financial or mathematical information, which at least partially models at leat a part of the financial scenario using information collected by the engine during creation of the graphical model. The graphical user interface enables the user to create party graphics respectively representing parties to the financial deal, and to generate financial instrument graphics representing financial instruments, wherein each financial instrument graphic connects two of the party graphics. The engine generates, in response to the creation of a graphical model, an instrument information, such as an object or template, for each of the instruments in the graphical model. The tool includes a natural date language and a formula language for use in modeling a scenario. The tool enables optimization of optimizable parameters defined in the scenario, and includes a user-friendly, book-like and CAD-like user interface.

18 Claims, 22 Drawing Sheets

U.S. PATENT DOCUMENTS

| | | | |
|---|---|---|---|
| 5,383,113 A | | 1/1995 | Kight et al. |
| 5,572,644 A | | 11/1996 | Liaw et al. |
| 5,839,118 A | | 11/1998 | Ryan et al. |
| 5,852,811 A | * | 12/1998 | Atkins .................. 705/36 |
| 5,918,217 A | | 6/1999 | Maggioncalda et al. |
| 5,999,918 A | * | 12/1999 | Williams et al. ............ 705/36 |

FOREIGN PATENT DOCUMENTS

| | | |
|---|---|---|
| WO | WO 99/30261 | 6/1999 |
| WO | WO 00/13101 | 3/2000 |
| WO | WO 00/39736 | 7/2000 |

\* cited by examiner

*Fig. 21*

Nov 21, 1999        BABCOCK & BROWN INC.        9:17 PM
Confidential Analysis
Lessee Benefit Present Value

| | |
|---|---|
| Available Cash Present Value | 260,632.96 |
| Less Deposit = | 200,634.07 |
| Lessee Benefit Present Value | 59,998.89 |
| on | 30 Dec, 1998 |
| Discounted at | 5.0000% per year |

| Date | Deposit | Cash To Delease | Interest | Principal | Balance |
|---|---|---|---|---|---|
| 30 Dec, 1998 | 200,634.07 | 0.00 | 0.00 | 0.00 | 200,634.07 |
| 02 Jan, 1999 | | 0.00 | 55.73 | (55.73) | 200,689.81 |
| 02 Jan, 2000 | | 0.00 | 10,034.49 | (10,034.49) | 210,724.30 |
| 02 Jan, 2001 | | 0.00 | 10,536.21 | (10,536.21) | 221,260.51 |
| 02 Jan, 2002 | | 0.00 | 11,063.03 | (11,063.03) | 232,323.54 |
| 02 Jan, 2003 | | 0.00 | 11,616.18 | (11,616.18) | 243,939.71 |
| 02 Jan, 2004 | | 0.00 | 12,196.99 | (12,196.99) | 256,136.70 |
| 02 Jan, 2005 | | 0.00 | 12,806.83 | (12,806.83) | 268,943.53 |

*Fig. 22*

| | Total | 31-Dec-1998 | 31-Dec-1999 | 31-Dec-2000 | 31-Dec-20 |
|---|---|---|---|---|---|
| AfterTaxCash | | | | | |
|   PreTaxCash | | | | | |
|     Inflows | | | | | |
|       RentReceived | 1,247,056 | 0 | 390 | 70,147 | 70,˙ |
|       ResidualReceived | 200,000 | | | | |
|     Σ SubTotal: Inflows | 1,447,056 | 0 | 390 | 70,147 | 70,˙ |
|     Outflows | | | | | |
|       DebtServicePaid | | | | | |
|         InterestPaid | (308,979) | | (208) | (37,421) | (35.7 |
|         PrincipalPaid | (739,367) | 0 | (182) | (32,726) | (34.3 |
|       Σ SubTotal: DebtSer | (1,048,346) | 0 | (390) | (70,147) | (70.1 |
|     Σ SubTotal: Outflows | (1,048,346) | 0 | (390) | (70,147) | (70.1 |
|     Investment | | | | | |
|       SourcesOfFunds | | | | | |
|         Borrowings | 739,367 | 739,367 | | | |
|       Σ SubTotal: Sources | 739,367 | 739,367 | | | |
|       UsesOfFunds | | | | | |
|         AssetsPurchased | (1,000,000) | (1,000,000) | | | |
|         InitialFeesPaid | (15,000) | (15,000) | | | |
|       Σ SubTotal: UsesOff | (1,015,000) | (1,015,000) | | | |
|     Σ SubTotal: Investment | (275,633) | (275,633) | | | |
|   Σ SubTotal: PreTaxCash | 123,077 | (275,633) | 0 | 0 | |
|   Taxes | (43,077) | 24,566 | 72,874 | 72,296 | 71.5 |
| Σ SubTotal: AfterTaxCash | 80,000 | (251,067) | 72,874 | 72,296 | 71.5 |

*Fig. 23*

|   | 30 Nov 1999 | 30 Nov 2000 | 30 Nov 2001 |   |   |   |
|---|---|---|---|---|---|---|

SampleSheet_2
- Aircraft
  - Plane1
    - RentDates → 30 Nov 1999  30 Nov 2000  30 Nov 2001
    - Rents   ♦   100   100   100
  - Plane2
    - RentDates → 01 Jan 1999  01 Jan 2000  01 Jan 2001
    - Rents   •   50   75   100
- Totals
  - TotalDates → 01 Jan 1999  30 Nov 1999  01 Jan 2000  30 Nov 2000  01 Jan 2001  30 Nov 2001
  - TotalRents  •   50   100   75   100   100   100
- AnnualTotals
  - AnnualDates → 30 Nov 1999  30 Nov 2000  30 Nov 2001  30 Nov 2002  30 Nov 2003
  - AnnualRents  •   100   175   200

*Fig. 24*

SampleSheet_2
- Aircraft
  - Plane1
    - RentDates → = starting today annual for 3
    - Rents   •   =100
  - Plane2
    - RentDates → = starting 01 Jan 1999 annual for 3
    - Rents   •   = 50;75;100 thereafter
- Totals
  - TotalDates → = union(Plane1.RentDates,Plane2.RentDates)
  - TotalRents  •   = subtotal(Aircraft,,Rents)
- AnnualTotals
  - AnnualDates → = starting today annual for 5
  - AnnualRents  •   = TotalRents

*Fig. 25*

Simple Loan Example

Simple Loan - Values

| Inputs | | | | | | | |
|---|---|---|---|---|---|---|---|
| Scalars | | | | | | | |
| Cost | | 1,000,000.00 | | | | | |
| Calendar | | Actual_365 | | | | | |
| RateSchedule | | | | | | | |
| RateDates | → | 01 Jan, 2000 | 01 Jan, 2001 | 01 Jan, 2002 | 01 Jan, 2003 | 01 Jan, 2004 | 01 Jan, 2005 ... |
| Rate | ▬ | 8.2500% | 8.2500% | 8.5000% | 8.5000% | 8.7500% | 8.7500% ... |
| Payments | | | | | | | |
| PaymentDates | → | 01 Jan, 2000 | 01 Jul, 2000 | 01 Jan, 2001 | 01 Jul, 2001 | 01 Jan, 2002 | 01 Jul, 2002 ... |
| InputAmounts | ○ | 0.00 | 90,909.09 | 90,909.09 | 90,909.09 | 90,909.09 | 90,909.09 ... |
| Amortization | | | | | | | |
| AmortDates | → | 01 Jan, 2000 | 01 Jul, 2000 | 01 Jan, 2001 | 01 Jul, 2001 | 01 Jan, 2002 | 01 Jul, 2002 ... |
| Principal | ○ | 0.00 | 60,876.43 | 63,078.19 | 66,112.55 | 67,770.57 | 71,004.40 ... |
| Interest | ◄ | | 30,032.66 | 27,830.90 | 24,796.54 | 23,138.52 | 19,904.69 ... |
| DebtService | ○ | 0.00 | 90,909.09 | 90,909.09 | 90,909.09 | 90,909.09 | 90,909.09 ... |
| Balance | ○ | 730,064.69 | 669,188.26 | 606,110.07 | 539,997.53 | 472,226.96 | 401,222.56 ... |
| PVFactor | ○ | 1.00 | 0.96 | 0.92 | 0.89 | 0.85 | 0.82 ... |
| Result | | | | | | | |
| LoanAmount | | 730,064.69 | | | | | |

*Fig. 26*

Simple Loan - Formulas

| Inputs | | |
|---|---|---|
| Scalars | | |
| Cost | | =1000000 |
| Calendar | | =timeline.Calendar |
| RateSchedule | | |
| RateDates | → | =starting first (PaymentDates) annual ending last (PaymentDates) |
| Rate | ▫ | =Table: 8.25% for 2; 8.5% for 2; 8.75% thereafter |
| Payments | | |
| PaymentDates | → | =StartDates: Starting 01 Jan 2000 semiannual for 11 |
| InputAmounts | • | =0; Cost/(COUNT(PaymentDates)) thereafter |
| Amortization | | |
| AmortDates | → | =ActsLike(PaymentDates): PaymentDates |
| Principal | • | =DebtService-Interest |
| Interest | ◂ | =Arrears:previous(Balance)*Rate*periodInterval(-1) |
| DebtService | • | =InputAmounts |
| Balance | • | =Previous(Balance,LoanAmount)-Principal |
| PVFactor | • | = Previous(PVFactor,1)/(1+(Rate*PeriodInterval(-1))) |
| Result | | |
| LoanAmount | | =SUM(PVFactor*DebtService) |

*Fig. 27*

Present Value and IRR Example

PV IRR - Values

| Inputs | | | | | | |
|---|---|---|---|---|---|---|
| Investor | = InvestorParty | | | | | |
| Calendar | = European_30_360 | | | | | |
| CashFlow_Summary | | | | | | |
| ProjectDates | → 01 Mar,1999 | 15 Apr,1999 | 15 Jun,1999 | 15 Sep,1999 | 15 Dec,1999 | 15 Mar,2020 |
| Investor_PTCF | ○ (67,006,051) | | | | | |
| Investor_Taxes | ○ | 2,179,058 | 2,179,058 | 2,179,058 | 2,179,058 | 0 |
| Investor_ATCF | ○ (67,006,051) | 2,179,058 | 2,179,058 | 2,179,058 | 2,179,058 | 0 |
| IRR_Calculation | | | | | | |
| FirstIRRDate | 28 Feb,1999 | | | | | |
| LastIRRDate | 31 Mar, 2020 | | | | | |
| IRRDates | → 28 Feb,1999 | 31 Mar,1999 | 30 Apr,1999 | 31 May,1999 | 30 Jun,1999 | 31 Mar,2020 |
| InvestmentBalance | ○ | (67,006,051) | (65,587,269) | (66,331,447) | (64,905,010) | 18 |
| Earnings | ◁ | 0 | (760,276) | (744,177) | (752,621) | 0 |
| PV_Calculation | | | | | | |
| PVRate_Effective | 10.0000% | | | | | |
| PVRate_Nominal | 9.5690% | | | | | |
| PVDates | → 01 Mar, 1999 | 01 Apr, 1999 | 01 May, 1999 | 01 Jun, 1999 | 01 Jul, 1999 | 01 Jan,2019 |
| PVFactor | ○ 100.0000% | 99.2089% | 98.4240% | 97.6454% | 96.8729% | 15.1024% |
| Base_PTCF | ○ (67,006,051) | | | | | 20,660,833 |
| Discounted_PTCF | ○ (67,006,051) | 0 | 0 | 0 | 0 | 3,120,275 |
| Base_ATCF | ○ (67,006,051) | | 2,179,058 | | 2,179,058 | 17,396,295 |
| Discounted_ATCF | ○ (67,006,051) | 0 | 2,144,717 | 0 | 2,110,917 | 2,627,253 |
| PV_Summary | | | | | | |
| PVofPTCF_UsingFunction | 6,346,148 | | | | | |
| PVofPTCF_UsingSP | 6,346,148 | | | | | |
| PVofATCF_UsingFunctio | 17,740,438 | | | | | |
| PVofATCF_UsingSP | 17,740,438 | | | | | |
| IRR_Summary | | | | | | |
| NominalIRR_UsingSearch | 13.6156% | | | | | |
| NominalIRR_UsingFunction | 13.6156% | | | | | |
| EffectiveIRR | 14.4983% | | | | | |

*Fig. 28*

PV IRR - Formulas

| Inputs | |
|---|---|
| Investor | = InvestorParty |
| Calendar | = European_30_360 |
| CashFlow_Summary | |
| ProjectDates | → = dates(collectpayments(Investor, "AfterTaxCash")) |
| Investor_PTCF | ○ = collectpayments(Investor, "PreTaxCash") |
| Investor_Taxes | ○ = collectpayments(Investor, "Taxes") |
| Investor_ATCF | ○ = collectpayments(Investor, "AfterTaxCash") |
| IRR_Calculation | |
| FirstIRRDate | = MonthEndOf(First(Dates(CollectPayments(Invesotr, "AfterTaxCash")))-1 Month |
| LastIRRDate | = MonthEndOf(Last(Dates(CollectPayments(Invesotr, "AfterTaxCash")))) |
| IRRDates | → = starting FirstIRRDate monthly ending LastIRRDate |
| InvestmentBalance | ○ = Cumulative(Investor_ATCF)+Cumulative(Earnings) |
| Earnings | ◁ = Arrears: Previous(InvestmentBalance*NominalIRR_UsingSearch*periodinterval) |
| PV_Calculation | |
| PVRate_Effective | = NoIndex: 10% |
| PVRate_Nominal | = NoIndex: 12*((1+PVRate_Effective)^(1/(12))-1) |
| PVDates | → = starting Closing monthly ending Completion |
| PVFactor | ○ = 1; previous(PVFactor/(1+PVRate_Nominal*PeriodInverval)) thereafter |
| Base_PTCF | ○ = Investor_PTCF |
| Discounted_PTCF | ○ = PVFactor*Investor_PTCF |
| Base_ATCF | ○ = Investor_ATCF |
| Discounted_ATCF | ○ = PVFactor*Investor_ATCF |
| PV_Summary | |
| PVofPTCF_UsingFunction | = daily_present_value(Base_PTCF,PVRate_Nominal, Closing, Calendar) |
| PVofPTCF_UsingSP | = sum(Discounted_PTCF) |
| PVofATCF_UsingFunction | = Daily_present_value(Base_ATCF,PVRate_Nominal,Closing, Calendar) |
| PVofATCF_UsingSP | = sum(Discounted_ATCF) |
| IRR_Summary | |
| NominalIRR_UsingSearch | = Search(-10%,200%,1E-6%,Last(InvestmentBalance),0):0.13615645 |
| NominalIRR_UsingFunction | = monthly_IRR(Investor_ATCF) |
| EffectivIRR | = ((1+NominalIRR_UsingFunction/12)^(12)-1) |

*Fig. 29*

AUTOMATED FINANCIAL SCENARIO MODELING AND ANALYSIS TOOL HAVING AN INTELLIGENT GRAPHICAL USER INTERFACE

CROSS-REFERENCE TO RELATED APPLICATION

This application hereby claims priority on U.S. Provisional Patent Application No. 60/118,743 filed on Feb. 5, 1999, the disclosure of which is hereby incorporated by reference herein in its entirety.

BACKGROUND AND SUMMARY OF THE INVENTION

The present invention relates to an automated tool for modeling the cash flows of financial scenarios, which typically involve use of at least one financial instrument, between various parties to a financial transaction by providing analysts with the ability to graphically represent the parties to the transaction, and their complex interrelationships in a manner that simplifies analysis of various options for completing the deal. In particular, the instant invention is directed to a modeling tool that analyzes various aspects of a proposed financial arrangement between parties to the transaction on the basis of information provided through a high level graphical user interface, and prepares competitive financial proposals, structures the proposals in an optimal manner, and which may further be used to manage and administer the final transaction to ensure compliance and delivery of the financial benefits determined by the tool.

The computer has become a critical tool for financial analysts whose job it is to analyze extremely complex financial transactions such as leveraged leases. The computer allows the numerous variables in such transactions to be manipulated and analyzed in a fraction of the time required for these calculations to be performed by hand. Of course, in order to allow a computer to perform useful functions, whether the area is financial analysis or virtually any other subject, software designed for the particular application is needed. Such software is often referred to as a "tool."

Certain software tools for financial analysis of complex transactions have been developed; however, they have inherent limitations and are very difficult to use for a number of reasons, including, for example, their inflexibility in altering existing models, their requirement of complex commands and codes for building and modifying a proposed model, and their inability to manipulate a financial structure at the higher level of an overview. The invention described herein was designed to overcome the problems with these earlier tools and represents a major advance in the field of financial engineering and analysis. The invention incorporates extremely sophisticated aspects of computer aided design (CAD) resulting in a graphical user interface unique to financial analysis. As a result, an analyst using the invention is able to quickly and easily analyze many different potential scenarios and to determine optimal terms for the particular transaction under consideration. For example, this novel approach gives the analyst the ability to see partial results when building a model, provides the financial analyst with dynamic overviews (pictures) of the financial structure that can be directly manipulated to alter the financial structure, and provides an object-oriented distinction between high level structure and financial details which allow the user to defer details until they become available or relevant.

As described in greater detail below, an important part of the invention is a computer software engine which has been designed to automatically obtain and generate information relating to a particular financial transaction or scenario in response to inputs from the user. The software engine and the CAD-like graphical user interface have been designed to work cooperatively together in order to create a graphical representation of the particular transaction or scenario on the screen of the analyst's computer. The system is designed to allow the analyst to cause this graphical representation to be manipulated, modified or revised so that information useful to many different aspects of the transaction or scenario can be quickly and easily obtained. The end result is a system that is easy to use, extremely flexible and far more efficient than prior financial analysis tools.

There are many automated financial engineering and analysis tools currently available for use by analysts to determine various components of a financial transaction and to optimize the transaction based on the particular data associated with the parties to the transaction. One such well-known tool is provided by Warren and Selbert, Inc., of Santa Barbara, Calif. and is referred to as "ABC". ABC has been used by analysts to generate various alternatives within the constraints of a particular financial instrument and optimize the results so that analysts can generate a deal that is acceptable to all parties to the transaction. One such commonly used financial instrument is referred to as a multiparty leveraged lease. There are various other proprietary systems that provide such automated financial analysis.

However, all of these known systems suffer from numerous disadvantages. For example, the ABC program, and others like it, require the use of complex commands and codes for building and altering a proposed model. Moreover, the models typically must be built prior to having the ability to view any intermediate results. This, in combination with the complex programming-like language that is required, results in a very long learning curve for analysts who use the tool. Furthermore, the model, once built and run, does not typically enable the analyst to easily change variables or to easily view the resulting change in the transaction.

A primary source of these problems is the complex and inflexible user interface typically associated with these known tools. Another problem with such prior art tools is that they do not enable a user to model the financial deal visually and mathematically and in a manner which enables interfunctionality and dependency between the visual model and the mathematical model. As a result, the tools currently in use provide limited ability to deal with higher levels of complexity and the ever expanding universe of evolving financial products in use today, and which will be used in the future. Additionally, the inflexible interface makes it very difficult for different analysts to be able to discern the exact relationships and variables of a model that another analyst may have been manipulating when the model was being built and later modified.

To overcome the above and other shortcomings with prior art financial modeling tools, the present invention provides a much more user friendly, flexible tool incorporating easy to understand graphics and interfaces to enable more efficient and practical application of the tool. To that end, the invention provides a financial modeling tool that addresses model complexity with a graphical CAD-like approach to financial and/or mathematical modeling, which facilitates, among other things: the ability to see partial results while building a model; a short learning curve; the ability to make changes when the user views the results of the analysis; flexible "point and click" interfacing; easy handling of indexed data; integrated and automatic handling of certain variables, e.g., taxes and accrual; menu of building blocks, e.g., loans, rents, fees, purchases, etc.; menu of built in reports; and an interactive and intelligent graphical representation of the model.

In accordance with an important aspect of the instant tool, a software engine, hereinafter referred to as "engine", is provided in the tool and is programmed to automatically obtain and generate information on a financial scenario in response to the user creating a graphical representation of the scenario with the CAD-like user interface. In other words, the manipulation of the graphical user interface to generate a visual representation of the scenario automatically results in the generation of information, such as formulas, objects, templates, timelines, calculations, constraints, parameters, optimizable parameters, cash flows, reports, or any other suitable information that is helpful in modeling the scenario represented by the visual representation created by the user using the CAD-like interface. The information generated preferably at least partially model at least a portion of the scenario. After drawing a scenario, such as a proposed financial deal, using the interface, the interface enables the user to enter data and formulas, edit the information automatically generated by the engine in response thereto, and to further define the scenario in a manner which enables the engine to fully model and analyze the scenario. Once the scenario is fully modeled, the tool gives the user the ability to instruct the engine to attempt to optimize the scenario, either directly or by creating formulations to be optimized and passing the formulations to a separate optimizing program. Once the deal is optimized, the results can be viewed by the user using the interface. The scenario can also be modified by the user and new results based on the modification can be viewed. When the visual representation of the scenario is modified, the engine automatically modifies the information previously generated in a manner which corresponds to the modification to the visual representation.

In accordance with a main aspect of the instant invention, a financial transaction modeling and analysis tool is provided which includes: a graphical user interface which enables a user of the tool to create a graphical model of a financial scenario, generally including at least one financial transaction, on a display screen; and an engine operable, in response to creation of the graphical model, to generate information which at least partially models at least a part of the financial scenario using information collected by the engine during creation of the graphical model.

The graphical user interface preferably enables the user to create party graphics respectively representing parties to the financial scenario, and to generate financial instrument graphics representing financial instruments, wherein each financial instrument graphic connects two of the party graphics. The party graphics and the financial instrument graphics define the graphical model of the financial scenario. Preferably, the financial instrument graphics indicate a direction of flow, relative to the financial instrument represented thereby, between the parties connected by the financial instrument graphic.

In accordance with an important aspect of the instant invention, the engine generates, in response to the creation of a graphical model, an instrument information, such as an instrument object or template, for each of the instruments in the graphical model. Once an instrument is defined, the graphical user interface enables the user to interact with the instrument information, such as adding scenario specific instrument data to each of the instrument objects generated by the engine. The instrument data entered in connection with the instrument object constitutes either a fixed part of the financial scenario or a variable part of the financial scenario.

The graphical user interface also enables the user to enter and define date information relating to the financial transaction for use by the engine. Preferably, the graphical user interface is operable to display the date information in graphical form on the display screen. The tool preferably enables the date information to be entered using a natural date language, wherein the engine is operable to process the date information from the natural date language.

In accordance with another aspect of the invention, the graphical user interface enables the user to modify the graphical model of the financial scenario, and the engine is operable, in response to the modification of the graphical model, to modify the information previously generated in accordance with the modification of the graphical model.

In accordance with another aspect of the invention, the engine is operable, in response to the creation of the financial instrument graphic, to define roles for parties represented by the party graphics connected by the financial instrument graphic, wherein the roles are used by said engine to define the parties interaction with the financial instrument represented by the financial instrument graphic when modeling the financial scenario.

The engine is preferably operable to determine and display an optimal solution or result for the financial scenario relative to at least one of the parties thereto, and to calculate optimal values for each of the variables defined by the instrument data based on the optimal solution.

The financial transaction modeling and analysis tool of the instant invention preferably includes an extensible library of predefined financial instruments, and the graphical user interface enables the user to select and use one or more of the predefined instruments during creation of the graphical model of the financial scenario. In other words, numerous common and canned financial instruments are provided to the user to facilitate easy modeling of common transactions that may be used in financial scenarios.

In accordance with another aspect of the invention, the engine is operable, in response to creation of each of the party graphics to generate a party-specific information on the party, and the graphical user interface enables the user to retrieve and modify the information in the party-specific information.

In accordance with another aspect of the invention, the graphical user interface includes a worksheet section, also referred to herein as "smart paper," which enables the user to input scenario information which is independent of or supplementary to the date and instrument information relating to the financial scenario, and the engine is operable to use the scenario information when modeling the financial scenario. Preferably, the instant tool includes a formula language for use in creating the scenario information, wherein the formula language includes a library of predefined functions and keywords which can be used by the user when creating the scenario information.

The worksheet section is preferably a non-cell based, outline based interface for inputting data and formulas in an outline format. More particularly, the worksheet, also called "smart paper" herein, is a non-cell based calculation interface wherein references are based on a hierarchical outline rather than a position reference. In a preferred embodiment of smart paper, the interface enables one formula per row to be defined in an outline-type format.

The engine is preferably operable upon entry of scenario information, such as deal formulas, in the worksheet section to establish links between related scenario information and between scenario information and date information, thereby establishing a dependence therebetween, and further wherein the engine is operable to use the links when modeling the financial scenario. Preferably, the tool includes a library of predefined worksheets for use in the worksheet section, and the graphical user interface enables the user to select predefined worksheets from the library for use in the worksheet section.

The instant tool also enables a plurality of possible outcomes to be modeled based on different information provided by the user.

In accordance with yet another aspect of the invention, the graphical user interface is presented on the display screen in a book-like configuration in which a plurality of different sections of the graphical user interface are represented by different chapters in the book-like configuration, each of the chapters having a tab graphic associated therewith, wherein upon selection of the tab graphic by the user, the user interface is operable to display the chapter associated therewith. Preferably, the tab graphics are located along a side of the display screen, and each chapter may include a plurality of pages, the pages having page tab graphics which are also displayed to the user when a chapter having the pages is selected by the user.

Preferably, the graphical user interface enables the user to view two of the chapters simultaneously in a split-screen format on the display. The engine is preferably operable to update information in each chapter in response to changes made by the user in a chapter.

In a preferred embodiment of the graphical user interface, the chapters include a diagram chapter for creating the graphical model, a parties chapter for providing data relating to the parties, a time chapter for viewing and editing dates associated with the financial deal, an instruments chapter for viewing and editing instrument data, a worksheet chapter for enabling the user to define scenario information or formulas relating to the financial scenario, an optimization chapter for use in optimizing the financial scenario, a payment chapter for viewing payment flows in the financial scenario, and a reports chapter for enabling reports to be generated relating to the financial scenario.

BRIEF DESCRIPTION OF THE DRAWINGS

These and other objects, features, aspects and advantages of the instant invention will become apparent to one skilled in the art upon review of the detailed description of the invention provided herein when read in conjunction with the appended drawings, in which:

FIG. 21. shows the constraints sub-chapter of the optimization chapter of the instant invention, containing information from the exemplary deal of FIG. 13;

FIG. 22. shows an exemplary report produced in the reports chapter of the instant invention based on the exemplary deal of FIG. 13; and FIG. 23. shows the payment organizer chapter of the instant invention containing information on the exemplary deal of FIG. 13.

FIGS. 24–29 show example uses of the smart paper feature of the instant invention.

DETAILED DESCRIPTION OF THE PREFERRED EMBODIMENTS

Figure 1:
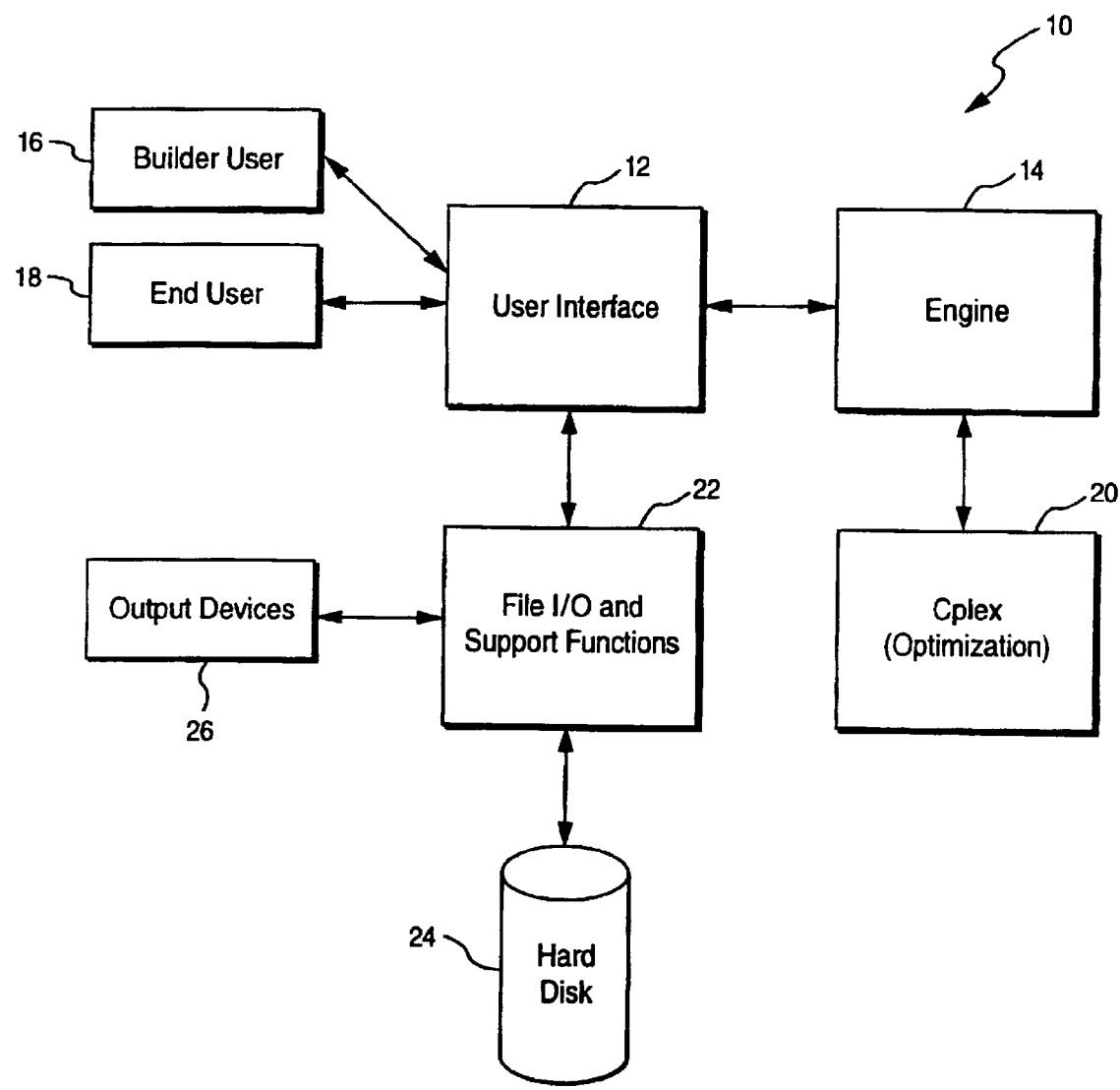
FIG. 1 is a block diagram showing the major components in the modeling and analysis tool of the instant invention.

Referring now to the drawings, FIG. 1 shows an overview of the main elements which comprise a preferred embodiment of the financial scenario modeling and analysis tool of the present invention. More particularly, as shown in FIG. 1, the tool 10 includes a user interface 12 which preferably enables both builder users 16 and end users 18 to interact therewith, a software engine 14, an optimizer system 20, which is preferably a software package known as CPLEX Optimization (version 6.0) offered by CPLEX, ILOG CPLEX Division, but any other suitable optimization software may be used, file I/O and support functions 22, output device(s) 26 such as a printer, and a hard disk 24 or other storage device for use in storing information and data provided with the tool 10 and input by the users thereof. The engine 14 performs all calculations when modeling a deal using the tool, including parsing of the formula inputs. The engine 14 also reduces the data representing the deal into an abstract form for submission to the optimizer 20 in order to perform optimization functions for the deal. The user interface 12 and the engine 14 are the main elements of the present invention and will be described in greater detail below.

In order to enable a better understanding of the instant invention, the following glossary of definitions are provided for terms commonly used herein to describe the instant invention:

Smart Paper—is one of the chapters in the user interface of the tool. Smart Paper is a non-cell based calculation interface wherein references are based on a hierarchical outline as opposed to a positional reference. Smart Paper is also referred to herein as a "worksheet."

Party—represents a potential (or actual) participant in a financial transaction or scenario, and as such its meaning is close to that of colloquial English. Parties connect to the roles of instruments to define the financial interactions among the parties.

Instrument—is a tool object that encapsulates an atomic financial transaction among a pair of parties, including the tax consequences and classification of the transaction (e.g. rental payments).

Role—is a party connection point of an instrument that defines how the party interacts with the instrument.

Key Date—is a globally available date defined by the user in the Time Organizer.

Date Stream—is a chronological pattern of dates that defines both discrete dates and their relationship to time periods.

Timeline—is a globally available Date Stream defined in the Time Organizer that can be used for synchronizing payments and data throughout a user's model.

Decision—represents a "yes or no" option at some point in time that is available within the transaction being modeled with the tool, wherein the tool then tracks both the "yes" and "no" results.

Outcome—is the result of some specific set of assumptions regarding Decisions, i.e. a specific assumption as regards the "yes" or "no" of each Decision (see also ACOE below)

Alternative Courses of events (ACOE)—is the full set of possible Outcomes in a model, all of which are active within the model. For example, a deal or scenario may include the leasing of an airplane over 20 years where the lessee has the option to buy the plane after 10 years. One outcome of the case is the 20 year lease, the other would be the 10 year buy out option.

Decision Handler—is the mechanism within Instruments that defines the action for a "yes" Decision.

Parameter—is a piece of information within a case which has a name, a mathematical formula, and a value. The value can be a number, date stream, formula or other item.

Case—A case is a single file created with the tool which has all the different elements of a single deal or scenario.

Figure 2:
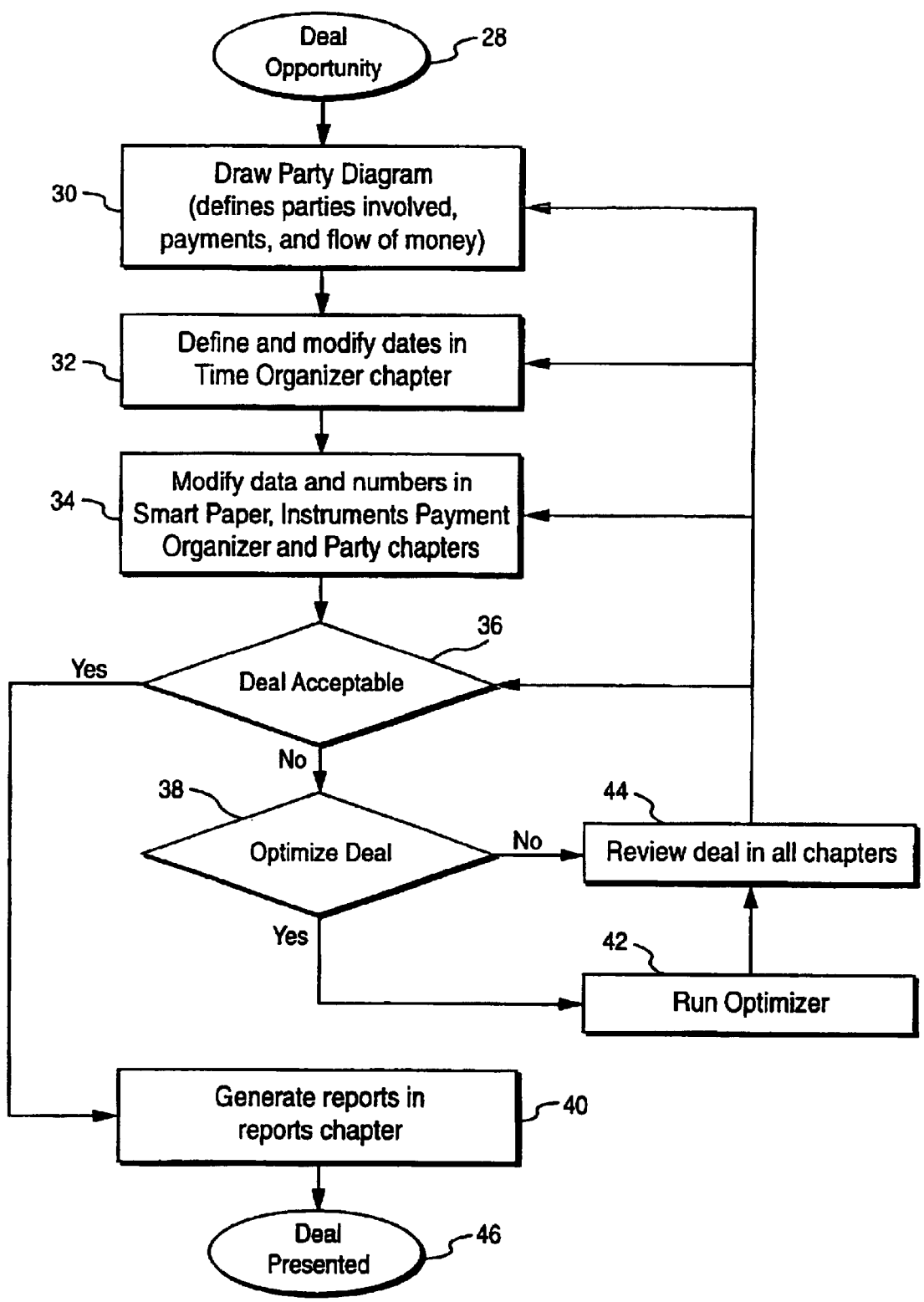
FIG. 2 is a flow chart showing the main functions and steps involved in using the modeling and analysis tool of the instant invention to model and analyze a financial scenario.

Referring now to FIG. 2, there is shown a general overview of the main steps, according to a preferred embodiment of the present invention, which are followed when using the tool 10 to model and analyze a financial scenario, deal or transaction. As will be described in greater detail below, the tool 10 provides a graphical CAD-like interface which is used to model the flow of financial instruments and data between various parties to a financial scenario, including individual, corporations, institutions and/or the like. In accordance with the instant invention, the tool enables users to visually define the parties involved in the scenario and, for example, the flows of money and assets in the form of a graphical model of the scenario. Parties are preferably represented by boxes which display the name of the party. Arrows are preferably used to represent the flows of instruments. Once the model is defined in the tool in graphical form, the specifics of each party and the flows are further defined in various interfaces until the model is fully defined.

If the model as defined satisfies the requirements of all parties involved, the tool provides an interface which enables the user to create various reports relating to the model generated for the scenario. These reports include, for example, the flow of instruments and assets over various time periods. On the other hand, if variables exist in the scenario based on requirements of the parties, the tool enables the scenario to be optimized. For example, the deal may require that a party obtain a return on investment of at least 5%. The party may desire an even greater return provided all other aspects of the model of the scenario are satisfied. Such requirements are known as constraints of the model. The process of optimization involves creating the best model which satisfies all such constraints and determines the best possible model based on the requirements and goals of the parties. The instant tool enables optimization against a number of constraints that may exist in the scenario.

The tool operates in two basic modes: build mode and end user mode. In build mode, the user creates the definition of certain aspects of the tool, such as creating instruments which model real world financial instruments. These instruments are then stored in the tool for use by end users when modeling a scenario using the tool. In other words, the builder user provides a library of "canned" instruments which can be used by the user to more easily and efficiently model the scenario with the tool. The instruments involve a set of inputs and calculations based on those inputs. The end user incorporates the built instruments into a model and supplies the real inputs corresponding to the actual deal that is being modeled. The build user mode also enables the builder user to create calculation templates to be used by the end user in conjunction with various instruments.

FIG. 2 illustrates the steps performed by the end user when using the tool to model a scenario. More particularly, when a deal opportunity 28 is presented to a user of the tool, the first step 30 is for the user to draw a graphical diagram of the scenario using the CAD-like user interface section of the tool. Once the diagram is drawn, the next step 32 is to define and modify dates relating to the scenario. Once the dates are defined, the next step 34 is for the user to modify data and numbers in a worksheet section, also referred to herein as "smart paper", in order to provide all of the information necessary to model the deal. If the deal is determined to be acceptable in step 36, the user can generate reports (step 40) using a reports section or chapter of the tool, and then the scenario or deal can be presented (step 46) to the client or the person contemplating participating in the deal. If the deal is not accepted in step 36, but optimization is not desired or possible based on the particular deal, the user can review all of the input (step 44) and edits or modify the deal as needed to make the deal acceptable. If optimization is desired, the user can run the optimizer (step 42) and then review the optimized deal. If the optimized deal is then acceptable, the user can run reports and present the deal to the client (steps 40 & 46).

Figure 3:
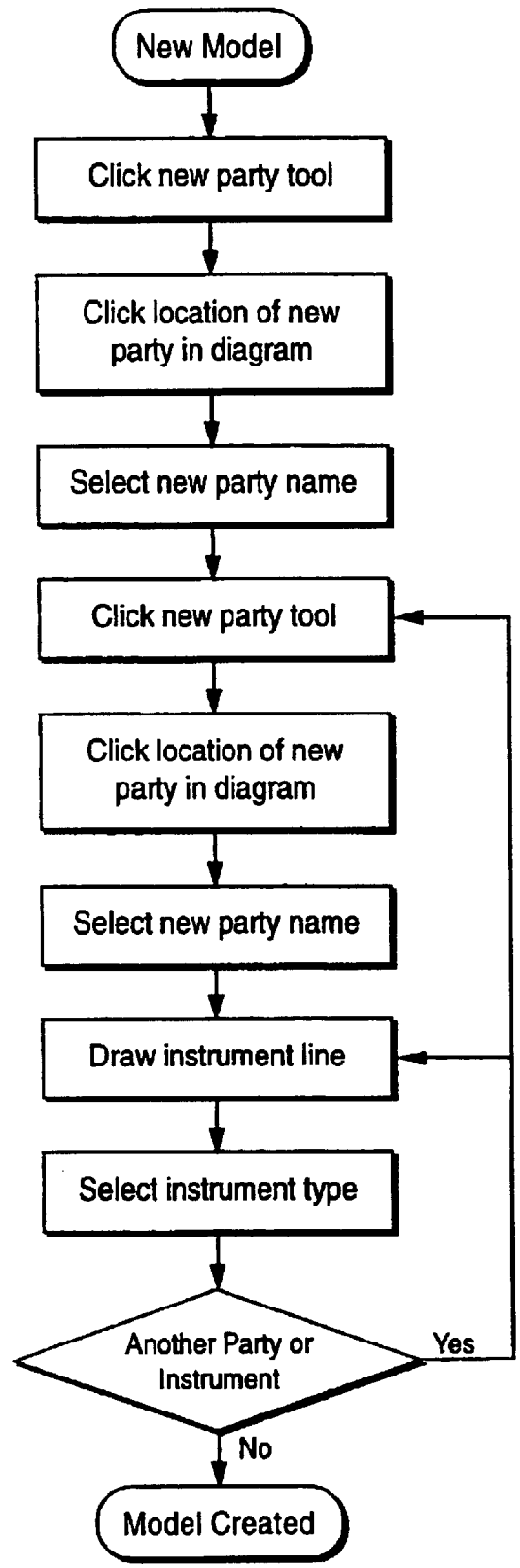
FIG. 3 is a flow chart showing the main steps used to create a graphical model of a financial scenario, in accordance with the instant invention.
Figure 4:
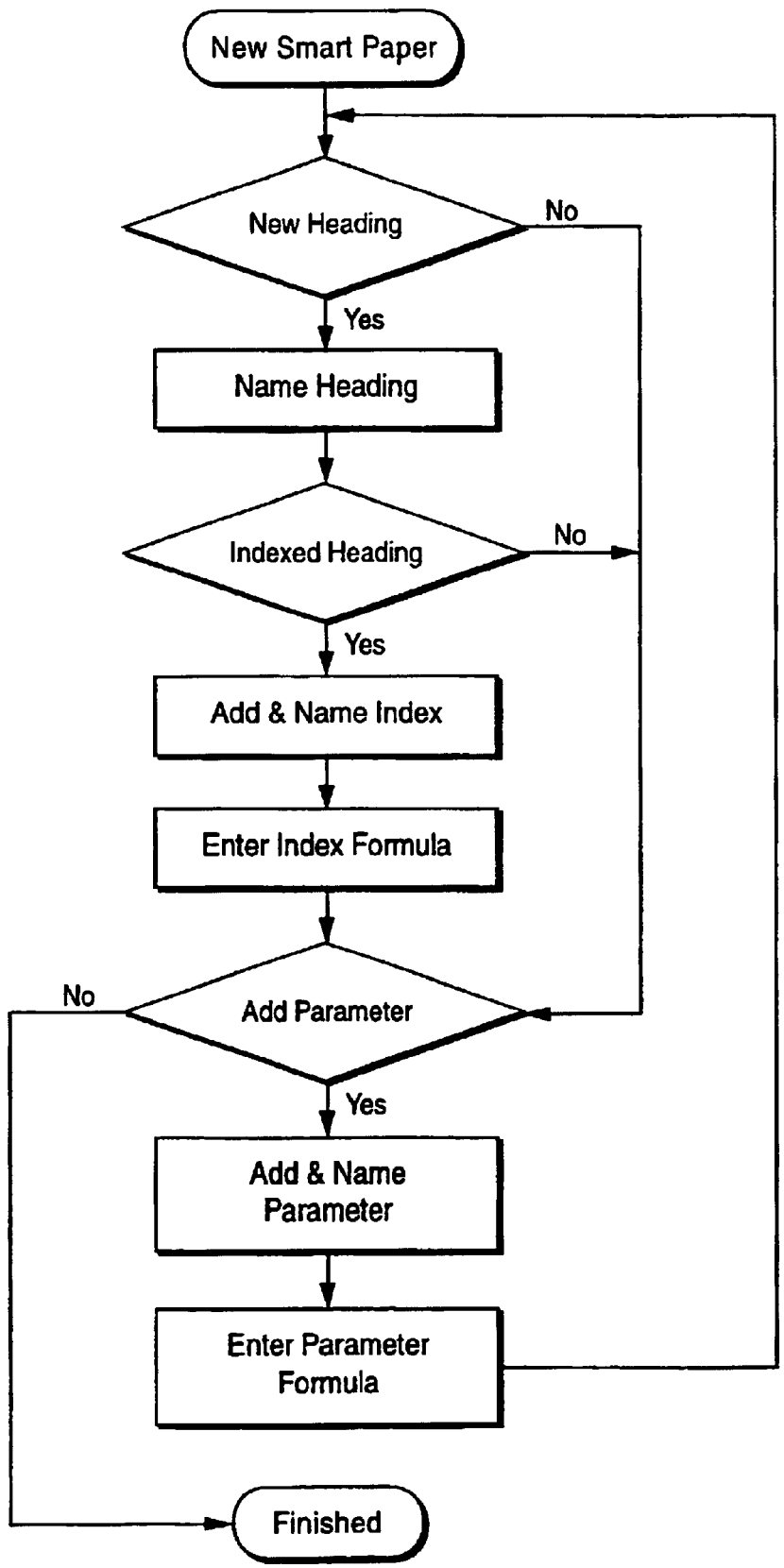
FIG. 4 is a flow chart showing the main steps used to create a worksheet, also referred to as "smart paper", for use in connection with modeling of the financial scenario, in accordance with the instant invention.

As indicated above, one step involved in modeling a deal using the tool of the instant invention involves creating a party diagram (step 30) or graphical model of the deal. FIG. 3 shows flow chart of the steps involved in creating this graphical model. Similarly, FIG. 4 shows the preferred steps involved in creating smart paper or a worksheet in step 34 of FIG. 2. It is noted that the flow charts of FIGS. 2 and 3 are self-explanatory. Thus, no further explanation of the particular steps in the flow charts of FIGS. 3 and 4 are provided at this time. However, further details regarding model creation and smart paper use are provided below.

The Graphical User Interface (GUI)

The following is a description of the functionality of the present invention in terms of the graphical user interface (also referred to herein as "GUI"). It is noted that, in accordance with the instant invention, the GUI may be implemented using Windows 98, Windows NT, MAC, or it may be Web-based. In other words the instant system may be implemented on any suitable standalone, networked or web-based platform. In a preferred embodiment, the tool can be implemented using the following hardware, however any suitable hardware may be used in accordance with the invention:

A Pentium compatible machine running Windows NT 4 with service pack 3
64 Megabytes Ram
45 Megabytes hard disk space
Cplex Optimization software version 6.0
Actuate reporting modules including all DLL's and OCX's (Actuate is a commercially available reporting technology)
Version v4.72.2106.4 or later of ComCtrl32.dll The instant invention preferably uses a book-like display as a viewing device. More particularly, the invention displays its data as pages in a familiar-looking tabbed notebook configuration on the display screen. Each tab of the notebook represents a "Chapter", corresponding to one part of system's functionality. Users can work with one copy of the book visible (see FIGS. 14–18 and 20–23), or with two copies visible at once (see FIGS. 5–12). Viewing two copies of the book lets the user see related "pages" in both chapters simultaneously. When two book copies are visible, the books can turn each other's pages, so the user can click on a model component in one book to see more detail about that component in the other book. Preferably, the user should never be more than a couple of clicks away from seeing any part of the model or system. The GUI is designed so that the user never feels lost inside the program.

The first chapter in the GUI is the Payment Diagram (see FIGS. 14 and 15), which provides a graphic boxes and arrows overview of the relationship among parties and instruments, as well as the payments the parties make to one another. This is valuable because ideas for financial structures are often presented as boxes and arrows drawn on paper. The payment diagram provides an analogous representation. However, as explained herein the payment diagram represents much more than simply a graphic diagram. The user can control or create the program's model by modifying the picture or graphical representation of the deal shown in the payment diagram. An advantage of this approach is that there are no separate languages to learn and no complicated controls to master. The GUI provides for instantiation and deletion of parties. The user can drag-and-drop a box onto the diagram to create a new model participant, and can delete a box to remove a model participant. The GUI provides for instantiation and deletion of arrows representing financial instruments which, in turn, represent payments made by one participant to another, and/or represent the tax effects of those payments. The user can rearrange who pays what to whom by moving the instrument arrows from one box to another. The GUI also enables selection of an overview by possible outcome. In other words, in transactions with several contingencies, it is often helpful to show only those payments contingent on a particular decision path. The user can rearrange the participant boxes on the diagram using a drag-and-drop method. The connected instrument arrows follow automatically in response to the drag-and-drop operation. The GUI provides a list of pre-defined instrument types immediately upon creating the instrument. Double-clicking on an instrument and party tells the system to show detailed information about that instrument or party. Clicking the second mouse button offers a list of actions appropriate for the instrument or party clicked. The GUI also provides navigation to the Payment Organizer (preset for specified party) via the second-mouse-button menu The next chapter is the Parties chapter. The program simulates "parties," which are entities that participate in a financial transaction. It provides automatic creation and deletion of party-specific information. This party-specific information includes items, such as tax rates, fiscal-year-ending months, or yield requirements. The GUI provides support to the Payment Diagram for party detail information. The GUI also provides the user with a standardized and extensible location for party data. Each party can have individual tax attributes, paying different kinds of taxes to different governments (U.S. states or foreign countries).

Figure 16:
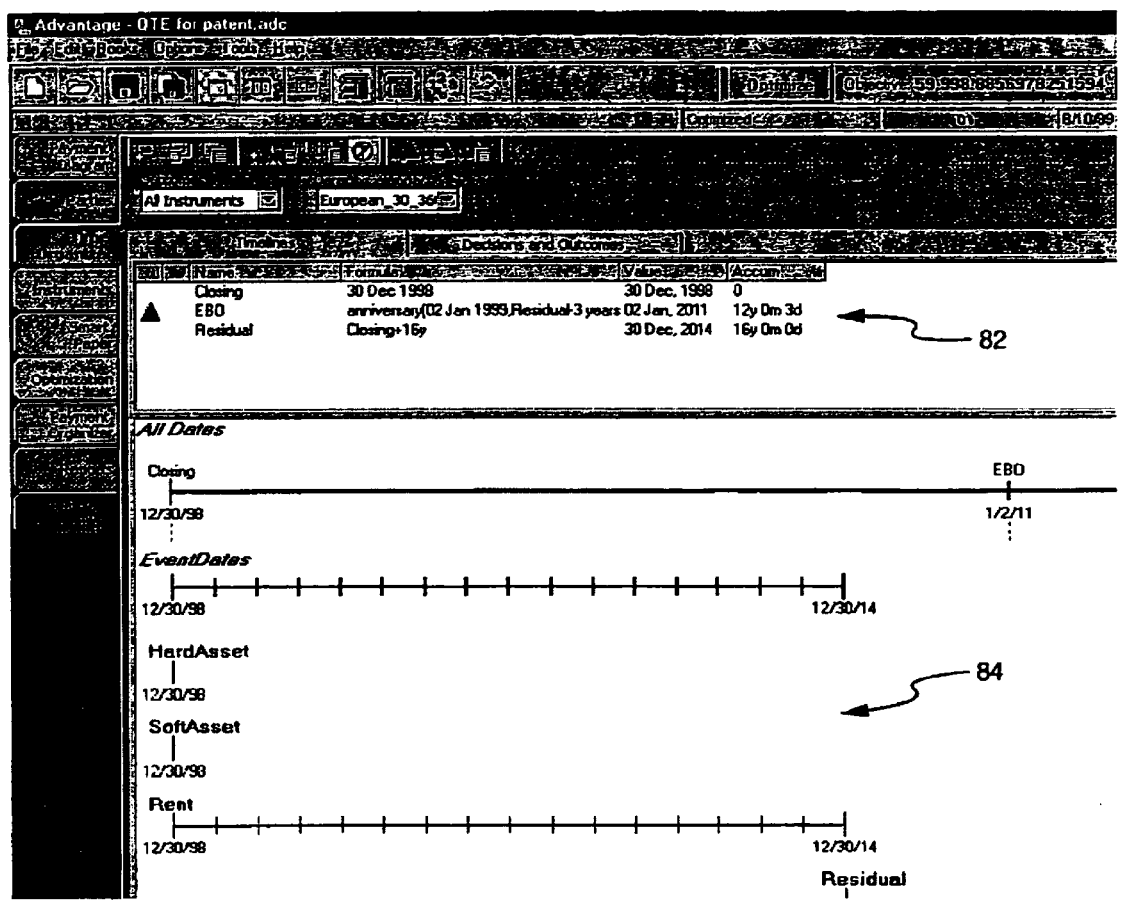
FIG. 16. shows date information related to the exemplary deal of FIG. 13 being displayed in the time organizer chapter of the graphical user interface of the instant invention.

The next chapter is the Time and Decision Organizer, which is also called "Time Organizer" in the program for short (see FIG. 16). In this chapter, the GUI provides users with control of globally available (case-wide) key dates, timelines and outcomes (from decisions). This is important because: (a) transactions often require numerous payments to be synchronized; (b) payments are often contingent; (c) contingencies can interact or cancel each other out; and (d) having all these in one place, and graphically editable, can make a transaction much easier to explain and understand. In addition, the GUI provides the ability to create, delete, and edit Key dates, timelines and decisions. This is important because: (a) assumed closing dates usually have to change; (b) there are constraints on when important deal events are allowed to occur; and (c) deal economics can be enhanced or harmed by proper choice of such dates. The GUI also provides a graphic overview of key dates. Also provided is a graphic overview of instrument payment date streams, aggregated by timelines. This lets the user see quickly whether the model's payments are properly synchronized. The system also provides graphic control of decision interaction to create and delete mutually exclusive outcomes. The user can thus see whether decisions occur in the proper order, and that they are also properly contingent on each other. The GUI also provides the user with control over the global default for "Calendar" (conventions used for counting the number of days in an interval). This makes it easy to modify a model's calendar convention for use in Europe, Asia, or the U.S., in addition to following the particulars of any model. The GUI also provides a "default" timeline to synchronize newly created Instruments' activities automatically.

Figure 18:
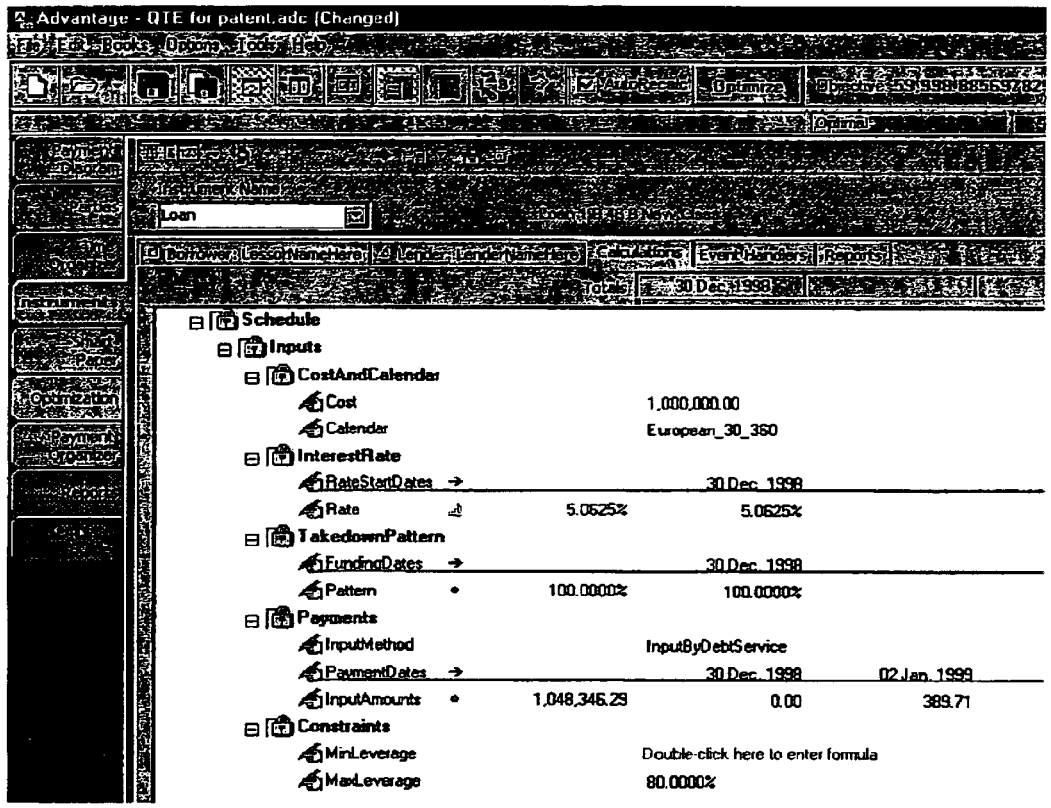
FIG. 18 shows a view of the instruments chapter containing data relating to the exemplary deal of FIG. 13.

The next chapter is the Instruments Chapter (see FIG. 18). Instruments are the containers for the systems built-in financial expertise. They handle a lot of the routine bookkeeping that financial models demand, leaving the user free to concentrate on the nonroutine business aspects of the transaction. The GUI of this chapter provides controls for creation and definition of payment streams between parties, and the tax effects of such payments on the paying or receiving party. An expandable library of instruments keeps the system up-to-date. Instruments have clearly separated and protected "input" and "output" sections, so all users can rely on their integrity. The system connects parties (badges) to payment streams via role definitions and allows the user to switch parties. This is how the model knows which parties pay or receive the payments the instrument defines. This chapter also connects payment streams to payment organizer classifications (cash and income badges) via role definitions and allows users to change the classification. This is how the model puts labels on each payment, so that it can show up in an informative place on summary reports.

The system allows paying and receiving parties to have distinct interpretations of the instrument payments, tax effects, and classification. This is an important feature, because tax law often makes these distinctions. Instruments contain pre-built and pre-tested Smart Paper computation sections, making the system more reliable and freeing the user from having to do repetitive programming. The system automatically activates and deactivates instrument Smart Paper computation sections according to the user's selection of role information for the parties. Thus, sections not in use remain visible and available and do not distract the user. Glyphs are used to highlight the relationship between role specifications and the calculations. Specific items representing payment or receipt of funds, or of taxable income or deductions, are identified with symbols that make those items easy to find. The system also allows the user to change the name of the instance of the instrument. These name changes show up on the party diagram and the payment organizer, making both of these a lot easier to read and understand. In addition, model pieces can be named with the names that other transaction negotiators are using, making communication a lot easier. The system also automatically generates the parallel payment streams for different outcomes using handlers for each possible decision. Each instrument can thus generate different specific payments depending on the state of various contingencies. This is important because exercise or non-exercise of certain options can mandate different behavior on the part of the same instrument. The system allows the user to modify the handlers' termination behavior. Thus, special cases do not require modifications to the system. In addition, the system uses Smart Paper "protection" modes to preclude user corruption of instrument functionality, but otherwise allows users the ability to modify instrument Smart Paper. Thus, users can be confident that canned (and therefore tested and reliable) model parts are being used, instead of model parts which may not be correct given an unforeseen peculiarity of a particular model.

Users can supply their own formulas. Such formulas are clearly marked, so that other users know they have to validate the formulas before using the model. The system also provides canned calculations for specific types of financial elements (e.g. rent, loans, etc.). These canned calculations cover a very large fraction of the payments users would run into when modeling a financial scenario. Thus, users will spend little time having to invent new payment mechanisms. In addition, this set of canned calculations is contained in an expandable library, so as the industry changes, additions can be added to the library to keep it up to date. The system provides the user the ability to customize the calculations, making use of the invention a lot easier. Pre-defined reports of the instrument results are also provided. As a result, explanations of what an instrument is doing are only a click away. The system also allows the user to specify that an instrument only exists when a certain decision is assumed. Contingent instruments can be put into the model and will thus automatically be properly handled. The system also supports automatic decision and outcome creation for termination values and other make-whole payments. These contingency dates are too numerous to include as separate instruments or outcomes, and so including them here provides a compact way of computing them as a class. In addition to general financial instruments, the system may also include instruments for advanced corporate finance operations, such as mergers, acquisitions and the like.

The next chapter is the Smart Paper chapter (see FIGS. 20 & 25–29). Smart paper is a powerful non-cell based calculation interface wherein references are based on a hierarchical outline as opposed to a positional reference. Unlike spreadsheet programs, smart paper is non-cell based and does not rely on a positional reference for use in calculations. Smart paper is the bridge between the ease-of-use that spreadsheet users depend on, and the power of financial and optimization packages. It makes computations visible, understandable, and accessible. Users do not need to be computer programmers or learn to work as programmers in order use the system effectively and efficiently. The system has enhanced data capabilities, which automatically perform a lot of rote date-related manipulation that makes spreadsheets hard to create and even harder to modify. Thus, the system provides capabilities normally found in relational database packages. The smart paper chapter is the component where the user specifies the computations he wants the system to perform. Users can define values directly, or they can provide a formula which will tell the system how to compute the desired values. Smart paper provides user control over outline-like (i.e. tree-like) format of parameters and several nested layers of headings. This makes Smart Paper work much more readable, and provides a mechanism for the system to resolve (or ask the user to resolve) formula ambiguities. Smart paper allows the user to create one or more sheets of smart paper. Related computations can be kept together, and unrelated ones can be segregated. Tabs are provided for moving among sheets of smart paper. As a result, users do not feel lost in the program and are able to find quickly what they are looking for using the GUI. The GUI provides controls for viewing "formulas" versus "results" or both. Thus, users can get immediate feedback as to whether they have properly specified a formula. The GUI provides editing capabilities for headings and parameter names, as well as provides access to the template library and instantiation of templates. Smart paper defines parameter name scope and parameter index scope automatically via outline format. This resolves many "name clashes," which would be otherwise inevitable in a model of any size. It also provides a view of dependency relationships among parameters. Users can thus identify information relationships among their parameters. Also provided is general support goal-directed "search" for setting parameter values. The system automates some of the trial-and-error involved in changing parameters' values in order to produce the desired answer. It also allows the user to specify formulas that define (dynamically) activation/deactivation of sub-trees. This gives models the ability to be "context-sensitive," responding sensibly to particular values of input data. It also provides capability for import/export of data and formulas from/to Microsoft EXCEL or the like. Models can be created using the system and the system will automatically reconstruct the model in Microsoft EXCEL.

The GUI also provides a date stream bar that always displays the index of the uppermost indexed stream. The important pairing between dates and date-indexed data is therefore always visible on the screen. This eliminates a lot of meaningless clicking back and forth to keep the index visible, and eliminates the need for a lot of "split-screen" display. The GUI supports multiple data-entry modes: simple-edit, full-edit and rapid-entry. These modes make constructing models easier and faster. Also, smart paper items (e.g. headings, templates, formulas, indexes) can be changed into each other. Tool bar and menus provide editing to morph, promote, demote, insert, and delete operations. This eliminates the need for learning a lot of jargon. Instead, all the alternatives are displayed, and the user can choose the most logical one. The system also provides graphic feedback as to the type of indexed data represented by parameters. Moreover, in accordance with the invention formulas for dates resemble "English-language" instruction. Formulas can be printed, providing human-readable documentation for a model. This differs significantly from spreadsheets, wherein formulas consist largely of a list of data locations instead of identities, resulting in a nearly useless documentation tool for a human. The system creates templates as white-box functions which allow the user internal access. Thus, there is no need to refer to external, written documentation to figure out what a template/function is doing, because all the code is right there, visible.

In addition, smart paper has an extremely powerful formula language (with input/edit wizards). This formula language automates many tasks which are routine in finance but which are now cumbersome for spreadsheet users. The formula language, which is described in greater detail below, has the following exemplary features:

Uses Prefixes attached to formulas to define special types of parameters for—
  Accrue: Automated accrual over time periods
  Table/Interpolate: Data Tables (regular and interpolated)
  Advance: Advance payments
  Arrears: Arrears payments
  StartDates: Date streams that represent the start of time periods
  EndDates: Date streams that represent the end of time periods
  List: Named members of an ordered set.
  ActsLike: Ties one parameter's type to the type of another parameter.
Uses Prefixes attached to formulas to define goal-oriented setting of parameter values
  Optimize: To have values set by the Linear Programming optimizer.
  Search: To have the system set a parameter value based on a defined target result.
Single formula defines entire array of data.
Array data is keyed by index parameter. Thus, there is provided what amounts to a relational database structure, without making users learn a bunch of relational database jargon.
Intelligent translation of data from one index to another based on the dates and the prefix type.
Relational database capability without making users use a separate program or even learn relational database jargon.
Automatic maintenance of minimal name expansion for parameter references. Names are thus presented as short as possible, keeping the mental burden down and reducing the possibility for confusion.
Intuitive, English-like and flexible syntax (and wizards) for creating date streams. These date streams can thus be easily changed and maintained, unlike spreadsheets, which are very rigid in their handling of this information.
Parameter labels define the parameter name for formula references. This is different from spreadsheets, in that, in spreadsheets, values are identified generally by where they are, not by their names (despite a cumbersome facility spreadsheets offer for naming cells).
Notes can be added to any heading or parameter, and the identify of the user making the note is recorded. This helps with auditing and documentation of models.
Assertions can be added to any parameter. Assertions let a "product manager" create models and guide future users in the model's use.
Optimization constraints can be added to any parameter.
Optimization constraints can be "OR'd" together to make a single constraint that is satisfied by any one. Users do not need to deal with linear programming jargon, which is often unfamiliar to them. This makes it easy to specify commonly desired constraints that are difficult to implement with binary variables in a strict "linear program" setup.
An activation formula can be attached to a constraint that makes the constraint inactive when the formula evaluates false. Thus, constraints can be "data-driven." This lets model builders build models for less-sophisticated users, who can operate complicated models by providing values for variables.
An activation formula can be attached to a heading to make the sub-tree (for which it is a root) inactive when the formula evaluates false.
Glyphs reflect the existence of notes and assertions including the pass/fail state of assertions. Thus, the user doesn't need to open a parameter in order to tell whether a note or assertion is inside it.
Glyphs indicate the protected state (if any) of the parameters.
Allows for partial null data in an array.
The "Collect . . . ( )" functions let models be defined concretely ("add this to that") or abstract/symbolically ("add everything labeled principal to everything labeled interest"). The abstract/symbolic capability means that product managers can write models that stand up to use in many different contexts.
An extensive range of mathematical functions for use in formulas(see below).
Intelligent/selective recalculation helps program performance.

Figure 21:
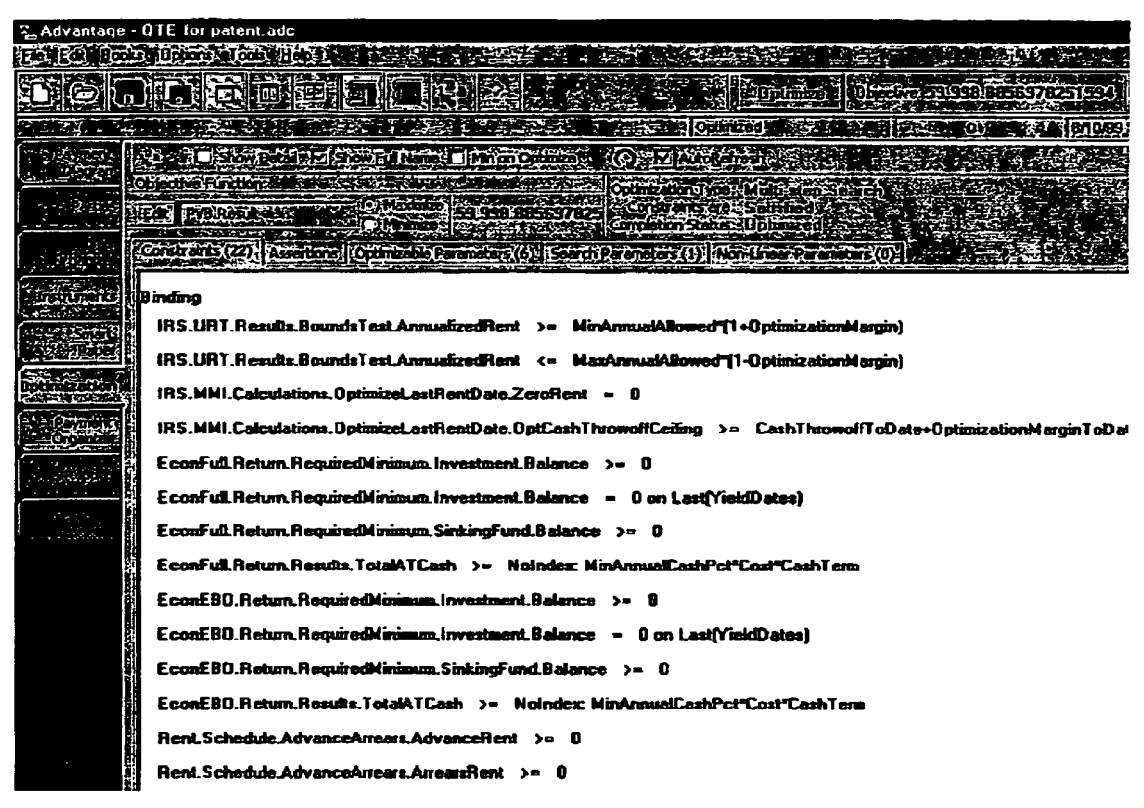

The next chapter is the Optimization chapter (see FIG. 21). In this chapter the system is able to solve mathematical linear programs and other "search for best answer" problems. It also provides extensive tools for managing and seeing the effect of model constraints. This feature is very important as models get complex, and the number of constraints grows to, for example, several dozen. A deterministic, formula based model can be used as the basis for an optimizable model: starting with a deterministic model, the user can simply identify the objective and add constraints. In accordance with the invention, there is no need to write a separate, optimization-ready version of a model. The optimization chapter provides an overview of all optimization constraints and parameters in a case and defines the objective function for optimization. The system analyzes the optimization instructions and data contained in a model. It provides diagnostic status indicators for:

the mathematical type of optimization problem (e.g. linear, integer, non-linear, etc.);

the state of the constraints (satisfied or not satisfied). Thus, a hypothetically optimal solution can be hard-coded and compared against constraints, identifying those parts of the hypothetical solution that do not meet the constraints; and the state of optimization (e.g. optimal, not optimal, infeasible, unbounded);

In addition, the system gathers all model constraints for viewing on one page. This is important because constraints are often of definitive concern in tax-motivated transactions. The system also sorts constraints by failing, binding, non-binding, and inactive. This helps negotiators identify the critical points in their deals, or helps a user figure out why his model might fail to provide an answer he would expect. It also provides detail results of the values, slack, shadow prices or failure margin of constraints. This information helps the user explain anomalous results, or suggest ways that financial objectives may be attained at less cost. Also provided is a simple algebraic list of all constraints, making it easier to make sure that no constraints have been mistakenly taken out or left in. This list can be printed, and becomes an important "output" for deal participants to examine and approve. The system also gathers all optimizable parameters, search parameters, and non-linear parameters for display separately on their own pages, helping make sure that the linear program model has been set up properly. It also automatically determines whether there are any parameters causing non-linearity and thus precluding being solved by the built-in linear optimizer The user can then more easily decide how to change the model to be solvable by the available optimizer. The system automatically traces the non-linear parameters to corresponding optimizable parameters and displays them with the non-linear parameter. This helps modelers find linear models that are approximate solutions to otherwise unsolvable nonlinear problems. The system also allows users to specify facets of optimization in a way that is intuitive and easy to understand. Constraints are expressed in terms of comparisons and not just formulas. Prior art systems treat formulas with constraints as one and the same making it difficult to discern between a formula that is incorrect and a formula which is correct but not satisfied in the model. Constraints are entered and evaluated separately from the associated formulas making it easy to see where the true problem lies. Results from the optimization software (e.g. CPLEX) are likewise translated back into these terms producing a result that users can easily interpret. It also provides button access to the optimizer. The system automatically converts the model to "optimizable" form for the optimizer, and then re-converts the optimizer's solution to code; thus, optimization is a transparent process to the user.

The GUI presents user with detailed progress screen and saves the results back to the user's file. The system also re-evaluates constraints in the context of the user's model to provide more useful feedback from optimization. This is important because the specific analytical assignment is often to reverse-engineer the set of constraints that produced a particular answer. The system also automatically invokes Successive Linear Programming (SLP) when needed to solve for a search parameter. This saves the user the labor of having to determine that the problem at hand is SLP and then perform the SLP by successively invoking the optimizer. It also automatically combines point-by-point searching and mathematical optimization, saving the user the labor of searching over various valid values of nonlinear data.

The next chapter is the Payment Organizer (see FIG. 23). The Payment Organizer shows all the payments a given party receives, or taxable income effects a party might recognize (contingent on the exercise or non-exercise of a particular set of decisions, if there are any). In short, this is the party-specific "bottom-line." It also provides user top-level control over payment stream classifications and summary report of all payments. The system calculates and summarizes the cash flows and taxable income effects of all instruments automatically. It also provides ability to add, delete, rename and reorganize (tree-like) all payment stream classifications. The system also provides the capability to filter payment streams according to party, outcome, or cash versus taxable income. It also provides capability to view payment stream summary according to any ad-hoc date stream specified by the user. Data can be summarized annually, monthly, daily, or even in combination (daily for the first couple years, annually thereafter). This is enormously difficult to do in a spreadsheet. Also, categories can be collapsed to show less detail, or expanded to show more detail. Categories can also be expanded to show individual payments contained in the category for auditing purposes. Subtotals can be shown on top of items totaled or below them, with a button-click. This makes reading the reports easier. The editor for the symbols is useable in symbolic-definition formulas (i.e., "CollectWhatever"). Additionally, the system provides standard financial statements (income, balance sheet, funds flow).

The next chapter is Reports (see FIG. 22). The Reports chapter provides the user with the ability to create, edit, view and print model data in reports that are useable as explanatory documents. Users do not have to load data into some other program for cosmetic improvements. A report can consist of several sections (each of which could otherwise be a freestanding report of its own, all arranged on a single report's page. The system provides the ability to create report "sections" (report parts), and provides the ability to drag and drop report sections on a layout editor to organize above/below and left/right arrangements of report sections. It also provides for push-button pivoting of individual sections of a report so that dates and/or labels can be shown vertically or horizontally. The system automatically creates headings for data rows/columns based on parameter names. The user can change these names. It also supports user-driven and automatic creation of nested super-headings (i.e., headings running across several columns). This makes reports more readable because it groups data into fewer, more easily understandable chunks, and helps the report reader find a particular column of interest more quickly. It also provides titles, headings, footnotes and control over data format. Reports can thus be "customer-ready" without having to be imported for clean-up into commercial word-processing or spreadsheet software. The system also supports the creation of sets of many reports to be printed or viewed. This is important because the "story" of a financial product often requires several related reports. It may optionally bind reports to user models (so that they are stored with the model), or to instrument definitions (so that they are stored with the instrument definition and thus available in every model in which such an instrument is used). Reports are language-independent: thus output can be in a language other than the system user's working language. The user does not have to speak the output language.

The next chapter is Template Builder. A "template" is a white-box piece of pre-built and pre-tested Smart Paper. A library of such templates provides a large part of the built-in financial knowledge that users can draw on. This makes it worthwhile for an organization to invest in well-constructed Smart Paper pieces that can be reliably shared. The GUI provides the ability to create Template definitions to be used for instantiation. Generally, only specially trained "builder/users" would invoke the Template Builder. It provides user access to protection controls over read/write specifications of parameters. It also allows the builder of templates to work in the same manner as in regular Smart Paper. Thus, they are familiar in appearance and do not require users to learn how separate components look and work. The system provides linkage to the currently active model so as to provide useful feedback to the builder. It also allows the builder to create, edit and delete template definitions, and to make these definitions available to the larger user community.

The next chapter is Instrument Builder. This chapter provides a special "build" mode for instrument builders to create the definitions of instruments. Instruments can be designed to, for example, calculate tax effects for numerous governments (U.S. states, foreign countries) simultaneously. Tax instruments can be designed to, for example, handle complex multinational tax interactions (foreign tax credits and the implications of various international tax treaties).

The next chapter or feature contains Main Menu Items. These items include an extensive, full-featured on-line "help" system which provides documentation for system features and behavior, and also provides financial examples which can serve as a tutorial; options for adjusting the program's appearance (horiz/vert tabs); and a program that follows the Windows NT "Control Panel" settings for cosmetics (dates, mouse clicks).

In addition to the above, there are some general features found in several of the chapters or components of the system described above. For example, print previews are provided for enabling the user see output before committing it to paper, thereby saving time, paper, and aggravation. In addition, general cosmetic formatting capability is provided which is similar to that found in commercially available word processing or spreadsheet programs.

Another chapter or feature of the invention provides the ability to manage multiple cases. A financial analyst may spend as much time managing and summarizing the cases he produces as he would spend producing the cases in the first place. The GUI also provides tree, containment, or list views of the files. It also provides an overlapping grouping capability, so files can be treated as a group in addition to individually. The system also provides a mechanism for extracting key results for several files and presenting them in a tabular report. It also provides file search capabilities based on the contents of the file in addition to the file's name, as well as filtering and sorting capability (e.g. show only my files). A "recent files" section and "all-files" section is provided. This is important because a great majority of the time users work on a single project continuously, and, with this feature, they don't have to look through hundreds of files to find one they were recently working on. The system intelligently identifies differences between two or more selected files, making it easier to explain their differences. It also provides capability to reorganize files (i.e. the tree), and the capability to read and add notes to files. Thus, a file's owner can protect the file from changes, while letting colleagues look at, and then attach notes to the file. In addition, the system provides detail records of file (e.g. ancestry). This is important because the great majority of files will probably not be created anew, but rather will be modified versions of existing files. The ability to track the changes that produced a file is a very advantageous and time-saving feature.

It is noted that not all of the "chapters" discussed above necessarily have a "Tab" always visible on the GUI. In other words, some of the chapters or features, i.e. Template Builder, are accessed through menu items or other suitable means for enabling the selection thereof.

Referring now more particularly to FIGS. 5–12, there is shown an example of the Payment Diagram chapter 50, having a graphical representation 52 of a simple financial scenario involving a two parties (54 and 56) and a "loan" instrument arrow 58 connected therebetween. In FIGS. 5–12 the two book view is used in order to more clearly explain the functionality of the invention. It is noted that, in FIGS. 5–12, the Payment Diagram chapter 50 has a reduced size so that greater information can be seen in the other chapters on the right side of the display.

Figure 5:
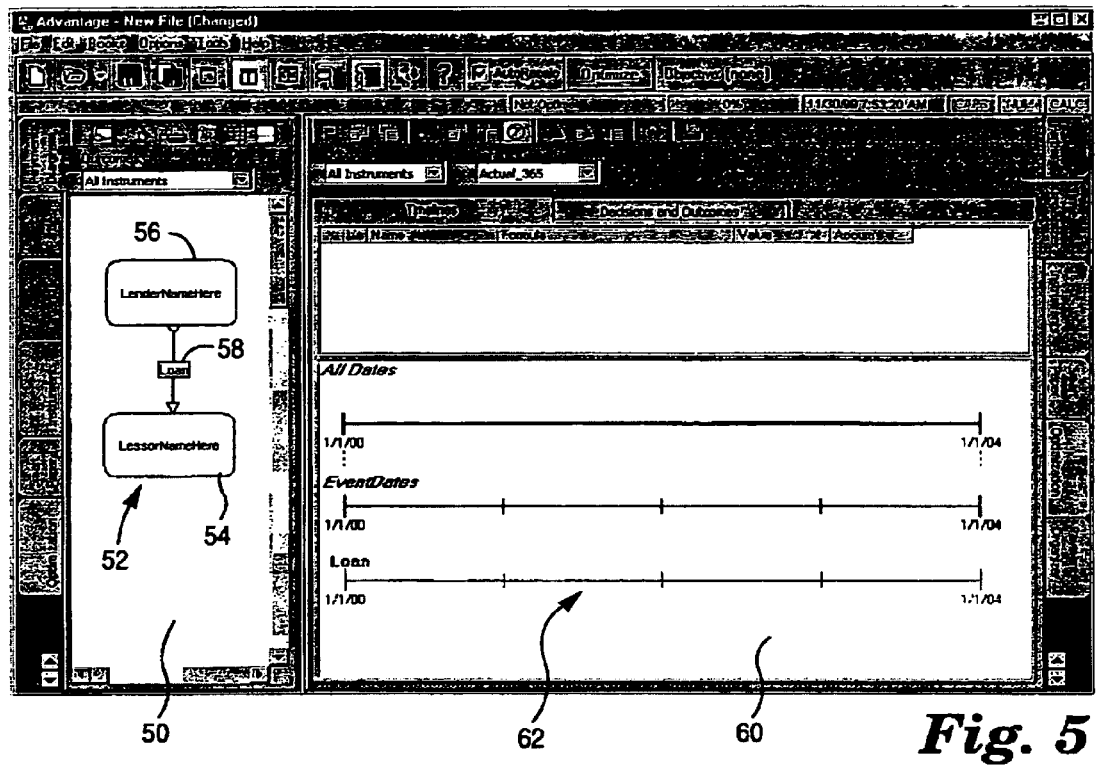
FIGS. 5–12 show, in a split screen format, exemplary information that is automatically generated by the engine in various chapters of the instant tool in response to creation of the exemplary graphical representation of a financial scenario shown in the Payment Diagram chapter.

In accordance with an important aspect of the invention, the Engine is operable, in response to creating of a graphical model, to automatically create useful information in certain of the other chapters. More particularly, in response to drawing an instrument in the Payment Diagram chapter, such as "loan" as shown in FIG. 5, the engine automatically generates time lines 62 in the Time Organizer chapter 60. This functionality is illustrated in the split screen view of FIG. 5, wherein the Payment Diagram 50 is shown on the left side of the display, while the Time Organizer 60 is shown on the right side of the display. The badged parameter in the instrument marks the most important cash flow which is displayed graphically in the Time Organizer. It is noted that the engine uses default data for generating the time lines of FIG. 5, and that the user can then edit the information, if necessary, to comply with the particular scenario being modeled.

Figure 6:
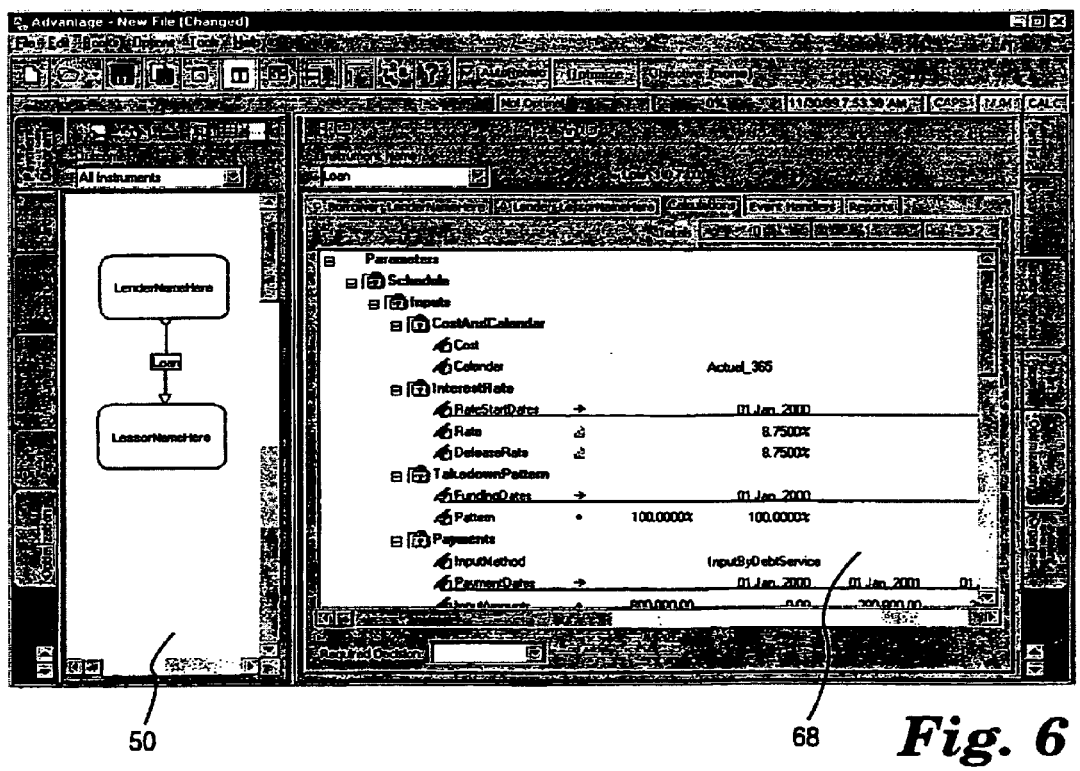
Figure 7:
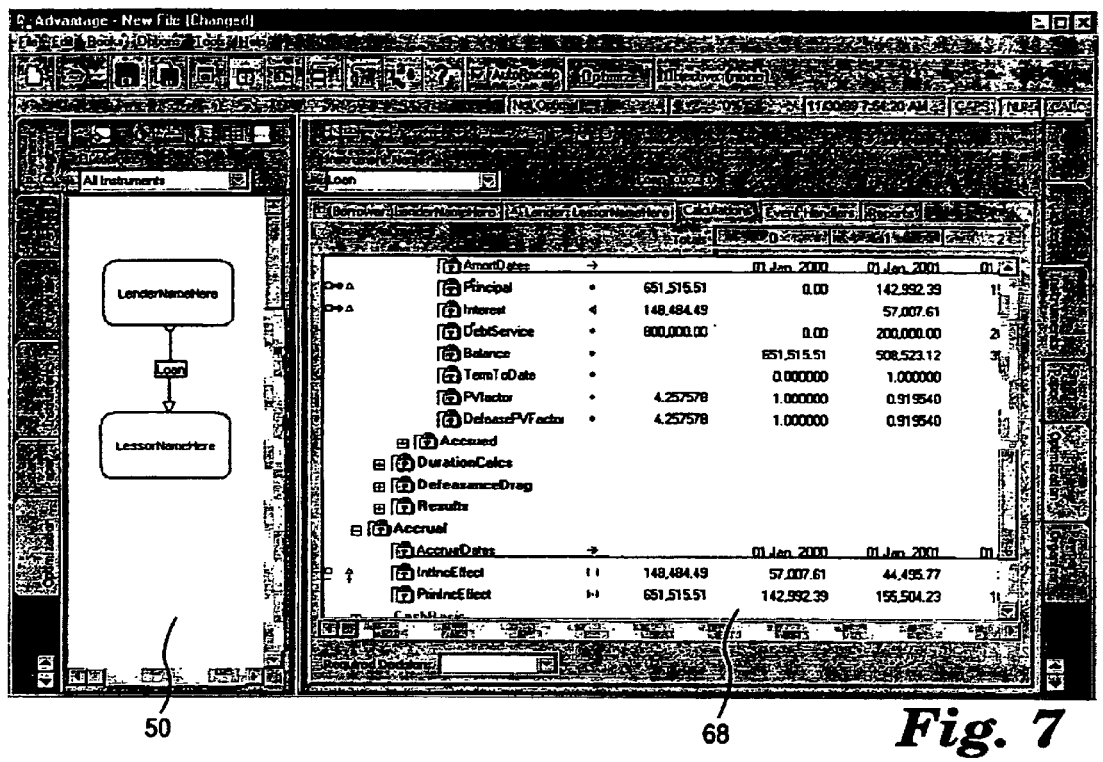

Similarly, FIG. 6 shows an instrument calculation that is automatically generated in the instruments chapter 68 in response to drawing of the "Loan" instrument 58 in the Payment Diagram chapter 50. Default settings are also used for this canned loan instrument, but after it has been created, the user can modify the data in the instrument chapter as required to correspond with the particular scenario being modeled. Thus, by adding an instrument in the payment diagram 50 the engine automatically generates the instrument definition including related calculation in the instrument chapter 68. FIG. 7 shows the badged parameters in the instrument of FIG. 6. The box to arrow graphic on the left side of the instruments chapter, as shown in FIG. 7, indicates the important cash stream which shows up in the cash link in the payment organizer and in the time organizer link. The triangles and squares combined with the plus and minus signs (also on the left side of the instruments chapter) show the tax effect which shows up as the income in the payment organizer.

Figure 8:
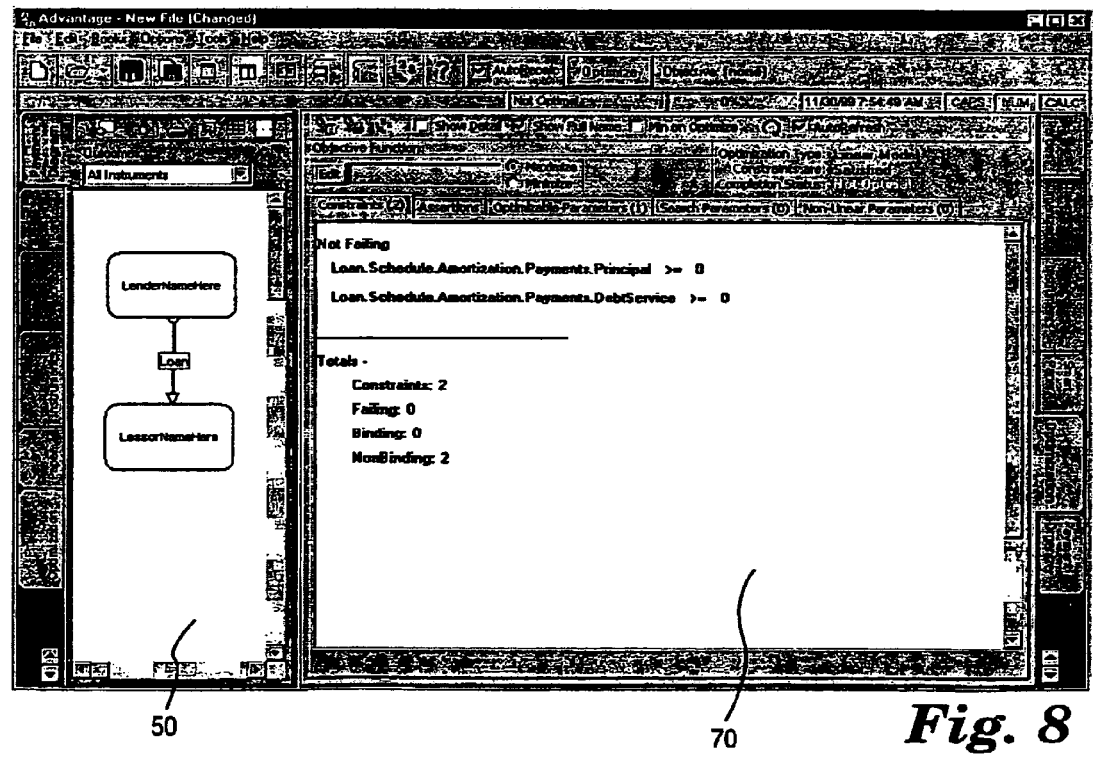
Figure 9:
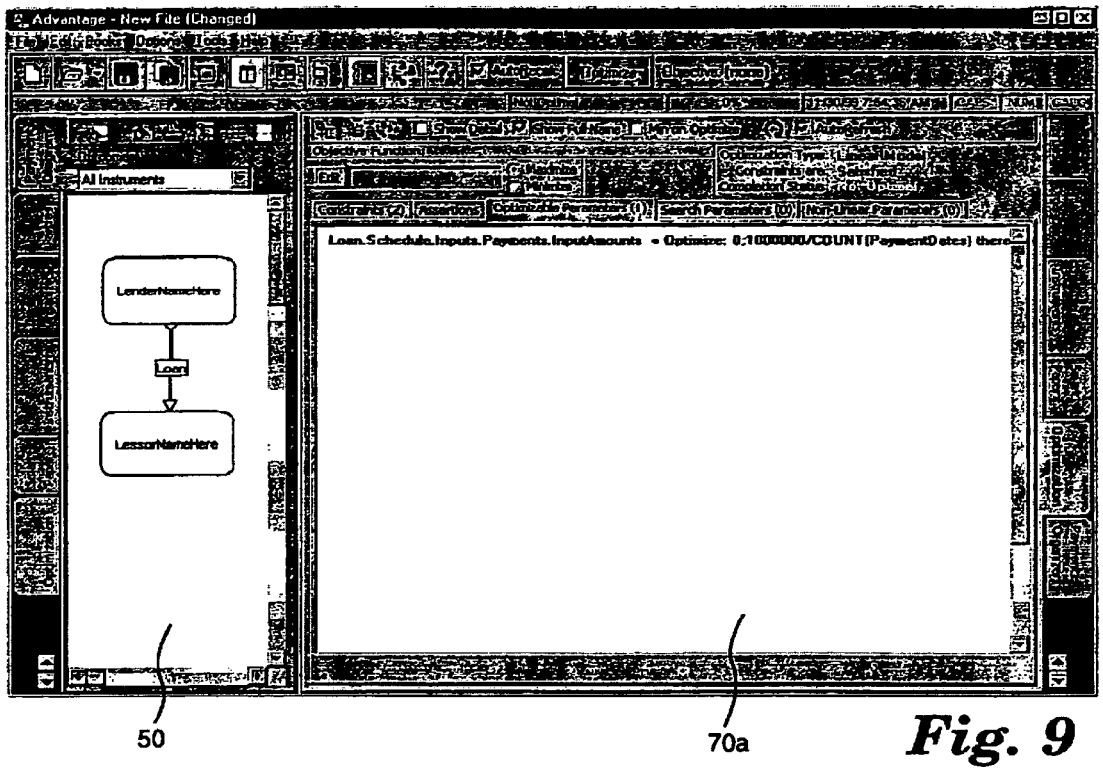

FIG. 8 shows the information automatically created in the constraints page of the optimization chapter 70 in response to drawing of the instrument shown in the instrument chapter 50. FIG. 9 shows another page, i.e. the optimizable parameter page 70a, of the optimization chapter 70 and the related information automatically generated by the engine in response to drawing of the "Loan" instrument.

Figure 10:
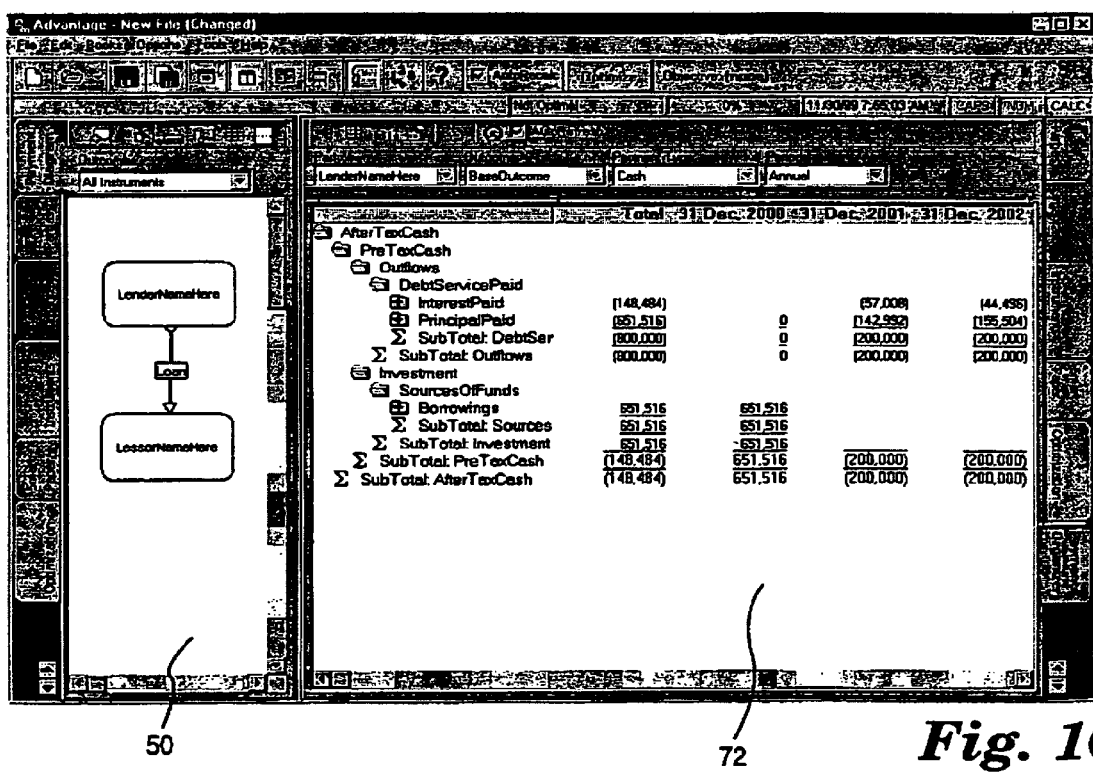
Figure 11:
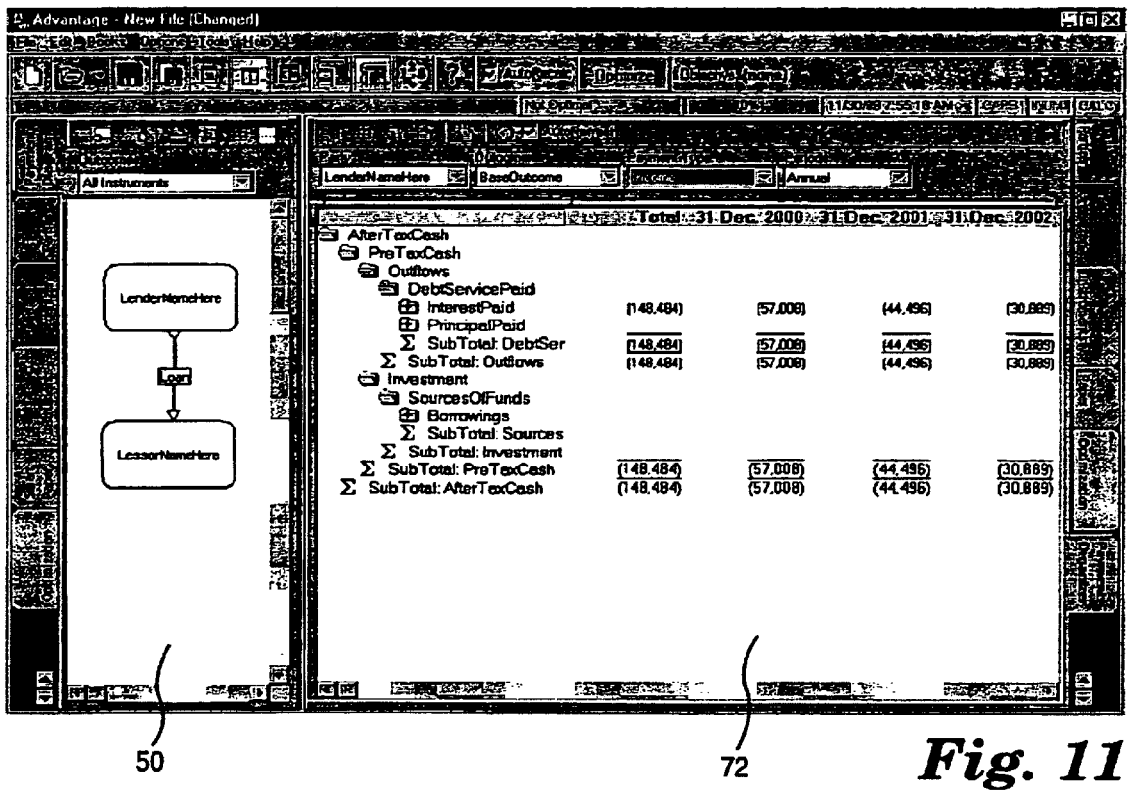

FIG. 10 shows the information (cash) that is automatically generated by the engine in the payment organizer chapter 72 in response to drawing of the "loan" instrument in the payment organizer chapter 50. Similarly, FIG. 11 shows the (Income-tax effects) payment organizer view which is also automatically generated by the engine. The user can switch between the view in FIG. 10 and FIG. 11 by modifying the "Payment Type" in the pull-down menu at the top of the Payment Organizer chapter 72.

Figure 12:
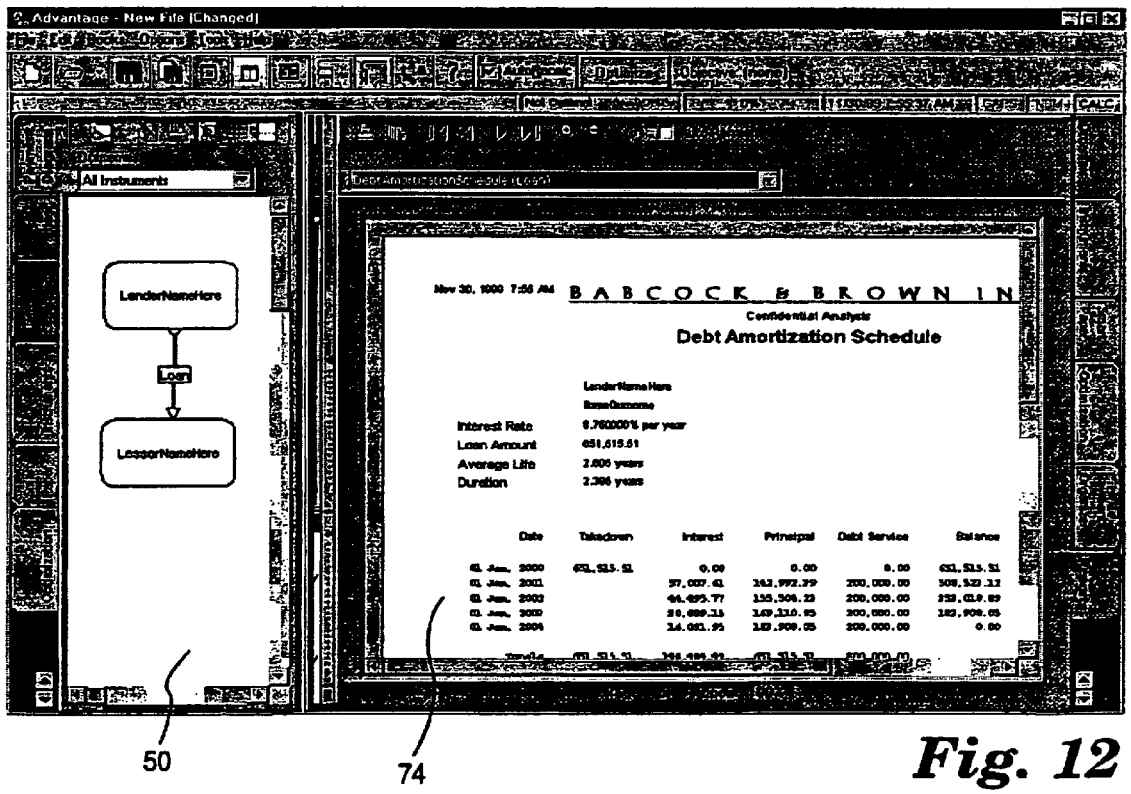

Finally, FIG. 12 shows the information that is automatically generated in the Reports chapter 74 in response to creation of the graphical party diagram in the payment diagram chapter 50 shown therein.

Of course, all of the information shown in FIGS. 5–12 is only exemplary, and is only based on the exemplary graphical representation shown in the payment diagram 50 which has the exemplary loan instrument. This information will, of course, vary depending on the particular instruments used with the tool and the particular application in which the invention is utilized.

EXAMPLE CASE

The following description provides an example of case or financial scenario modeled using the tool of the instant invention.

Figure 13:
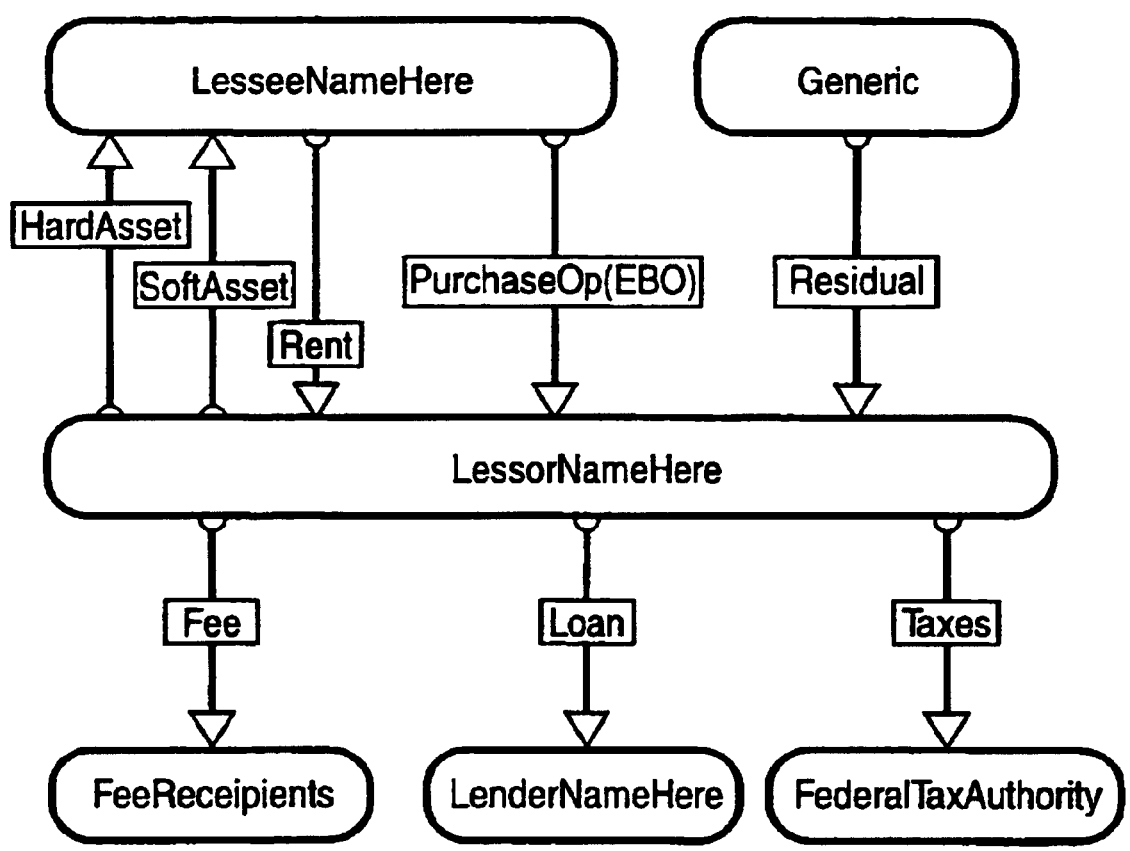
FIG. 13 shows a graphical diagram of an exemplary financial deal created in accordance with the instant invention.

This exemplary case is called a QTE or Qualified Telecommunications Equipment case. A graphical representation of this exemplary financial scenario is shown in FIG. 13. The party LessorNameHere is the client or main focus of the deal and is called the lessor. The lessor wants the tax effects associated with owning QTE equipment. The party LesseeNameHere, called the lessee, currently owns the equipment and thus has the tax effects. The lessor proposes a deal to buy the asset and lease it back to the lessee thus acquiring the tax effects. The lessee still gets to use the equipment. To get the lessee to agree to the deal, a portion of the money used to buy the asset goes to the lessee as well. The tool is used, in this example, to model the deal from the perspective of the lessor. The company, FeeRecipients, known as the advisor, has been hired by the lessor to arrange the deal and thus the fee is paid to it. Likewise, only the lessor is shown to pay taxes because the deal is from their perspective. FIG. 7 provides a graphic representation of this exemplary financial scenario or deal. The diagram was created in using the tool of the present invention.

The following steps present a high level description of what is happening in this deal:
1) The lessor borrows money from the lender (LenderNameHere in the diagram) to buy the assets.
2) The lessor buys the assets from the lessee as indicated by the HardAsset and SoftAsset lines (the direction of the arrow indicates which way the money flows, not the asset).
3) The lessee pays rent to use the assets.
4) The lessor pays taxes during the deal.
5) The lessor pays a fee to the advisor for arranging the deal.
6) At the end of the lease, the lessor sells the assets to another party (Generic in the diagram). This is indicated by the residual line.
7) At some point in the middle of the deal, the lessee can buy the assets back and terminate the deal. This is illustrated by the PurchaseOp(EBO) line.

Step 1—Draw the Diagram as Shown in FIG. 13 in the Payment Diagram Chapter.

Figure 14:
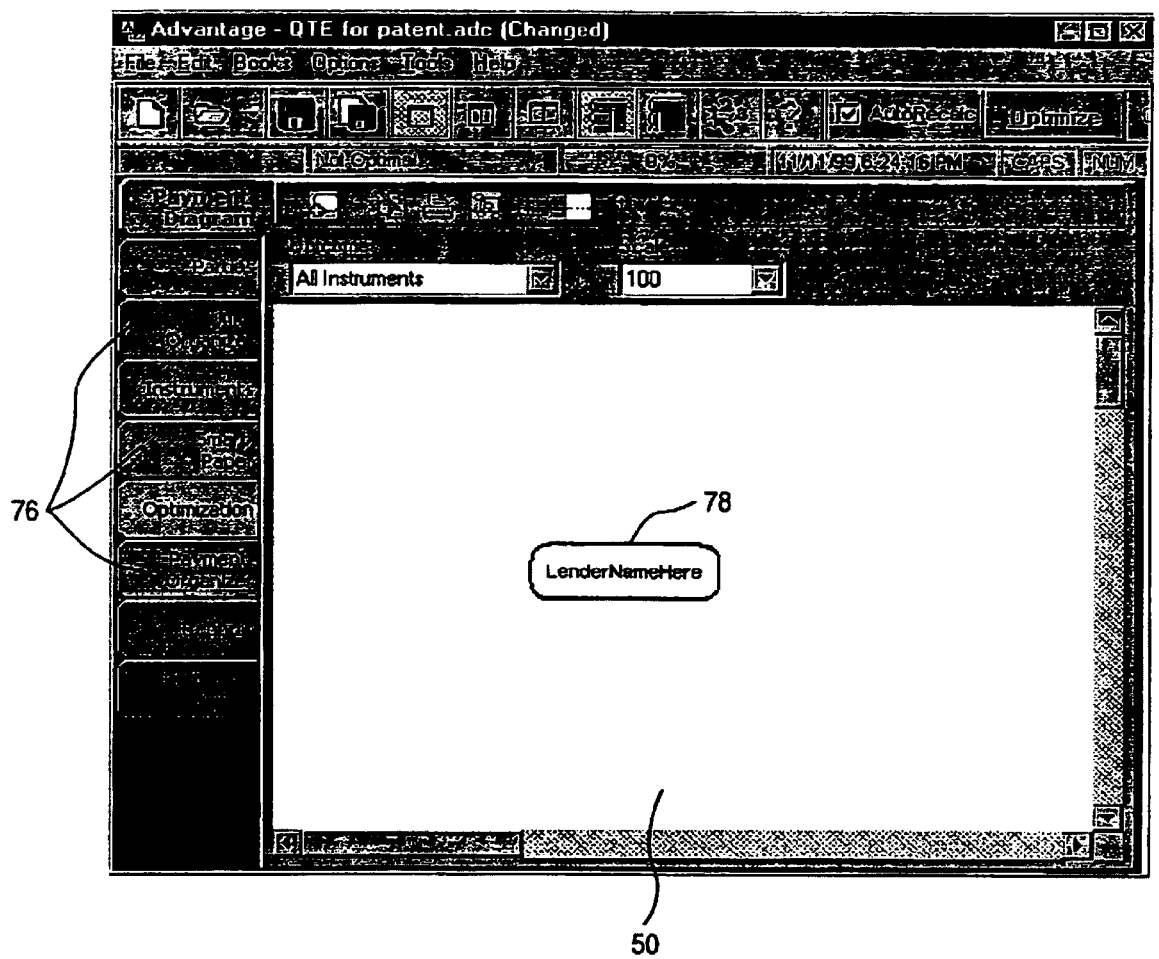
FIG. 14 shows a party graphic being made in the parties chapter as a first step in modeling the deal of FIG. 13, in accordance with the instant invention.

The first step in creating a case involves drawing the diagram shown in FIG. 13 using the Payment Diagram chapter 50 of the user interface. The basic steps for this involve adding the various parties to the diagram, as represented by boxes, and drawing financial instruments, as represented by directional arrows connecting the boxes. FIG. 14 shows the Payment Diagram interface used to create the diagram, and also shows the result of the first step executed in this example, wherein a first party 78 named "LenderNameHere" has been drawn in the Payment Diagram chapter 50 The white area of FIG. 14 is the drawing area where the diagram of the deal is created. The tools above the drawing area are used to create and view the diagram. For example, the magnifying glasses allow the user to zoom in and out.

This image also shows the general interface for the product. It is noted that not all figures herein show the full interface of the full chapter. In other words, some of the figures only show an enlarged partial view of the interface or chapter. The tabs 76 on the left side of the screen are used to navigate around the program to the different interfaces or "chapters" of the user interface. Each major step in creating a deal is represented by a chapter. The icons under the menu bar are general purpose tools used, for example, to save a case to a hard disk or load a new case.

To do this first step, the user clicks the party tool (the round box with a plus sign) and then clicks in the drawing area where he wishes to locate the party. He can then select from a list of predefined parties or enter his own.

When the user adds a new box to the party diagram, such as party 78, there is no specific action in the engine, except for the possible generation of a party object in the Parties Chapter. If this is a party that does not appear anywhere else in the payment diagram, then the engine adds a new section to the Parties chapter with two parameters which the user can then edit and augment. The two parameters represent, for example, the first month of that party's fiscal year, and the name of his tax counsel. This data is reflected in engine parameters to provide persistence to the data, and to make the data available to instruments which will be connected to this party.

Figure 15:
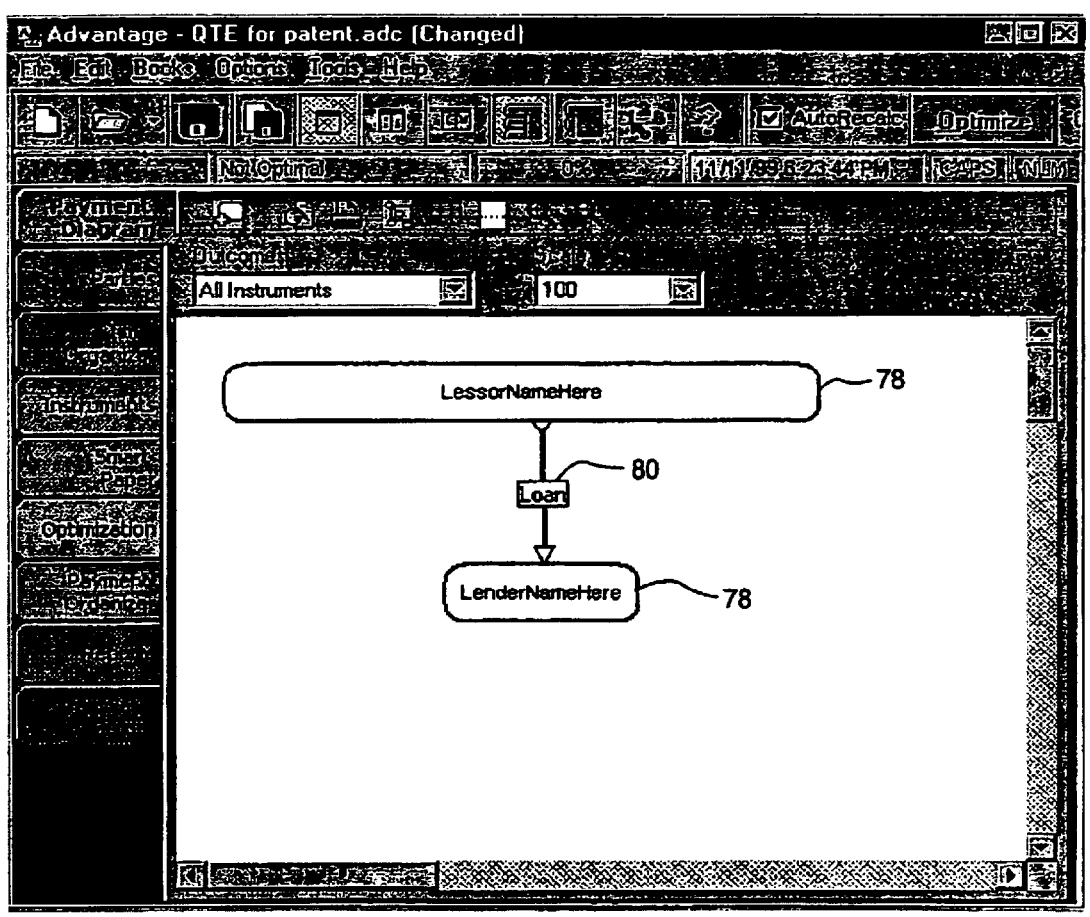
FIG. 15 shows a further step in creating a graphical modeling the deal of FIG. 13, wherein two parties and a financial instrument are shown, in accordance with the instant invention.

Referring now to FIG. 15, after adding a two or more parties 78, the user can then begin to add financial instruments 80. The user does this by clicking on the first party( the one who will be making payments), and dragging a line to the second party (the one who will be receiving the payments). The arrow indicates the direction the payments flow. FIG. 15 shows this next step with two parties and a single loan instrument. When considering the arrows of an instrument line, the loan is a misnomer because payments or money flows in two directions. The borrower receives the loan and then makes payments back. However, the convention used by this embodiment of the program is to show only the direction in which the loan is paid back.

When the user draws an instrument 80 on the Payment Diagram, the application creates a representative object in the engine to calculate and generate the calculations and cash flows for that instrument. More specifically, the client application tells the engine General Registry to create a new instrument object, which initially is an empty shell. The client application reads in from a data file the representation of the instrument that has been saved by the instrument designer, and splits this up into graphic and engine data and passes the engine part to the new Instrument object. The engine then reconstructs the instrument from this data; this includes a hierarchy of parameters and parameter lists, a couple of instrument party objects, and a default instrument handler. Each instrument party contains the role information needed to create the cash and tax implications for the party at one end of the instrument arrow. The default instrument handler contains the information needed on whether and how to truncate the flows in non-base outcomes. Each parameter's formula is parsed into its expression objects, and named references are registered with the general registry's name reference manager, which, if possible, resolves them, so that the parameter's values can be calculated when needed. As these references are resolved, links are made between the parameters' dependency managers so that changes are correctly propagated through the entire system. For each decision that the user has created in the time organizer, the engine creates an instrument handler containing the information on whether and how to truncate the flows for outcomes containing that decision. Each handler starts as a simple copy of the default handler, but can be changed by the user. The client tells the engine instrument object the names of the parties at each end of the arrow. The engine then looks in the parties data to find a section of data for that party, which it then uses to complete the instrument party role information (e.g. date of fiscal year end). The engine instrument synchronizer object then springs into action, generating the actual flow parameters for each party and outcome. The instrument party information is used to determine which parameters contain the cash and tax flows for that party. For non-base outcomes, the synchronizer searches for the first decision that terminates the flow, according to the instrument handlers. It then generates a truncating parameter (if necessary), and a final parameter which it identifies to the internal database by attaching badges indicating the party, cash or income classification, outcome, instrument name, other party and tax authority (for income flows). The engine internal database recognizes these new badged parameters and changes any collected data in (for example) yield calculation templates to update their values. This process also enables the payment organizer to update its display to show the new instrument.

The user continues to add parties and instruments until the deal is modeled fully as shown in FIG. 13.

Step 2—Define the Dates

Dates and timelines are defined in the Time Organizer as depicted in FIG. 16. In the top portion 82 of this chapter, the user defines single case dates known as Key Dates. The user clicks the add date tool (the calendar with a plus sign) and then enters a name for the date as well as the actual date. Similar to parties, the dates are stored in the engine and can be referenced by other parts of the case. The other tools next to the add date tool are used to modify the dates including changing or deleting a date.

In the bottom section 84 of the interface, the user defines the overall deal dates called the EventDates. This sets the basic start and end of a deal anrd also the periodicity (annual, quarterly). The user changes the EventDates by right clicking on the line and selecting "Edit timeline" from the menu. The other lines are for visual purposes only. All key dates defined in the deal are shown. Each primary cash flow for an instrument is represented by a line in the time organizer. Badging information stored within the engine for each instrument defines which is the primary cash flow for that instrument.

For this exemplary deal, the following changes are defined in the Time Organizer:

Closing: Dec. 30, 1998—the date the deal closes and all the transactions begin (every deal has a closing date)

EBO: Jan. 2, 2011—the date the lessee can option to purchase the assets back (EBO stands for early buy out)

Residual: Dec. 30, 2014—the date the lease ends

EventDates: from the Closing to the Residual—the main deal time line starts at the closing and continues annually until the residual date Once the EBO date is defined, it is turned into a "decision" by the engine, which means the deal splits in to two possible courses or "outcomes". The normal case, or BaseOutcome, means the deal comes to term and the assets are just sold to the market place. The EBO outcome occurs when the lessee purchases the assets prior to the end of the deal. For the purpose of financial analysis, all outcomes can be fully modeled to get the deal approved by the client. The outcome tool, the triangle with a plus sign (currently disabled in FIG. 16), is used to define an outcome.

When the user adds an outcome to the time organizer chapter, the engine performs numerous functions. More particularly, the engine creates a new outcome object to house data specific to this outcome, with links to the decision objects which comprise the outcome. For each tax-like instrument (for which the instrument designer has specified a "fresh copy for each outcome"), a complete copy of its parameter, party and classification data is generated. For each instrument, the instrument synchronizer generates new terminating parameters as necessary. These parameters terminate the flows generated by this instrument at the first decision contained in the new outcome that has been designated by the user as a terminating decision in the instrument's decision handlers. For each instrument, the instrument synchronizer generates new badged parameters to identify the flows to the internal database. These parameters take their value from the terminating parameters defined in the previous section (or the original parameters if not terminated), with possibly a sign change. They are given badges based on the data in the party and classification sections of the instrument; the categories are Party, Outcome, Cash or Income Classification, Other Party, Instrument Name and (for income classifications) Tax Authority. When the internal database receives the information about the new badged parameters, it signals all effected collector parameters that a change has occurred. These are parameters which have been designated as extraction parameters, or as formula parameters using one of the special "collect" functions. The next time that their values are requested, they will re-establish all links with badged parameters so that the new ones are included. The collector parameters signal a value change via their dependency managers to tell all other parameters whose value depends on theirs that a change has occurred. In this way the flows generated by the new outcome spread their effect throughout the model.

Figure 17:
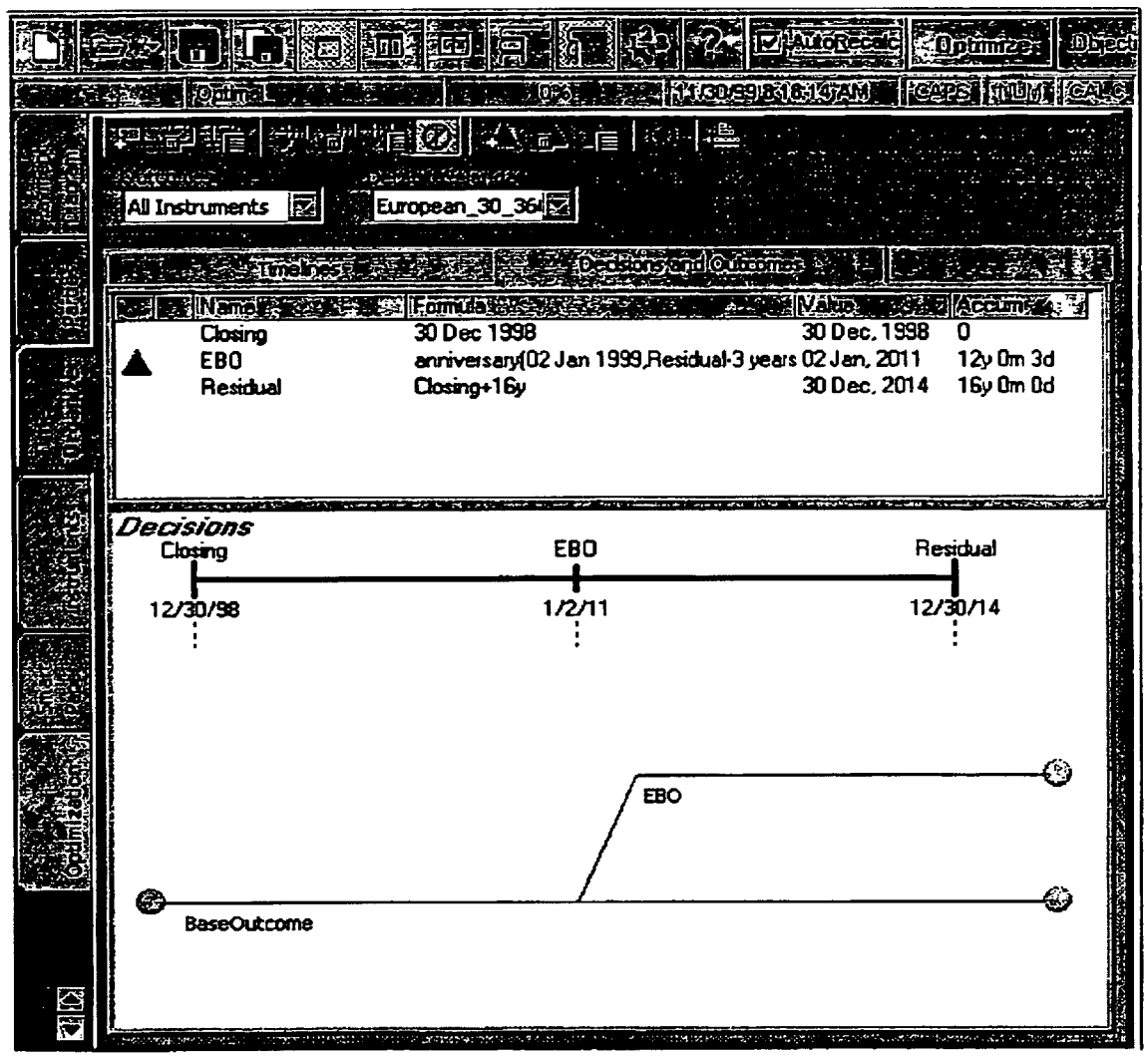
FIG. 17 shows another view of the time organizer of FIG. 16, where an early buy-out option is displayed.

FIG. 17 graphically shows the decisions and outcomes which result from the early buy-out (EBO) option in this example.

Step 3—Entering Instrument Data

Once the diagram is created and the dates are defined, the user next fills in all the data and calculations necessary to complete the deal. The first part of this is filling in instrument data. Instrument data is entered in the Instruments chapter as seen in FIG. 18. FIG. 18 shows the Calculations section of an instrument where data, such as the rate of a loan or cost of an asset, and calculations, such as the amortization of a loan or depreciation of an asset, are entered.

The first two tabs near the top of the figure and next to the "Calculations" tab are used to enter role information for each party associated with an instrument (as defined by the payment diagram explained earlier). In FIG. 18, the Borrower tab can be seen where information about the party borrowing the money for the loan is modified such as how the loan interest is deducted. Lender information is modified by selecting the next tab. The Event handlers tab contains the settings for how the instrument is processed if a different outcome is used. For example, loans are generally paid off if a deal ends early. The Reports tab lists the reports specific to the instrument, such as the loan payments.

Figure 19:
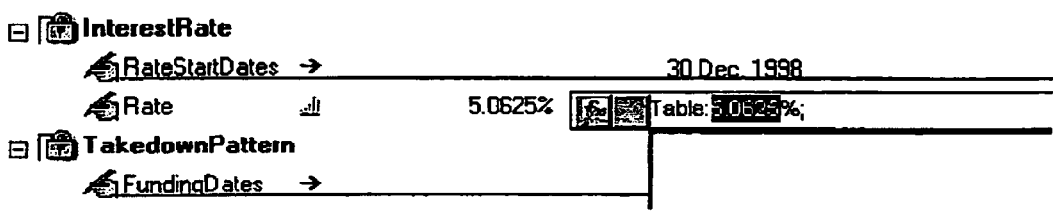
FIG. 19. shows an enlarged, partial view of the display screen of FIG. 18, wherein the interest rate is being modified.

Starting with the loan instrument, the only item which needs to change is the loan rate. The other default or initial values for the instrument are sufficient for how the loan should be setup in this deal. Money is borrowed at a fixed rate of 5.0625%. The steps are as follows: 1) Double click on the current value for the loan rate (this is the Rate parameter in the Calculations section of the Loan instrument); and 2) Change the value from the default value to 5.0625%. (See FIG. 19). It is noted that the formula includes additional syntax that indicates how the Rate parameter is to be used throughout the model.

When the user changes the Rate formula in the user interface, the engine will record the new formula for that parameter, parse it into its expression objects, and transmit a valuechanged message through the network of dependency managers for parameters whose values depend on this parameter. Each of these parameters will then know to recalculate its value when it is next requested.

To complete the instrument changes, data will need to be entered for several other instruments. Instrument data generally falls into two categories. It is either a fixed part of a deal such as the cost of an asset or the interest rate of a loan. Or it is an optimized value that gets calculated when the optimal solution is found. The instruments in this case are set up in the following way:

Fixed Data:
HardAsset—$700,00. The cost of the asset which is generally a given in the deal
SoftAsset—$300,00. The cost of the asset which is generally a given in the deal
Fee—This is 1% of the assets purchased and is negotiated with the client or lessor.
Residual—For this example, the residual is actually fixed at 20% of the cost of the assets.

Variable or Optimized Data:
Loan—The loan payments or debt service are optimized to satisfy the deal (see the optimization step).
Rents—The rent payments are likewise optimized to satisfy the deal.
PurchaseOp(EBO)—The purchase option payments which are used when the EBO is exercised are optimized as part of the deal.

No changes are needed in the Taxes instrument since this is based on the standard federal tax rate.

Step 4—Building Smart Paper

Any data or calculation not specified as date or in the instruments is entered in Smart Paper. Smart Paper is a calculation based feature very similar to a enhanced spreadsheet (more details on Smart Paper are provided below). However, while a spreadsheet is based on individual cells linked together strictly by formulas, Smart Paper formulas know about each other and about links to dates. More particularly, as explained above, Smart Paper is a non-cell based calculation interface where references are based on a hierarchical outline as opposed to a positional reference. The linking information is stored in the engine. For example, one formula may contain a set of values linked to the first date of every year for 20 years. A second formula may only need the value from a specific date, such as the fifth date, within the first formula. The second formula need only specify the specific date and the engine will search out the most appropriate value.

Figure 20:
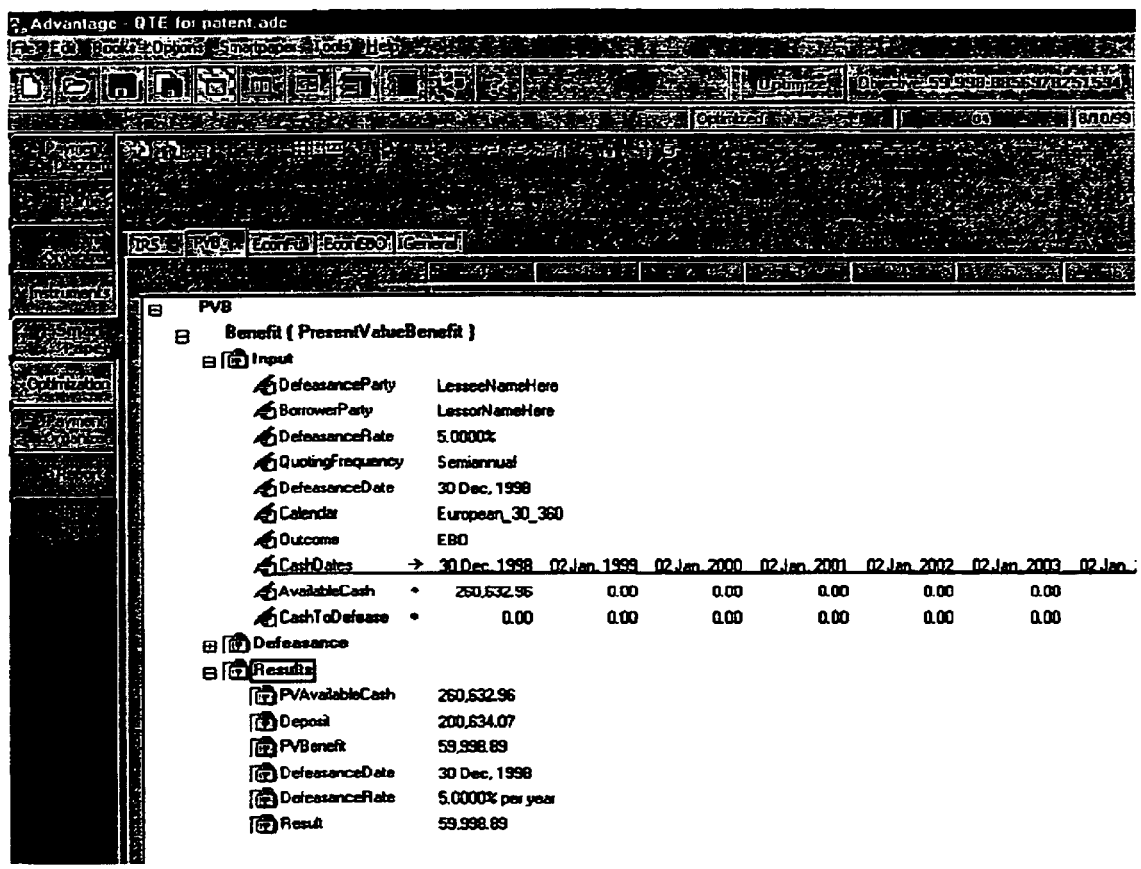
FIG. 20 shows a view of the smart paper chapter of the instant invention containing information from the exemplary deal of FIG. 13.

The Smart Paper in this deal is built up in two ways. First, the user has a variety of templates he can add that perform pre-defined calculations. Second, the user can create custom calculations or enter custom data into Smart Paper. FIG. 20 shows the interface for creating Smart Paper. The main screen with all the data and calculations is where the user creates his outline of data and calculations. The tools along the top are used to change the view of Smart Paper and to operate on specific entries in the outline.

Each tab is a different sheet of Smart Paper where the user can create his outline and enter his data and calculations. When the user adds a piece of Smart Paper, the engine creates a worksheet in the General Registry. As the user creates Headings and Parameters in the piece of Smart Paper, the engine creates mirroring Parameter Lists and Parameters. When a Parameter is created and named, the engine registers it with the name reference manager. This will attempt to resolve any outstanding references to this name by formulas in other parameters. It will also see if references to other parameters of the same name need to be more fully qualified to prevent ambiguities. When a reference to this parameter is resolved, the referencing parameter sets up a link between its dependency manager and that of the new parameters, so that any changes in value of this parameter will be signaled to the referencing parameter.

When the user specifies the formula for the new parameter, the engine parses it into its basic expression nodes. Any references to other parameters are registered with the name reference manager which will attempt to resolve it immediately. If it cannot be resolved immediately, then the name reference manager keeps the request as pending, in case it can be later resolved. Any resolved reference causes links to be set up between the dependency managers as described above.

As the user enters parameters into Smart Paper, the values of these parameters are immediately displayed. It does this by asking the engine to calculate the parameter's value, which triggers an evaluation of the parsed expression nodes. These nodes do the basic arithmetic operations, references to other parameters and evaluation of functions. The value returned can be either a scalar or some sort of array. Scalars are single quantities like numbers, dates, frequencies, elapsed times, character strings. Arrays are lists of these scalars.

In FIG. 20, we see that the user has set up five sheets of Smart Paper. The first one contains all the IRS related calculations which become important when optimizing the deal. A fully optimized deal has certain legal requirements it must meet. The next one calculates the present value benefit of the deal for the lessee. In fact, the entire purpose of this deal is to maximize the present value benefit. The next two sheets calculate the lessor's MISF yield for the EBO and BaseOutcomes. And the last sheet just has a general collection of data used throughout the deal. All parts of Smart Paper except the general section are created using pre-defined templates.

Step 5—Optimizing the Deal

Optimization is the process of imposing constraints or requirements on a case and the varying values and other parts of the case until the best result is found. By a constraint, it is meant, for example, that some cases fall under certain restrictions from, for example, tax laws relating to leasing and rents which must be satisfied if the case involves a lease or rents. The elements of a case that can be varied are called optimizable parameters.

In this deal, we are maximizing the present value benefit to the lessee. The following constraints exist on this deal and must be satisfied when optimizing to the best result:

IRS tests for profit, EBO compulsion, minimum investments and uneven rents
Rent payments must be greater than 0
Loan payments and the loan balance must always be greater than 0
Loan payments must be less than rents received
EBO payments must be less than the taxes paid by the lessor
The loan amount must be less than or equal to 80% of the asset cost
Standard constraints on the calculation of a MISF yield for both the BaseOutcome and the EBO outcome The following parameters are then varied to reach the optimal deal:
The loan payments
The rent payments
The purchase option payments
MISF minimum investment balance The optimization screen is divided into several pages by the tab across the top of the screen, as shown in FIG. 21. The "Constraints" tab which is selected and shown in FIG. 21 shows those aspects of the deal which can't change or must be satisfied. These constraints are added to parameters spread throughout the instruments and sheets of Smart Paper. The engine collects these and displays them in a precise form for the user to view and evaluate. The Optimizable Parameters tab lists those items which can change.

The other tabs provide other relevant information to help the user evaluate his model. The Objective Function shows what is being optimized and whether a maximum or minimum value is sought. The user simply clicks the Optimize button near the top of the screen to start an optimization.

When the user hits the optimize button, the engine analyzes all the parameter definitions and constraints that the user has entered, and tries to set up a linear (or mixed integer) programming representation of these suitable to be sent to the CPLEX linear optimizer. Assuming that this can be done, it sends the model to CPLEX, gets the results back and puts the resulting values for optimizable parameters back into their formulas.

Step 6—Viewing Output

The final step is viewing the data either in the reports chapter or in the payment organizer. A report from the reports chapter is displayed in FIG. 22. The tools are provided to allow the user to view different aspects of the report including zooming in and out or printing the report.

The data for a report is collected directly from Smart Paper and instruments. The only function the reports chapter performs is formatting the data for professional output. Likewise, the Payment Organizer chapter, allows the user to view the data and cash flows according to a specific party, outcome and time frame within the deal. This again is only a viewing interface which collects data directly from the data and calculations entered in other parts of the model. The Payment Organizer interface is displayed in FIG. 23. FIG. 23 shows the annual cash flows for the lessor party from the base outcome of the deal. The user changes the view by manipulating the various controls provided at the top of the screen.

As can be seen from the example case above, the user can model a financial scenario easily and quickly using the tool of the present invention.

SMART PAPER EXAMPLES

The following are examples demonstrating the functionality of the worksheet section or Smart Paper feature of the instant invention.

Smart Paper is a non-cell based calculation interface where references are based on a hierarchical outline as opposed to a positional reference. FIGS. 24 and 25 show a simple, example piece of Smart Paper created in accordance with the instant invention, and demonstrates some of the benefits of the non-cell based formulas used therein.

The smart paper example of FIGS. 24 and 25 show a portfolio of airplane rents. Under the heading Aircraft, we see rents for Plane1 and Plane2. The rents for each aircraft are paid on different dates and for different amounts. The Totals section sums all the dates that the rents are paid on and shows the rents paid on each date. In a sense, this acts as a summary table. The AnnualTotals section refers directly to the Totals section but uses an annual date stream as opposed to the dates each rent is paid. This effectively shows the viewer how much rent is paid each year regardless of the specific day that rent is paid.

FIG. 24 shows the values or results of the formulas created in Smart Paper, while FIG. 25 shows the corresponding (or hidden) formulas used to obtain the values in FIG. 24. It is noted that the actual rents are just dummy values used for illustration purposes. The two functions used in this example are Subtotal and Union (see description of Formula Language below). Union collects a bunch of date streams and combines them into one. Subtotal searches all the parameters underneath a heading and collects values from all the parameters with the same name as specified for the function.

From this example, we see some of the benefits of the non-cell based worksheet of the instant invention. For example, if another plane is added under the heading Aircraft, and the rent stream is called Rents, then the TotalRents parameter will always show the total of all rents, because the Subtotal function finds all parameters named Rents under the Aircraft heading. Likewise, if a rent payment is added to any of the existing Rents parameters, TotalRents is automatically updated. In a conventional spreadsheet, solving these two problems would ultimately involve inserting cells or rows or columns and updating formulas that sum the data. The hierarchical nature of the outline, made possible by Smart Paper, lets the same name be used more than once in the manner indicated above. As a result, a very convenient, flexible and powerful calculation interface is provided by the Smart Paper chapter of the instant invention.

This example also demonstrates the advantage of the dynamic non-cell based formulas used in Smart Paper. For example, the AnnualTotals collects all the rents paid for each year. In a spreadsheet, the user would have to examine each rent stream and individually select which rent payments fall in each year. If the Annual table then needed to be changed to quarterly, the user would have to go back and re-do the entire process from scratch. However, with the non-cell based worksheet of the instant invention, formulas know how to link values to dates so that the final formula can interpret the input values based on the actual date rather than the position the date falls in a spreadsheet, which relies on positional references rather than the hierarchical references of the instant invention.

Similar to the AnnualTotals, the TotalDates parameter benefits from non-cell based references if a new date is entered for any rent stream. The TotalDates will always collect all rent dates regardless of how many or few there are.

A second smart paper example is shown in FIGS. 26 and 27. This example relates to a simple loan structure in which calculations of the loan amount and its amortization is based on a present value (PV) factor and a fixed debit service. FIG. 26 shows the actual values in this smart paper example, while FIG. 27 shows the underlying formulas used to calculate the values. The following table explains the particular headings, parameters and formulas used in the example of FIGS. 26 and 27.

SIMPLE LOAN EXAMPLE

| Heading/Parameter | Details |
| --- | --- |
| Inputs.Scalars | |
| Cost | Amount on which loan will be based (i.e., the cost of an asset) |
| Calendar | Calendar day-counting method to use in the calculations that follow. Refers to Time Organizer default calendar setting. |
| Inputs.Rate-Schedule | |
| RateDates | Dates that interest rates are set and the periods to which those rates apply. First and Last links the first and last dates of the current schedule with those of another schedule, which in this instance is the PaymentDates index in the Inputs.Payments section. |

-continued

| Heading/ Parameter | Details |
|---|---|
| Rate | Interest rates indexed to RateDates<br>Table means a given value applies to every day in its period.<br>For uses a repetition value to map the same value to a certain number of periods.<br>The semicolon (;) symbol stops the current sequence of values.<br>Thereafter maps the last given value to remaining index dates. |
| Inputs.-Payments | |
| PaymentDates | Dates of payment and the periods to which those payments apply.<br>StartDates: recognizes the dates that follow as first days of periods. |
| InputAmounts | Debt service paid, based on asset cost and number of periods.<br>COUNT determines the number of elements in an array. Therefore, Cost/COUNT (PaymentDates) is 1,000,000 divided by 11.<br>Thereafter maps the given value to each remaining period. |
| Amortization | |
| AmortDates | Dates of debt service calculations and the periods to which those numbers apply.<br>ActsLike ensures that any change in the PaymentDates prefix or dates is automatically passed on to the current parameter. |
| Principal | Applied to balance after interest is paid. |
| Interest | Interest due for each period, paid in arrears.<br>Arrears applies each amount to the period that precedes the index date.<br>Previous defines an array in which each value refers (relative to its position on the index) to the value of the argued parameter in the preceding period.<br>For example, Interest 30,036.66 on Jul. 01, 2000 refers to Balance 730,064.69 on Jan. 01, 2000.<br>PeriodInterval returns the length in years of a period on the current date index. The length is .5 due to the semiannual dates of the AmortDates index.<br>The offset of −1 instructs the application to use the previous period for its calculation, since interest is paid in arrears. |
| DebtService | Direct reference. |
| Balance | Remainder after payment of principal.<br>Previous defines an array in which each value refers (relative to its position on the index) to the value of the argued parameter in the preceding period.<br>The second argument for the Previous function tells the application to return the value of the LoanAmount parameter to the first period. Thereafter, each new balance is reduced by principal paid during the current period. |
| PVFactor | Constructs a PV curve.<br>For Previous, refer to Balance parameter detail.<br>For PeriodInterval, refer to Interest parameter detail. |
| Result | |
| LoanAmount | Loan amount based on the PV of the total Debt Service payments.<br>SUM returns the total of all its arguments; i.e., the sum of the products of all debt service payments and the corresponding PV factors. |

A third smart paper example is shown in FIGS. 28 and 29. This third example illustrates ways in which smart paper can be used to determine the nominal daily present value (PV) and investor rate of return (IRR) for all pre-tax and after-tax cash flows with respect to an investment. Again, FIG. 28 shows the actual values, while FIG. 29 shows the underlying formulas used to calculate the values. The following table explains the particular headings, parameters and formulas used in the example of FIGS. 28 and 29.

PRESENT VALUE AND IRR EXAMPLE

| Heading/ Parameter | Details |
|---|---|
| Inputs | |
| Investor | Name of party whose investment is to be analyzed. Selected list member from category "Party". |
| Calendar | Day-counting method to use in calculations on this sheet of Smart Paper. Selected list member from category "Calendar". |
| CashFlow_Summary | |
| Project_Dates | Dates returns the dates of flows found by the CollectPayments function.<br>CollectPayments identifies all payment flows classified as AfterTaxCash for the Investor parameter. |
| Investor_PTCF | Identifies payment flows classified as PreTaxCash for the Investor party. |
| Investor_Taxes | Identifies payment flows classified as Taxes for the Investor party. |
| Investor_ATCF | Identifies payment flows classified as AfterTaxCash for the Investor party. |
| IRR_Calculation | |
| FirstIRRDate | MonthEndOf returns the last calendar day of a month defined by the First, Dates, and CollectPayments functions. One month is subtracted from the result.<br>First(Dates(CollectPayments . . . )) finds the first date among the dates of all payment flows classified as AfterTaxCash for the Investor party. |
| LastIRRDate | As above, except the month for the MonthEndOf function is defined as the Last of all dates for payment flows classified as AfterTaxCash for the Investor party. |
| IRRDates | Starting and Ending refer to the dates defined above to specify the First and Last dates for date stream.<br>Monthly specifies that dates continue monthly from the first date in the stream. |
| InvestmentBalance | Cumulative returns the accumulation of all Investor_ATCF values up to each period. The cumulative Earnings values are added to the result. |
| Earnings | Arrears recognizes that each value occurs in arrears. For example, the value on Mar. 31, 1999 applies to the period that began Feb. 28, 1999.<br>Previous defines an array in which each value refers to the product of InvestmentBalance in the preceding period multiplied by 13.6156% (NominalIRR_UsingSearch) times the PeriodInterval for the previous period.<br>PeriodInterval returns the length in years of a period. With monthly dates and a US_30_360 calendar, the length is 0.083 . . . |
| PV Calculation | |
| PVRate_Effective | NoIndex: recognizes the value that follows as a scalar, i.e., a single value that is independent of the current date index. |
| PVRate_Nominal | As above. The formula that follows converts an annual rate into a nominal rate. |
| PV_Dates | Starting and Ending refer to names of key dates in Time Organizer to define the respective first and last dates in the date stream, with monthly dates in between. |
| PVFactor | Semicolon(;) stops the current stream. In the subsequent stream:<br>For its first value, Previous divides 1 (the value of the preceding period) by the sum of 1 + 9.5690% times the period interval value.<br>See PeriodInterval in IRR_Calculation.Earnings above.<br>Thereafter, Previous uses the result of the preceding period in the calculation for the current |

-continued

| Heading/Parameter | Details |
|---|---|
| Base_PTCF | period.<br>Simple reference. |
| Discounted_PTCF | Simple arithmetic. |
| Base_ATCF | Simple reference. |
| Discounted_ATCF | Simple arithmetic. |
| PV_Summary | |
| PVofPTCF_<br>UsingFunction | Daily_Present_Value uses the value of PVRate_Nominal to calculate the daily present value of Base_PTCF (the base pre-tax cash flow) as of the Closing date.<br>Closing is not defined on this sheet; it refers to a key date in Time Organizer.<br>The function uses the Inputs.Calendar setting for the day-counting metrics. |
| PVofPTCF_<br>UsingSP | Sum returns the sum of all values in the Discounted_ATCF parameter. The result is the same as the result of the Daily_Present_Value function as argued above. |
| PVofATCF_<br>UsingFunction | See PVofPTCF_UsingFunction above. |
| PvofATCF_<br>UsingSP | See PVofPTCF_UsingSP. |
| IRR_Summary | |
| NominalIRR_<br>UsingSearch | Search performs iterative calculations until it finds a nominal IRR rate between 10% and 200% that makes the last investment balance equal to the target value of 0.<br>The search increment accuracy is 1e$^{-8}$. |
| NominalIRR<br>UsingFunction | Monthly_IRR calculates the nominal monthly investor rate of return using the dates and values of the Investor_ATCF parameter. The result is the same as the search iteration method as argued above. |
| EffectiveIRR | Simple arithmetic to convert the nominal IRR to an annual IRR. |

As can be seen from the examples above, the Smart Paper feature of the instant invention provides a very useful calculation interface and tool. It is noted that the Smart Paper tool can, in accordance with the instant invention, be used independently from the modeling and analysis tool of the instant invention as an improvement to spreadsheet applications.

The Engine

As explained above, the graphical user interface and the engine provide an intelligent interface which enables data to be generated which models the deal in response to graphical modeling of the deal by the user. Thus, the graphical model not only provides a visual representation of the deal, but it also causes the engine to generate useful information which at least partially model the deal based on the information the engine is able to obtain from actions performed by the user during creation of the graphical model of the deal.

In the preferred embodiment of the instant invention, the engine operates in accordance with the description below. More particularly, the engine is a computational server designed to support client applications wanting spreadsheet-like formula evaluation, manipulation of indexed streams of quantities and linear and mixed integer programming optimization. The engine has the following main features:

The engine is designed as a COM server which can be initiated either in-process or out-of-process. In the latter case, it can be either local or remote, and can handle multiple clients.

The engine has a hierarchical organization of data; at the topmost level the predefined general registry can contain multiple worksheets and instruments; these can contain an arbitrarily deeply nested hierarchy of parameter lists, each containing parameters and other parameter lists.

The engine has interfaces which stream in or out all of the data that has been specified by the client in the form of an indexed bit stream. This enables the client to save and restore cases in files. The index can be used by the client to view the structure of the data and compare files; it is used by the engine to recover as best it can from a corrupted bit stream. Copies of each index entry are included in the bit stream so that a client may attempt to recover from a corrupted index.

Parameter lists may be independently streamed in and out. This enables the client to maintain a library of templates, which are sets of parameters which can be instantiated into any case. Instruments may also be independently streamed in and out. This enables the client to maintain a library of instruments which can be instantiated into any case.

Each parameter is a fundamental calculation unit. It has a name by which it can be referred to by other parameters, a value, and possibly a means of calculating that value. Parameters can have badges identifying them to the internal database. Each badge is a list of "category=member" specifications, where the list of possible categories is defined by the client, though there are specific categories assumed by instruments. The tool uses categories like "cash classification", "party" and "outcome" to model the flows of a financial model. Parameters can be designated as defining results. Each result is attached to a specific name, party and outcome. The result parameters can then be collated by the client into capsule summary reports, for example. The values manipulated by the parameters can have many types. Some are single quantities (scalars) representing numbers, logical values (true and false), dates, time intervals, frequencies (annual, monthly, etc.), character strings and enumerated types. Other values are arrays, plain, sorted or indexed. There are also some values which are neither scalars nor arrays, but become indexed arrays when referred to from a keyed parameter. These are used to represent income that will automatically be accrued, for example. There are special values to represent null, which is like an empty cell in a spreadsheet, and the results of calculation errors (e.g. divide-by-zero).

There are some built-in enumerated types (e.g. "calendar"), which enumerates the different ways of calculating the length of time between two dates, and the client can create its own using special list-definition parameters.

A plain array is a set of values indexed by the natural numbers (1, 2, 3, . . . ). Normally there is only a finite number of elements in the array, but limited support is provided for infinite arrays which are regular beyond a certain point. A sorted array is always in ascending order of its elements, with no duplicates; it is used for streams of dates representing events in a financial model. An indexed array, or stream, is an array which is attached to a sorted array for indexing purposes. This is used to represent streams of cash flows in a financial deal, where each flow is attached to a date. The elements of arrays can be other arrays, thus providing support for multi-dimensional arrays.

A keyed parameter is a parameter that has been connected to another parameter for the purposes of providing a key (or index) for its array value. Normally, the key parameter has a date stream (i.e. a sorted array of dates) as its value, and these represent the dates of the flows defined in the keyed parameter. When a keyed parameter refers to another parameter in a formula, it triggers special calculations to convert the keys. This is normally an "accumulate to date" algorithm, but can be changed to effect accrual, table lookup, interpolation and extrapolation by using formula prefixes.

The normal rules of arithmetic have been extended to handle all the different types of values, wherever possible. Thus a date and a time interval can be added to produce another date. A scalar can be added to an array (it is added to each element of the array). Two arrays can be added by adding corresponding elements. If these are indexed arrays, then the corresponding elements are found by matching the indexes (i.e. two streams of payments are added by adding the payments on the same dates).

Parameter values can be specified in several ways. The client could simply specify a value, or it could specify a way of calculating the value. A formula parameter has a formula specified, which is an algebraic combination of constants, references to other parameters, and functions. A copied parameter simply duplicates the value of another parameter. An extracted parameter is designed to extract data from the internal database. In that case, the client specifies a list of "category=member" specifications and the value is calculated by matching these requirements with the badges of all parameters, and adding up those which match. This enables the client to request, for example, all of a certain party's rental income, without knowing the details of the instruments in the model.

The formula language includes an extensive set of functions to provide spreadsheet capabilities for manipulating data. Also included are functions for manipulating dates and arrays. The formula language also includes a set of prefixes specified at the beginning of the formula. These prefixes affect the way that the parameter is handled in references by other parameters, and can trigger automatic accrual, table lookup, interpolation and extrapolation. The prefixes are also used to specify variability during optimization and to trigger search and repetitive calculations.

In addition to the built-in functions, the client can define custom functions. These are named objects created in a worksheet which can then be referred to from any worksheet in the same way that a parameter could be, except that the reference is followed by a list of arguments. The definition of the custom function specifies how the result of the function is to be calculated from its arguments. Arguments can be specified as mandatory or optional, with a default value.

There is a special formula syntax used to specify date streams and arrays of values. This uses keywords like "starting", "ending", "then", "also" to make the specification of these types of values easier and more understandable. The engine can provide the client with detailed parsing information about formulas. This can be used to write formula wizards. The engine parses each formula into a tree of basic expression nodes. Each expression node handles a specific job like addition, multiplication, references to other parameters, function evaluation, etc. Parameters can refer to themselves in expressions with array values provided that they use either the "previous" or "next" function to avoid a logical circularity. In this case, the engine duplicates the expression tree for each element in the array (normally for each date), so that the expression nodes can be evaluated without encountering circular reasoning. More generally, a set of parameters can form a self-referential group, triggering duplication for each parameter in the group.

Each expression node keeps its calculated value until it is invalidated by a client change. This "intelligent recalculation" minimizes unnecessary repetition of calculations. When a formula refers to another parameter, it does so by specifying the other parameter's name, possible qualified by the names of its worksheet or instrument and levels of the parameter list hierarchy. Qualifiers are other names preceding the parameter name, separated by periods. Many levels of qualification are possible, e.g. "Loan1.Calculations.Amortization.Interest". Internally, the general registry has a name reference manager which maintains all these references. As parameters or parameter lists are created, destroyed and renamed by the client, the references get automatically updated. Unnecessary qualifiers are removed. Qualifiers are added if the original reference becomes ambiguous, thus maintaining the intended parameter linkages.

Each parameter has a dependency manager which handles the invalidation of expression nodes when the client changes a parameter. When the name reference manager resolves a reference, the target parameter sets up a link between the source's and target's dependency managers. If the source value changes, an event is triggered in its dependency manager which is transmitted via the link to the target; in turn this is passed on to the target's dependents. The dependency managers can also provide the client with lists of dependents and precedents for any parameter.

Dependency managers are also created for parameter lists, worksheets, instruments, and indeed the general registry. Changes are propagated up the parent chain so that each level knows when there has been some change inside them. This information can be tapped by clients to provide an intelligent refreshing mechanism; i.e. don't bother to redraw interfaces for objects which have not changed. The client requests a modification server for any level from parameter up to general registry. This modification server can be polled to determine whether there has been any change since the last poll.

Search parameters are formula parameters with a search prefix. There are three kinds: the optimization search, the targeting search and the maximization search. The optimization search only uses the first three arguments (low, high and accuracy) to the search prefix; it has no effect on calculations outside of the optimizer. The other types of search specify a target formula as the fourth argument. The targeting search specifies a value to target in the fifth argument, while the maximization search uses one of the keywords "maximum" or "minimum" as the fifth argument. Whenever a non-optimizing search parameter's value is requested, it iterates guesses for its value until the target formula is equal to the target value, or maximized, or minimized, depending on the fifth argument. Its value is saved until the dependency managers invalidate it, to avoid pointless recalculation.

The targeting search preferably uses third-party software which is designed to find the zeroes of functions. This software does a good job if the function is monotonic. However, it can get confused by non-monotonic functions which may have several solutions. The maximization search uses a custom algorithm which uses quadratic interpolation to refine the guesses. It depends on the function being fairly well-behaved as well. However, any suitable application can be used to perform this function.

The engine has a facility for collating multiple parameters into a single date-indexed table. It is called a parameter date table, and there is one in every worksheet (more are available on request). The client specifies which parameters it wants in the table, and the engine collates their dates and outputs a combined list of dates and a matrix of values. If the client wants to collate the data in regular intervals (e.g. annually), it can specify any number of date buckets; these override the table's normal "daily" rule.

The engine maintains a set of client-specified numeric formatting rules. These can be specified at any level of the data tree, from parameter up to general registry. The client can then request the effective formatting for any parameter, and use it to format numeric values using special engine calls. The facilities include comma insertion, fixed number of decimal places, prefixes and suffixes, percentages and scaling.

The internal database uses a bill-of-materials structure to enable parameters to collate data which has been identified via badges on parameters. Inside each category there are members which can be connected in a directed a cyclic graph structure, with numeric coefficients applied to each link. Thus a category representing the parties in a deal can establish ownership links between the parties, e.g. A owns 50% of B. When a parameter which has a badge specifying party B is extracted by a parameter requesting flows for party A, its values will automatically be multiplied by the 50% factor. The links are also used to establish rules on the cash classifications, like "after-tax cash" equals "pre-tax cash" plus "taxes". The categories and members are completely arbitrary, and maintained by the client. An interface is provided to stream the entire table in or out, so that the client can save a default table in a file.

Parameters can extract data from the internal database either by designating them as extraction parameters, or by designating them as formula parameters and using one of the "collect" functions. Either way, the parameter specifies a list of category-member pairs and receives back from the database a list of parameters matching those specifications, with corresponding coefficients, and it then combines their values to get a value.

Parameter lists can be given an activation formula by the client. This is a formula that should evaluate to true or false. When the formula evaluates to false, the parameter list and all of its contents are labeled as inactive. Inactive parameters do not have values. If an active parameter tries to reference an inactive one, it will get an error value. Clients can use this facility to de-emphasize blocks of the model that are not currently being used, and prevent useless calculations from slowing down the program. There are several restrictions on the formula that can be used—for example, it must not refer to a parameter inside its own parameter list. Invalid formulas will always make the parameter list inactive. The engine can supply the reason why a parameter list is inactive.

The general registry contains a predefined worksheet called the timeline. This is designed to hold basic date and date stream definitions for the rest of the model, and has special interfaces to enable the client to manage them. The timeline acts as a preferred source of parameters to the name reference manager. If a reference cannot be resolved within the parameter's own worksheet or instrument, then the timeline is searched before going to any other worksheet or instrument. This gives a "global" nature to the timeline parameters.

The engine maintains lists of decisions and outcomes. Decisions are named objects attached to date-valued parameters. They are designed to represent points in a financial model from which the deal could proceed in different directions; e.g. depending on whether an option is exercised. Outcomes are named objects that are the result of saying whether each decision has been taken or not. The outcome in which no decisions have been taken always exists and is called the base outcome. Other outcomes can be created by the client by adding a decision to an already existing outcome. For example, if the client has created three decisions then there are seven possible outcomes in addition to the base outcome obtained from the seven different ways of saying which combination of the three decisions has been exercised. These extra outcomes are not created automatically because the decisions may not correspond to independent decisions in real life—only certain combinations of decisions may be realistic.

Instruments are objects created by the client in the general registry. They are like worksheets in that they have an arbitrarily complex parameter list, but they also have data geared toward modeling financial instruments like loans, rent agreements, etc. They simplify designing badges for parameters.

Each instrument can have one or more parties specified. (The tool always uses precisely two parties for each instrument, corresponding to the two ends of the arrows in the party diagram.) The client can specify a role for each party. For example in an instrument modeling a loan, the two parties could be designated "lender" and "borrower". In the parameters, the client may refer to the roles in formulas; they are automatically defined to take the value of the name of the party filling that role. For example, if there is a party called "MyBank" with a role of "lender", then a formula may use the identifier "lender" with the same effect as specifying the character string "MyBank". This allows instrument builders to write parameters which automatically follow party substitutions.

The general registry has a special worksheet called the parties worksheet. It corresponds with the parties chapter in the tool. It is completely maintained by the client. However, if an instrument party finds a section in the parties worksheet that has the same name as itself, then it generates role parameters echoing the data inside that section. For example, if the parties worksheet has a section called "MyBank" with a parameter called "FirstFiscalMonth", then an instrument parameter could refer to its value as "Lender.FirstFiscalMonth". (Assuming that the instrument contains a party with name "MyBank" and role "Lender".)

Each instrument party can have one or more cash classifications, and each cash classification can have one or more income classifications. Each cash classification generates cash flows for that party by specifying the name of a parameter defined in the instrument, the section of the topmost parameter list in which to find the parameter, whether there is a sign change (for paying parties), and the name of the category member to be used to generate badges. Each income classification functions similarly with the extra information of which tax authority to badge it for.

Each instrument has a default decision handler which specifies how the flow-generating parameters are treated in outcomes involving a decision. The client can override this behavior for any actual decision that has been created. There are only two possibilities: either the decision is ignored, i.e. has no effect on cash flows, or the flows are truncated at the decision date. If they are truncated, the client can specify a formula for an extra amount to be assessed on the decision date. To generate the flows for a particular outcome, the earliest truncating decision is found which is in that outcome, and that controls the flow for that outcome. If there is no truncating decision for that parameter in that outcome, the flows are the same as the base outcome flows.

The client may specify for each instrument that it only generates flows for outcomes containing a certain required decision. This is designed to model purchase options which are only present if the corresponding decision is taken.

The client may instruct an instrument to generate its own decision and outcome for the purposes of calculating parameters and generating flows. This is designed to model termination values where a set of cash values needs to be calculated to terminate the deal at any of a fixed set of dates.

The instrument contains a date-valued parameter which becomes the decision date; the client can vary this date to get a table of termination values, or have the engine vary it automatically by specifying formula parameters with the TerminateByDate prefix.

The object responsible for generating flows from instruments is the instrument synchronizer. Whenever the client changes some data, the synchronizer regenerates (as necessary) parameters defining the flows and identifies them to the internal database with badges. Within each classification within each party within each instrument, the synchronizer identifies the instrument parameter representing that flow according to the client inputs. For each outcome, it generates an auxiliary parameter which may change the sign of the flow and/or truncate it at the appropriate decision date. It badges the auxiliary parameters using the categories "party", "other party", "cash or income classification", "outcome", "instrument name" and "tax authority" for income classifications.

The client may designate that certain instruments are to be cloned for each outcome. This is designed to model tax payment instruments where the basic parameters have to take different values for each outcome. In this case, the instrument synchronizer clones the parameter lists and party sections for each non-base outcome before generating the auxiliary parameters. It sets up default collection parameters for each clone to ensure that parameters extracting data from the internal database pick the right outcome in each clone.

The general registry may also contain specialists. These are named objects designed to act like building blocks. Each specialist contains its own version of the general registry which can have worksheets and instruments and other specialists. Since they are in their own registry, there is no contact between them and the world outside; no danger of references being erroneously resolved. They are safer versions of the "template" concept. Special parameters are designated as inputs to and outputs from the specialist, and they do have interactions, with the world outside the specialist.

An action is a named object representing a calculation that is too complicated for simple formulas to accomplish. There are predefined actions for building the optimization model, and executing the optimizer. The client can create new actions inside worksheets to do things like targeting and repetitive (sensitivity) calculations. Also the client can create action sequences, which are sequential series of actions, to create a primitive macro language.

Actions can be executed synchronously or asynchronously. In the latter case, the client starts off the action, and sits in a loop requesting action progress, until the progress report indicates that the action is complete. This enables the client to provide visual feedback to the user during actions which could take some time. For example, the client could display messages sent back from Cplex during optimization. Internally, actions are executed in a sub-thread to free the main thread to respond to progress requests.

The engine preferably has an interface with the Cplex optimizer. This is a solver, provided by a third-party, of linear (LP) and mixed integer (MIP) programming problems. It is encapsulated as an out-of-process COM server which can be run locally or remotely, with multiple users. The server can be started by the client or by the engine with the client specifying on which machine to initiate it. The set of instructions for the Cplex optimizer is generated by an optimizer model. This is a named object containing the data needed for the optimization. There can be more than one optimizer model in each case, if desired. An optimizer needs three kinds of information to operate. It must know which parameters the optimizer can vary, what constraints have to be satisfied, and what the objective function is. For each parameter with some information pertinent to an optimization model, there is a model parameter which houses this information. The client can request a model parameter from an optimization model for any given parameter in the system.

To specify that a parameter is variable in a given optimizer model, it is made an input parameter and the corresponding model parameter is given certain properties defining the variability, count (for array parameters), continuity (continuous, binary, integer), and any special ordering instructions for arrays (increasing, decreasing, SOS1, SOS2). Alternatively, the parameter can be made a formula parameter and the formula given an "optimize" prefix; this only works for the main optimizer model.

To specify constraints, the client requests constraint parameters from a model parameter. Constraints are parameters with some extra properties. The value of a constraint parameter represents the right-hand-side of a constraint, and could be a formula involving variable parameters. The left-hand-side of the constraint is the owning parameter, and the relation is specified by the client: greater-than, equals or less-than. The client can specify that adjacent constraints be combined in an OR-relation rather than the default AND-relation. Constraints have their own activation formulas; this enables the client to activate and de-activate constraints automatically. Constraints can be turned into assertions by setting their test-only switch. Assertions do not affect the optimization, but they can be queried by the client as to passing or failing just like constraints.

To specify the objective function to an optimizer model, the client requests a model parameter for each component of the objective function and sets its "objective function coefficient" property to the appropriate number; a positive number implies maximization, negative minimization. If there is more than one parameter with a coefficient, the optimizer will optimize the sum of the values multiplied by their respective coefficients.

The solving of an optimization model is done in phases. During the first phase, the formulas involved in constraints (and the objective function) are visited to determine the set of parameters that contribute (directly or indirectly) to constraints or the objective function. During the second phase, the definitions of all these parameters are visited to determine which are variable. The next few optimization phases are designed to determine array sizes and array element variabilities for those parameters with array values. This is done by generating an auxiliary set of parameters whose formulas are cloned from the original. The auxiliary parameters corresponding to parameters that the client has specified as variable are given special place-holder values which have a trivial pass-through arithmetic. When the other auxiliary parameters are evaluated, the result is normally a place-holder value, or an array of such. Wherever a place-holder value is encountered, that represents a variable (column) to be created in the optimization model.

Next, objects representing the basic variables (columns) of the model are created, and the coefficients, or rows, of the matrix are generated. Some rows correspond to the definitions of parameters, others to the constraints as supplied by the client. To generate the coefficients, a special type of value is used which is basically a linear combination of variables. Once an arithmetic of these values has been programmed, then they can be passed through the normal expression evaluator, and the rows created from the results.

A second set of auxiliary parameters with cloned formulas is used to do this. Only client constraints that cannot be interpreted as bounds on the variables generate rows.

During coefficient generation, OR-groups of constraints, and some non-linear functions are linearized by creating extra binary variables to "take the decisions". Functions that cannot be linearized generate non-linear errors.

After the model has been generated this far, a lot of information is available to the client such as linearity of the model, lists of constraints and optimizable parameters. The model is finalized by removing any egregious scaling problems (for example caused by the client defining some parameters in dollars and some in percents), and replacing some symbolic large and small constants (introduced with the extra binary variables) with real numbers estimated from other constants in the matrix.

The arrays that Cplex expects as inputs are created and the model transmitted to the Cplex server. The engine waits until that server has completed, forwarding any progress messages back to the client. The results are obtained from the Cplex server, and put back into the file wherever the client has specified that parameters are variable. Binding information and shadow prices are obtained from Cplex and stored in the corresponding constraints. To assist users in tracking down infeasibilities, only the values that the user has specified as optimizable are put back into the model; any dependent parameters and constraints are then recalculated from their formulas, and lists of failing constraints are available the client (user) to display.

If there are any optimization search parameters, then the model building and solving steps are repeated using different guesses for the search parameters until the best objective value is found. Optimization search parameters are formula parameters with a search prefix in which only the first three arguments have been specified (low, high, accuracy). This kind of search prefix has no effect outside of optimization. It is used by the client to solve for variable parameters which cannot be specified as variable to the optimization model without sending the model non-linear. The algorithm for choosing the guesses is a custom quadratic-fit algorithm for finding the maximum of a function.

For the purposes of generating the optimization model, any non-optimization search parameters are frozen at their current values. If one of these has a new value as a result of the optimization in such a way as to invalidate the optimization, then a message about this is generated and sent to the client, and a special status condition set.

There are two optimization actions provided for the client to execute. The "optimize" action will perform all of the above steps. The "build model" action performs only the first few steps, enough to get the client data on linearity, constraints, etc. This last action is performed by the Advantage optimization chapter to provide visual feedback while the data to display the chapter is being prepared.

The engine can export its model to Microsoft's EXCEL software, creating as far as possible a working spreadsheet model of all the parameter formulas. The exported model is limited in that it cannot handle date changes or changes in frequency or term that require re-dimensioning of arrays. It does a good job of formatting the resulting sheets to reflect the data hierarchy of the model. The client has control over the sheets and what is included in them.

The client can create other types of actions in worksheets. A marksman is a targeting action which works similarly to the search prefix. Being an action, however, it can be executed asynchronously with the client displaying progress. Each time round the loop, the variable parameter is guessed, and a specified list of actions performed, which could include optimization and other marksmen. This is repeated until a target variable reaches a specified value, or is maximized or minimized. A matrix is a repetitive action designed to vary a parameter over a range of values, perform a list of actions which could include optimization and marksmen at each iteration, and store a set of results. These results are collated into a two-dimensional matrix of values assigned to a result parameter. An action sequence is a set of actions which is executed serially; this could be used to implement a primitive macro language.

The engine preferably has a background thread which steals idle cycles to perform tasks in advance of the client requesting them. For example, evaluation of parameters, including searches, and generation of the optimization model. This can markedly improve interaction speed as the client may well find that whatever it needs to create a display has already been prepared by the engine. For example, the engine may submit background optimizations to Cplex so that should the user decide to press the optimize button, he would get an instantaneous result.

Formula Language

As explained above, the instant invention includes a powerful formula language which can be used in the worksheet, as well as in other chapters of the invention, to provide scenario information. This formula language includes a library of predefined functions and keywords which can be used by the user when using the tool. An exemplary set of these functions and keywords which comprise the formula language, together with an associated syntax, is provided below.

ABS Function

ABS (Number)

Returns the absolute value of an argument.

Number is any numeric value or expression that is a real number.

Accrue Prefix

Accrue(Calendar):source_values

Tells the application to recognize values as amounts to be allocated uniformly to each day in their time periods.

Source values come from one or more previously defined numbers streams.

If Calendar is omitted, the application applies its own calendar selection method.

To calculate accrual amounts, the application looks at three factors:

1. Overlap between source periods and accrual periods.
2. Given or selected calendar method.
3. Daily rate of source value (source value divided by days in source period).

AccrueInterval Function

AccrueInterval (Offset, Calendar)

Accrues Advance or Arrears payments into a set of user-defined intervals.

This function differs from its cousin PeriodInterval in that it takes into account the Advance or Arrears nature of the payment stream in which it occurs. It combines this information with the StartDates or EndDates prefix of the payment stream date index to determine which interval is relevant to the current payment.

Offset is an integer that defines the periods in which to accrue values.

Offset 0 (or blank) accrues to each interval containing a value.

Offset +1 accrues to the interval of the next period of value, offset +2 includes the next two periods of value, and so on.

Offset −1 accrues to the interval of the previous period of value, offset −2 includes the previous two intervals, and so on.

Calendar is a calendar method such as Actual_360, European_30_360, and so on.

If Calendar is omitted, the application applies its own calendar selection method.

AccumulateByPeriod Function

AccumulateByPeriod (Stream, Period)

Accumulates values from an indexed array into the overlapping periods under a different index.

Stream is the name of an indexed numbers stream.

Period is the name of the date index of periods to serve as points of accumulation.

Activation Switches

An activation switch is a formula that evaluates to True or False (e.g. x=y) in regard to a heading or a constraint.

An activation switch on a Smart Paper heading is symbolized by a blue rectangle.

Headings in instruments and templates are activated through payment classifications rather than activation switches, so there are no activation symbols in those forms.

If a heading activation switch evaluates to False, the entire section (heading, subordinates and constraints) is deactivated, and the section is dimmed.

The activation switch for a constraint is not symbolized or visible until you display the constraint in full edit mode. If the switch evaluates to False, the constraint is inactive and gets ignored during optimization.

Adding an Activation Switch

1. Click the heading or the constrained parameter you want to modify and press Ctrl+Enter to enter full edit mode.

Enter a heading activation formula in the formula edit field, or. . . .

Click a constraint name to select it, then right-click for a shortcut menu of options. Choose Add Activation Formula and enter the formula in the field provided.

Rules for Activation Switches

An activation formula must not depend on anything optimizable. If it does, it will always deactivate its section, even it the formula appears to evaluate to True.

An activation formula with an error, orone which evaluates to something other than True or False, will always deactivate its section.

Functions and Activation Switches

An attempt to reference an inactive parameter returns an error unless:

You use the WhenActive or FindValue functions to return an argued value when an inactive parameter is found.

You use the Subtotal function, which automatically excludes inactive parameters.

ActsLike Prefix

ActsLike(reference):additional_formula

Makes a parameter mimic the behavior defined by the formula for another parameter.

Reference is name of parameter to mimic.

The formula that follows the colon (:) can be the reference parameter name (to use its values) and/or other formula definition.

Actual_360 Function

This is one of four calendar methods you can choose to evaluate intervals between dates for the purposes of calculation.

Actual_360 divides the actual number of days in a given month into a year of 360 days.

Actual_365 Function

This is one of four calendar methods you can choose to evaluate intervals between dates for the purposes of calculation.

Actual_365 divides the actual number of days in a given month into a year of 365 days.

AddYears Function

AddYears (Dates, Years, Calendar)

AddYears returns a date based on the calculated interval between a given date and given number of years, using the day-counting metrics of the current calendar.

The interval is internally calculated using the Interval function, where its Date1 and Calendar arguments use the Date and Calendar argued in the AddYears function.

The interval is the sum of a whole number-of years and a fractional part. Only the fractional part is affected by the calendar argument.

Date is any date expression.

Years is a whole or decimal number to express the number of years.

Calendar is a calendar method such as Actual_360, European_30_360, and so on.

If Calendar is omitted, the application applies its own calendar selection method.

Advance Prefix

Advance: values

Defines a payment stream in which each payment applies to the period following the date on which the payment occurs.

In Smart Paper, the ▷symbol identifies Advance payments.

After Keyword

After Date

Defines the first value in a date stream or maps the first value in a sorted numbers stream.

In a date stream, use After to begin the stream on the first anniversary of the After date. The interval to the anniversary is determined by a frequency keyword such as Annual.

In a numbers stream, use After to key the first value in the stream to the index date that follows the given date.

Align Keywords

Alignment keywords anchor the anniversaries in continuing dates to a month/day or the same day each month at a given frequency. There are two ways to express alignment:

Align Frequency mm/dd

In this expression, you anchor continuing dates (at the given frequency) to the relative date mm/dd rather than the first date defined in the formula.

Align Monthly On dd

In this expression, you anchor monthly continuing dates to a day of the month other than the starting date.

Also Keyword

Also Date

Use the Also keyword at the end of a date stream formula to insert a date that will not otherwise occur according to the preceding formula.

Anchor Date

An anchor date is the point of departure in the calculation of an anniversary or other fixed date.

The anchor date is expressed as a relative date modified by the keyword expressions Align frequency or Align Monthly On.

AND Function

AND (condition1, condition2, . . . )

AND returns a logical value that asserts if a set of conditions are true or false.

Returns True if all of the arguments are true.

Returns False if any one or more of the arguments is false.

Condition1, condition2, and so on are the conditions you want to test for being true or false.

Anniversary (Definition)

An anniversary is a date that occurs on the basis of a given anchor date and frequency.

If the anchor date is March 1 and the frequency is Monthly, the first anniversary of the anchor date is April 1, the second anniversary is May 1, and so on. There is also an Anniversary function that lets you calculate the occurrence of an anniversary based on a set of arguments.

Anniversary Function

Anniversary (AnchorDates, Dates, Frequency)

Returns the last anniversary of an anchor date up to (and including) a cutoff date. Anniversaries occur at the specified frequency beginning on the anchor date.

AnchorDate is the date from which the anniversary countdown begins.

Date is any date expression for the cutoff date.

Frequency is Monthly, Quarterly, Semiannual, or Annual.

Annual Keyword

Annual (or Annually) is a frequency keyword used to define the interval between continuing dates in a date stream.

ArrayByIndex Function

ArrayByIndex(Array,Index)

Returns the values in a source array that correspond to a given index position.

Array is the name of the indexed array that contains the value to be returned.

Index is an integer (or array of integers) that refers to the key location of an index array value against its index. The reference for the value in the first position is 1, the second position is 2, and so on.

Array Parameters (Definition)

An array is a type of parameter that contains a series of one or more values. The values are arranged according to a formula. There are three types of arrays:

Sorted array Stream of values in ascending order, with no duplicates.

A typical sorted array is an index parameter, as seen in the underlined set of dates used to coordinate a set of cash flows.

Since each position on an index parameter may be a key to a value in another array, an index is also referred to as a key parameter.

Indexed array Stream of values in the scope of an index (sorted array).

A typical indexed array is a set of cash flows in a deal, where each flow is keyed (attached) to a position on a date index.

Plain array Stream of values indexed by the natural numbers (1, 2, 3, . . . ).

May also be referred to as an unsorted array, as its elements occur in whatever order they are entered in the formula.

ArraySum Function

ArraySum(Array)

ArraySum returns the total of all the values in an array.

Array is the name of any array parameter.

Arrears Prefix

Arrears: values

The Arrears prefix means that each payment applies to the period that precedes the date on which the payment is incurred.

In Smart Paper, the ◂symbol identifies Arrears payments.

Badge (Definition)

A badge is an internal ID that associates certain data to a list member within a category ("category=list member"). For example:

The category "Instrument" includes the list members "Rent", "Asset", "Loan", and so on.

The category "IncomeClassification" includes the list members "RentReceived", "SourcesOfFunds", and so on.

Before Keyword

Before date

Defines the last date in a date stream or defines the date on which the last value in a numbers stream occurs.

In a date stream, use Before to make the stream end on the latest possible anniversary (in a continuing dates sequence) that occurs prior to the given date.

In a numbers stream, use Before to assign the last value in the numbers stream to the index date that most immediately precedes the given date.

Bookend Date (Definition)

A bookend date is a date index element that does not represent the beginning or end of a period. The period prefix used in the date index determines the bookend date.

When the StartDates prefix applies, the bookend date is the last date on the index.

When the EndDates prefix applies, the bookend date is the first date on the index.

Calendar Functions

The tool relies on a user-specified calendar method to evaluate intervals between dates for the purposes of calculations such as:

interest on a loan accrual of payments that cover periods across fiscal years (for tax purposes)

present value and yield calculations

The active calendar method in a calculation affects payment values because there are more or fewer days in a given interval based on the calendar.

Multiple Calendars in the Same Case

Every case has a global default calendar set in Time Organizer. You can change this default and you can also use different calendars at local levels (i.e. for an instrument or a sheet of Smart Paper).

In the event of multiple calendars, the application has a process to determine which one is in effect for a given calculation. See Calendar Selection Method.

Calendar Selection Method (Definition)

You can specify different calendar methods for different requirements in the same case. If a case has more than one calendar method, the application uses a decision tree to determine the method that applies to a particular calculation.

Decision Tree for Calendar Selection

When a case contains multiple calendar methods, the application applies the closest method it can find based on this order 1) Does the formula contain a calendar?

Some prefixes (Accrue, for example) prompt you to select a calendar method.

You can also add or insert a calendar as a function.

For example, the list of functions available through Formula Assistant to add/insert a function includes each of the four methods: Actual_360, Actual_365, and so on.

2) Failing that, does the current sheet of Smart Paper contain a parameter named Calendar?
3) Failing that, the application applies the default calendar method setting in Time Organizer.

Cash Prefix

Cash: values

Cash is the default prefix for a payment stream when neither the Advance prefix nor the Arrears prefix is given. Use the Cash prefix (or omit a prefix) to specify that each payment applies to the date on which it is incurred.

Categories and List Member Reference

A badge is an internal ID that that comprises a category and one of the list members within that category. Certain functions use the list member portion of a badge as an argument to collect or extract data.

CEILING Function

CEILING(Number,Significance)

Returns a number rounded up to the nearest multiple you specify.

For example, to round up the value 575.29 to the nearest multiple of 0.5, you use the formula CEILING(575.29, 0.5). The application returns 575.50.

Number is any numeric expression that you want to round up.

Significance is the multiple to which you want to round Number. The application rounds the number up away from zero.

Number and Significance cannot have different signs.

CHAR Function

CHAR(Code)

Returns a character value from the ANSI code you specify.

Code is a number between 1 and 255 that specifies a character on your computer.

CHOOSE Function

CHOOSE(Index, Value1, Value2, . . . )

Returns a value from a list of arguments based on an index number.

Index specifies which value(s) to select from the list of arguments. Index can be any scalar or array value, including numbers or parameter references. For example, if the value of Index is 2, the application returns the second argument. If Index has a fractional value, the application truncates the fraction and uses the resulting integer to select an argument.

Value1, Value2 and so on are the list of arguments from which the application selects based on the value of Index. The arguments can be any number or expression, including scalar or arrays.

Classifications (Definition)

A classification is a financial label. It tells the application how to retrieve values given a context such as instrument, outcome, party/role, and so on.

Guidelines for Working with Classifications

1) Keep other arguments in context when given a classification argument.

For example, when the Rent instrument is instated for the base outcome, the following two classifications are active:

RentPaid by the lessee, and

RentReceived by the lessor.

If you write a Collect function to look for RentPaid but add filters such as Party=Lessor or Instrument=Asset, the RentPaid classification is meaningless and the function cannot find the rent paid values.

2) Classifications are spelling-sensitive.

For example, the application recognizes SourcesOfFunds and Sourcesoffunds, but not SourceOfFunds or SourcesOfFunding.

Identifying Classification List Members

There are three ways to see a list of payment (income/cash) classification members.

In Smart Paper a) In SmartPaper, add a parameter.

b) Change the parameter to a List Member parameter.

In Payment Organizer a) Change Payment Organizer Data.

In Instrument Chapter a) Modify Payment Classification Settings for Instrument

CODE Function

CODE(String)

Returns an ANSI code that specifies the first character in a text string.

String is a series of text characters or a reference to a parameter that contains text characters.

Enclose String in quote marks.

CollectData Function

CollectData (CategoryMemberList)

Collects data from parameters that match up to one or more badges.

CategoryMemberList is an expression of one or more badges, with one set of quote marks to encase the entire string. See Categories and List Member Reference.

Use the word and to separate multiple badges.

To reference a party by its role rather than the party name, use the syntax "+Rolename+" as seen in the Example 2 parameter.

CollectIncome Function

CollectIncome (Party, Classification, Outcome, Instrument, OtherParty, TaxAuthority)

Collects income from parameters that match a set of one or more badges. Each argument position represents a category and takes a user-specified list member name.

See Category and List Member Reference for help on names for parties, classifications, and so on.

Party identifies the entity whose income flows you want to collect. You can use either a party name or a role name for the argument.

Party versus role: you must encase a party name in quote marks, whereas a role name does not require quote marks.

Classification is the Income classification name (in quote marks) for the flows to be collected.

Outcome is the name of the outcome (encased in quote marks) under which income is to be collected. The function assumes "BaseOutcome" if no outcome is specified.

Instrument is the name of the instrument (in quote marks) for which income is to be collected. The function considers all instruments if no instrument is specified.

OtherParty identifies the other party for flows from two-party instruments.

You can use a party name in quote marks or a role name (no quote marks)

Tax Authority identifies the tax collector for the income to be collected.

You can use a party name in quote marks ("IRS") or the role name TaxCollector without quote marks.

CollectPayments Function

CollectPayments (Party, Classification, Outcome, Instrument, OtherParty)

Collects payments from parameters that match a set of one or more badges. Each argument represents a category and takes a user-specified list member name.

See Category and List Member Reference for help on names for parties, classifications, and so on.

Party identifies the entity whose payments you want to collect. You can use either a party name or a role name for the argument.

Party versus role: you must encase a party name in quote marks, whereas a role name does not require quote marks.

Classification is the Payment classification name (in quote marks) for the flows to be collected.

Outcome is the name of the outcome (encased in quote marks) under which payments are to be collected. The function assumes "BaseOutcome" if no outcome is specified.

Instrument is the name of the instrument (in quote marks) for which payments are to be collected. The function considers all instruments if no instrument is specified.

OtherParty identifies the other party for flows from two-party instruments.

You can use a party name in quote marks or a role name (no quote marks)

CONCATENATE Function

CONCATENATE(String1, String2, ...)

Links multiple text strings into one string.

a String1, String2, and so on are a series of text characters or a reference to a parameter that contains text characters. Enclose each text string in quote marks.

Constraint/Assertion (Definition)

A constraint/assertion is a formula you can add to a parameter along with the formula that generates the parameter values.

The constraint/assertion formula defines the degree to which values can be re-calculated during optimization.

You can only add a constraint/assertion to a parameter in full edit mode (Ctrl+Enter).

The constraint/assertion can be binding or non-binding.

Binding. Optimization fails if constraint or assertion cannot be honored.

Non-Binding. Inability to meet the constraint or assertion is noted, but does not cause Optimization to fail.

Context Function

Context(Reference)

Returns the full pathname (i.e. SheetName.Heading.Sub-Heading.Parameter to the given reference.

This is useful when you have multiple parameters with the same name and need to distinguish between them.

For example, if you instate the MISFYieldByMonth template twice in one case, you end up with two parameters named Input.MinYield.

If you insert a Context parameter in the Inputs section of each template, you can then use the FindValue or GetResults function to locate the value under Heading1.Input.MinYield versus Heading2.Input.MinYield.

Reference is an instrument name, a Smart Paper sheet name, or any heading or parameter name.

COUNT Function

COUNT(Array)

Counts the number of values in an array.

Array is a series of values separated by semicolons, or the name of any array parameter such as a numbers stream or date index.

Empty or blank elements in the array are included in the count.

Cumulative Function

Cumulative(Array)

Returns an array in which each value is the accumulated value of all preceding values in the argued array.

Array is the name of an array parameter, or it can be a series of values defined by numbers stream keywords. The opposite function is Difference (returns difference between each successive element in an array or series of values).

A related function is SumToDate (returns a single number for the sum value of an array or series of values as of a given date).

Daily_Present_Value Function

Daily_Present_Value (Flows, PVRate, PVDate, Calendar)

Returns the daily present value of a set of cash flows.

Flows is the parameter name for a set of cash flows.

PVRate is a percentage for the nominal monthly discount rate.

PVDate is any single date expression to which the cash flows are discounted or accreted.

Calendar is a calendar method such as Actual_360, European_30_360, and so on.

If Calendar is omitted, the application applies its own calendar selection method.

DATE Function

DATE(Year,Month,Day)

Returns a date value from numeric values that represent a year, month, and day.

To create a date you can use to produce a date stream consisting of last days of months, use MonthEndOf.

Year is a number from 1900 to 9999.

Month is a number that represents the month of Year.

If Month is greater than 12, the value is added to January of Year. See Example V1.

If Month is less than 1, the value is subtracted from December of Year. See Example V2.

Day is a number that represents day of Month.

If Day is greater than the days in Month, the value is added to day 1 of Month. See Example V3.

If Day is less than 1, the value is subtracted from day 1 of Month. See Example V4.

DateAsEntered Function

DateAsEntered (Date)

Returns a date value in format "dd mon, yyyy" (including the quotation marks).

Date can include a day number between 1 and 31 irrespective of the month.

Date Expression (Definition)

A date expression is a date included in a formula. The date can be given in any of the following formats (refer to example):

1) Calendar date, as in 01 Jan. 2000.

2) Parameter reference, as in ClosingDate (where ClosingDate is previously defined).

3) Date location by keyword reference, as in First datestream or Last datestream.

4) Elapsed time before or after a date, as in date +3y.

5) Inserted function that defines a date.

Date Index (definition)

A date index is an array parameter that contains an ascending series of dates. The dates are used to coordinate series of values according to when they occur over time.

Each element on the index is a key (a point of coordination for sorting values).

Parameters below the index are indexed arrays of values that are keyed to the index positions.

Dates Function

Dates (First, Second . . . )

Returns a date stream consisting of dates used to key the argued numbers stream(s) without regard to the StartDates or EndDates prefix designation of the source.

If you want true end dates of periods as a result, you must specify the EndDates prefix with the Dates function.

Otherwise, the returned dates automatically default to the StartDates prefix and therefore represent the beginnings of periods.

First (and so on) is the parameter name of a payment or income stream, or a table of values.

DATEVALUE Function

DATEVALUE(Date)

Converts a text string representation of a date to a date value.

Date is any name reference or text string that represents a date.

DAY Function

DAY(Date)

Returns an integer value (between 1 and 31) for the day of the month in a date value.

Date is any name reference or text string that represents a date.

DAYS360 Function

DAYS360(Starting Date,Ending Date,Method)

Returns the number of days between two dates on 360-day calendar (twelve 30-day months).

Starting Date and Ending Date are the two date values you want to calculate the number of days between. If Ending Date occurs before Starting Date, a negative number is returned.

Method is False to specify the U.S. method of calculation or True to specify the European method.

Days365 Function

Days365 (StartDate, EndDate)

Returns the number of days between two dates based on a 365-day year.

StartDate is the first date to include in the count.

EndDate is a bookend date that is not included in the count of days.

For example, to obtain a count of days in the period January 1 to January 31 that includes the $31^{st}$, the End Date is February 1.

Days365 returns a negative number if StartDate is later than EndDate,

DaysInPeriod Function

DaysInPeriod (Period, Calendar)

Returns the number of days in period according to specified calendar.

Period is two dates from a date index expressed mm/dd/yy to mm/dd/yy (or using other valid date syntax; see example).

Calendar is a calendar method such as Actual_360, European_30_360, and so on.

If Calendar is omitted, the application uses the decision tree for multiple calendars to choose a method.

DaysInYear Function

DaysInYear (Calendar)

Returns the number of days in a calendar year.

Calendar is a calendar method such as Actual_360, European_30_360, and so on.

If Calendar is omitted, the application uses the decision tree for multiple calendars to choose a method.

Destination Parameter (Definition)

A destination parameter is one in which the formula refers to another parameter in order to use the referenced parameter as a source of data.

Difference Function

Difference (Array)

Returns the difference between each successive value in an array or series of values.

Array is the name of an array parameter or a series of values defined by numbers stream keywords.

Also see Cumulative (returns accumulated value of all preceding values in an array or series of values).

ElapsedTime Function

ElapsedTime (Years, Months, Days)

Returns an elapsed time value in whole numbers for years, months, and days.

Use this function when other parameters in the case depend on an elapsed time value.

Each argument uses any whole number.

Insert commas as placeholders for omitted arguments.

EndDates Prefix

Indicates that each date on the index (except the first date) represents the LAST day of a period.

Each period begins the day after the index date and ends on the next index date.

The first date in the index is a bookend. It does not represent the end of a period.

The ← symbol indicates the EndDates prefix.

EndDatesOf Function

EndDatesOf (First, Second, . . . )

Returns the combined dates used to organize a set of number streams, first converting them to end dates if necessary.

This lets you create an index comprising the date values of various indexed parameters without having to remember anything about the indexes themselves.

If an argued numbers stream is keyed to an EndDates: date index, the function returns the dates as they appear on that index.

If an argued numbers stream is keyed to a StartDates: date index, the function first subtracts one day from each date to return it as an end date.

To make the resulting dates represent true end dates, you must supply the EndDates: prefix as well as the function. See example.

First (and so on) are the parameter names of numbers streams (tables, cash and income streams).

The similar EndDatesOfPeriods function slows down optimization performance, but it is more flexible in the types of arguments it accepts.

EndDatesOfPeriods Function

EndDatesOfPeriods (First, Second, . . . )

Derives period start dates from one or more numbers streams and/or date indexes, then creates a date index of dates that reflect the end dates of the underlying periods. Also incorporates dates or date streams given as arguments.

To calculate dates for the result, the function subtracts one day each from the start dates.

To make the resulting dates represent true end dates, you must supply the EndDates prefix as well as the function.

First (and so on) can be any one or more of the following:

Parameter name of a date index with the StartDates prefix (StartDates is the default if no prefix is present).

Parameter name of a numbers stream (i.e. income or payment flow, table) that is keyed to a StartDates date index.

Single date expression or date stream expression.

Ending Keyword
Ending date
Defines the last date in a date stream.
European_30_360 Function
This is one of four calendar methods you can choose to evaluate intervals between dates for the purposes of calculation Consists of twelve 30-day months (each month is one $12^{th}$ of the year).

February is given two extra days.

If a period starts or ends on the $31^{st}$, the day counts as the $30^{th}$ of the same month.

For example, the interval of $1^{st}$ to $31^{st}$ is 29 days.

EVEN Function
EVEN(Number)
Returns a number rounded away from zero to the next even integer.

Number is the value to round.

Except Keyword
;Except value On date
or
;Except On date
Allows for a break in a sequence of values being mapped to an index.

The Except term always begins with a; (semicolon) separator to halt the previous formula sequence.

It is optional to include an exception value with the Except keyword. If you do not provide an exception value, there is no value shown for the Except date (see NumberStream2 in example).

Except can only be used at the end of the numbers stream formula.

EXP Function
EXP(number)
Returns the natural logarithm base e (2.71828182845904) raised to the power you specify.

Number is the power to which you want the application to raise e.

FALSE Function
FALSE
Returns the logical value False.
FIND Function
FIND(FindText,WithinText,StartNum)
Finds and returns the starting position of a text string within another text string.

FindText and WithinText are series of text characters (or references to a parameter that contains text characters) encased in quote marks.

FindText is the text string you want to find (no wildcard characters).

WithinText is the text string that contains FindText.

StartNum is the character position where you want the application to start the search. For example, to start with the third character in WithinText, use a StartNum of 3. If you omit StartNum, the application uses 1.

If FindText is not contained in WithinText, the application returns an error.

If StartNum is zero or less, or if StartNum is greater than the length of WithinText, the application returns an error.

FindValue Function
FindValue (Context, Parameter, InactiveNull)
Locates a value given its context within the case.

Context can be any of the following:

the name of a Smart Paper sheet, heading, or instrument encased in quote marks the name of a parameter defined with the Context function (no quote marks)

the name of a parameter that defines an array of sheet names, heading names, or instrument names Parameter is the name of the parameter that contains the value you want to find.

InactiveNull lets you specify a value to return in lieu of the error

InactiveParameter if the context/parameter specification points to an inactive parameter.

First Function
First (Array)
Refers to the first value in a given array.

Array can be a numbers stream or date stream.

First Keyword
First datestream
Refer to the first date in a date stream in order to use the date itself in another date stream.

FLOOR Function
FLOOR(Number,Significance)
Returns a number rounded down to the nearest multiple you specify.

Number is any numeric expression that you want to round down.

Significance is the multiple to which you want to round Number. The application rounds the number down toward zero.

Number and Significance cannot have different signs.

For Keyword
For n
Use the For keyword to repeat a numbers stream value or extend a date stream sequence.

In a date stream, use For to specify the number of anniversaries to continue the date stream at its current frequency.

For n ends the stream after n periods at the given frequency unless the For stream is further defined following a separator keyword such as ; (semicolon) or Then.

In a numbers stream, use For to specify the number of increments to repeat a value.

Forever Keyword
Forever
Use the Forever keyword in date stream in lieu of an ending date phrase if you want to specify that the stream never ends.

GetResult Function

GetResult (Result, Party, Outcome, Context, SubsidiaryParameter)

Locates a SetResult parameter flagged with a matching set of arguments and returns the parameter value. Or, if optional arguments are included, the function can return a subsidiary parameter value.

Result, Party, and Outcome must exactly match the arguments provided for a previously established SetResult parameter, including quote marks.

Context is the name of a parameter that uses the Context function to pinpoint its location.

If Context is argued without the SubsidiaryParameter argument, the GetResult function returns the value of the Context parameter.

SubsidiaryParameter (which can only be argued in conjunction with Context) is the name of any parameter located under the same subheading as the given Context parameter.

IF Function

IF(LogicalTest,ValueIfTrue,ValueIfFalse)

Returns one of two values depending on the results of a logical test for a true or false condition.

LogicalTest is any expression that the application can evaluate to be true or false.

ValueIfTrue is any value or expression you want the application to return if LogicalTest is true. If you omit ValueIfTrue and the LogicalTest evaluates to True, the application returns the value True.

ValueIfFalse is any value or expression you want the application to return if LogicalTest is false. If you omit ValueIfFalse and the LogicalTest evaluates to False, the application returns the value False.

The application can return text if it is encased in quote marks.

Index (Definition)

An index is a type of parameter used to coordinate values.

Elements on an index look like an underlined series of column headings in a table.

In rows of values beneath the index, each value is keyed to an element on the index.

You can create a date index to sort values over time, as shown here.

INDEX Function

INDEX(Array, FirstIndex,SecondIndex, . . . )

Returns a value from any type of array based on the relative position of the value within the array.

Array is the name of any array or date index parameter.

FirstIndex (and so on) is a whole number representing the index key position for the value you seek.

INT

INT(number)

Returns a number rounded down to the next integer of lesser value.

Number is any real number you want to round down to the next lowest integer.

Interpolate Prefix

Interpolate (Calendar):

Tells the application to interpret each of its values as a lookup value that is linearly applied across its time period, creating a stepped value for each day in the time period You can then reference the Interpolate table (by parameter name) in the formula to calculate values for a destination parameter.

If Calendar is omitted, the application applies its own calendar selection method.

If the destination date falls outside the date range of the Interpolate parameter, the application uses the two Interpolate dates that are closest to the destination date to figure the stepped value.

In Smart Paper, the ⋏ symbol identifies a parameter with Interpolate table values.

Interval (Definition)

An interval is the length of a date index period calculated as a portion of a year.

For example, the first interval on a StartDates index is 0.5 if the index is semiannual, 0.25 if the index is quarterly, and so on.

On a StartDates index, the first interval begins on the first date and ends on the day before the next index date. The last date on the index is a zero-length interval (starts and ends on same date).

On an EndDates index, the first date on the index is a zerolength interval (starts and ends on same date). The second interval begins the day after the first date and extends through the next date on the index.

Interval Function

Interval (Date1, Date2, Calendar)

Calculates the numbers of years between two dates based on the day-counting metrics of the given calendar.

The function is calculated as the sum of a whole number of years and a fractional part. Only the fractional part is affected by the calendar designation.

For example, the Interval between Feb. 15, 2000 and Mar. 15, 2001 using the calendar Actual_360 is 1+28/360, not 394/360.

For the most accurate results, format the row to permit multiple decimal places.

Date1 and Date2 are any two single date expressions.

Calendar is a calendar method such as Actual_360, European_30_360, and so on.

If Calendar is omitted, the application uses the decision tree for multiple calendars to choose a method.

If you know Date1 and want to add an interval to obtain Date2, see AddYears.

Key, Keyed (Definition)

A key is a point of coordination on an index that is used to sort values.

Keys can be defined as dates, integers, or alphanumeric strings encased in quote marks.

Each value in a array below the index is "keyed" to one position (element) on the index.

Keys Function

Keys(Stream)

Returns the index used to coordinate the values in a numbers stream.

A returned date index assumes the StartDates prefix (whereby dates represent the beginnings of periods), even if the source index uses the EndDates prefix.

You can also use the Dates function to return a date index or a combination of date indexes.

Stream is the parameter name of a payment or income stream.

Last Function

Last (Array)

Refers to the last value in a given array.

Array can be any numbers stream or date stream.

Last Keyword

Last stream

Refer to the last date in a date stream in order to use the date itself in another date stream.

LEFT Function
LEFT(String, NumChars)
Returns one or more of the leftmost characters of a text string.
  String is a series of text characters or a reference to a parameter that contains text characters.
  Enclose String in quote marks.
  NumChars is the number of characters you want returned starting with the first character. NumChars must be greater than or equal to zero.
  If NumChars is greater than the length of String, the application returns all of String.
  If you omit NumChars, the application returns the single left-most character.
LEN Function
LEN(String)
Counts the number of characters in a text string, including spaces.
  String is a series of text characters or a reference to a parameter that contains text characters.
  Enclose the text string in quote marks.
LN Function
LN(Number)
Returns the natural logarithm of the number you specify.
  Number must be a positive real number. The application returns the natural logarithm of Number.
LOG Function
LOG(number,base)
Returns the logarithm of a number to a specified base.
  Number must be a positive real number. The application returns the logarithm of the number.
  Base is the base of the logarithm. If you omit Base, the application assumes it is 10.
LOG10 Function
LOG10(number)
Returns the logarithm of a number to base 10.
  Number must be a positive real number. The application returns the logarithm of the number to base 10.
Lookup Function
Lookup(OutputList, InputList, LookupValue, Action, NotFoundValue, Calendar)
Returns the occurrence of values shared between two parameters keyed to different indexes.
  OutputList is a parameter that contains the values to return where there is a match between InputList and LookupValue.
  Can be an indexed array (i.e. numbers stream) or a date index.
  If not specified, OutputList is assumed to be the natural numbers (1; 2; 3 . . . ). a InputList is a parameter that contains or organizes the LookupValue.
  Can be an indexed array (i.e. numbers stream), an index, or an unsorted (non-indexed) array.
  If InputList is omitted and OutputList is an indexed array, then InputList is assumed to be the index of OutputList. Otherwise, it is assumed to be the natural numbers (1; 2; 3 . . . ).
  If InputList is an unsorted array, then only exact value matches are possible (Action must be 0).
  LookupValue is a parameter that contains the values the function should search for within the InputList.
  Action specifies a code number for the type of result to return when an exact match is not found.
  NotFoundValue specifies the result to be returned if LookupValue is not found in InputList according to the preceding arguments.
  Calendar is a calendar method such as Actual_360, European_30_360, and so on.
  If Calendar is omitted, the application applies its own calendar selection method.
LOWER Function
LOWER(String)
Converts a text string to lower case.
  String is a series of text characters or a reference to a parameter that contains text characters. Enclose the text string in quote marks.
Max Function
Max (argument1, argument2, . . . )
Returns a scalar value or array of values, depending on the number of arguments given and if the Max parameter is indexed.
  Argumentn (and so on) is any number or parameter name.
MaxByIndex Function
MaxByIndex (argument1, argument2, . . . )
Returns array in which each position holds the maximum value found at the corresponding position within a set of arguments.
  Argumentn (and so on) is any number or parameter name.
MaxOfAll Function
MaxOfAll (argument1, argument2, . . . )
Returns the single maximum value found in a set of arguments.
  Equivalent to MAX in Microsoft Excel.
  Argument is any number or parameter name.
MID Function
MID(String,StartNum,NumChars)
Extracts one or more characters from within a string.
  String is a series of text characters or a reference to a parameter that contains text characters. String contains the characters you want to extract.
  Enclose String in quote marks.
  StartNum is the position of the first character you want to extract.
  If StartNum is greater than the length of String or less than 1, the application returns an error.
  NumChars is the number of characters you want to extract, starting with the character in the StartNum position.
  If StartNum plus NumChars is greater than the length of String, the application returns the characters up to the end of String.
Min Function
Min (argument1, argument2, . . . )
Returns a scalar value or array of values, depending on the number of arguments given and if the Min parameter is indexed.
  Argumentn (and so on) is any number or parameter name.
MinByIndex Function
MinByIndex (argument1, argument2, . . . )
Returns array in which each position is the minimum value found at the corresponding position within a set of arguments.
  Argumentn (and so on) is any number or parameter name.
MinOfAll Function
MinOfAll (argument1, argument2, . . . )
Returns the single minimum value found in a set of arguments.

Equivalent to MIN in Microsoft Excel.

Argumentn (and so on) is any number or parameter name.

MOD Function

MOD(number,divisor)

Returns the remainder of a number after a division.

Number is any numeric value for which you want to find a remainder.

Divisor is any numeric value by which you want to divide the number. If the divisor is zero, the application returns an error.

Month Function

Month(Date)

Returns an integer between 1 and 12 that represents the month in a date value.

Date is any single date expression.

MonthEndOf Function

MonthEndOf(Date)

Returns the last calendar day of the month for a given date scalar or stream.

This function is typically used to produce a date stream consisting of the last days of months, the equivalent of writing the date constant 31 MON YEAR.

Date streams based on the MonthEndOf date display the last calendar day of each month, but each date behaves as the $31^{st}$ when used in formulas.

Date is any single date expression.

Monthly Keyword

Monthly is a frequency keyword used to define the interval between continuing dates in a date stream.

Monthly_MISF_Yield Function

Monthly_MISF_Yield (Flows, SinkingFundRate)

Returns the nominal monthly MISF yield of a given array of cash flows.

This function uses a built-in search (invisible to you) to determine the rate of return to apply to a set of cash flows in order to end up with a net investment balance of 0 on the last yield date.

Use this function in place of the MISFYieldByMonth template when you do not need to assert or constrain the result.

Flows is the parameter name for a set of cash flows keyed to a monthly date index.

If you argue a payment stream that is keyed to a different frequency, the result will be incorrect.

SinkingFundRate is a percentage. The default is 0%.

Next Function

Next(Array,LastValue)

Returns an array in which, relative to the current position, each value refers to the next sequential value in a source array.

Array is the name of the current parameter or the name of a source array from which you want to retrieve the next values.

This function and the Previous function can be used to create self-referential formulas.

LastValue is a value used to calculate the final value of the array.

NoIndex Prefix

NoIndex: remainder of formula

Lets you specify that a parameter is not keyed to an index, even if the parameter appears to be within the scope of an index.

Typically, you use the NoIndex prefix to identify a scalar value that happens to be placed in the scope of a date index.

NOT Function

NOT(Condition)

Reverses the logical truth or falseness of the argument.

Condition is an expression that the application can evaluate to be true or false. If Condition is true, the application returns False. Otherwise, the application returns True.

Null Function

Null

Returns a null (blank) value as opposed to the number zero.

ODD Function

ODD(Number)

Returns a number rounded up to the next odd integer away from zero.

Number is the numeric value you want to round up. If Number is an odd integer, the application does not round it up.

On Keyword

On date

Assigns a given value to the given date, or (with the Except keyword) lets you exclude a value on the given date.

The value can precede the keyword or follow the date.

If the given date does not a match a date in the index, the value is ignored.

Optimize Prefix

Optimize (Count/Date, Variability, Scale, Restriction):

Tells the application to calculate values to meet the objective function of a case. An example of an Objective Function is the total cash of a transaction.

If you have entered a constraint on the parameter, the application calculates an optimized value that meets the requirements defined by the constraint.

After you perform an optimization in the Optimization chapter, the application replaces the entire formula in each parameter that has the Optimize prefix with the calculated value(s).

If you want to retain a portion of a parameter formula, split the formula between two parameters.

In one parameter, use the Optimize prefix and enter the portion of the formula that can be replaced with values.

In the other parameter, do not use the Optimize prefix. Enter the portion of the formula you want to retain, and refer to the parameter that contains the Optimize prefix.

You can combine the Optimize prefix with other prefixes in a formula. For example:

Advance Optimize(arg1, arg2, arg3, arg4):

Count/Date is the number of, or last date of, the elements in the parameter to be set. If you omit a value for this argument, the application returns a value for each position in the parameter index.

For Count/Date, you can also enter the number of periods (such as 30 years), or the end date (such as Dec. 31, 2010), or the number of elements in the parameter you want to set.

Variability is one of the following functions:

Variable. Allows any value to be returned.

IntegerVariable. Allows integer values only to be returned.

BinaryVariable. Allows one or zero only to be returned.

Constant. Does not allow the current value(s) to change. Use this option to freeze a value from a previous optimization.

You can also enter a formula for any of the Variability options. Enter the formula in place of the Variability option, or refer to a parameter that has the formula.

Scale. If Variability is set to Integer or BinaryVariable, enter the scale you want to use.

Restriction can be one of the following functions:

None. There are not any restrictions on the values returned.

Increasing. The values returned must be in ascending order (x1<=x2<=x3 . . . ).

Decreasing. The values returned must be in descending order (x1>=x2>=x3 . . . ).

OnlyOne. Only one of the values returned can be non-zero.

OnlyTwo. Only two of the values returned can be non-zero, and they must be adjacent.

You can also enter a formula for any of the Restriction options. Enter the formula in place of the Restriction option, or refer to a parameter that has the formula.

OR Function

OR(condition1,condition2, . . . )

Returns the logical value True if any of the arguments are true. If all of the arguments are false, returns False.

Condition1, condition2, and so on are the conditions you want to test for being true or false.

Parameter (Definition)

A parameter is data that represents a calculation and can be used in other calculations.

The components of a parameter include its name, its formula, and the value(s) computed as a result of the formula.

The formula for one parameter can refer to other parameters.

You create and view parameters on sheets of Smart Paper.

PeriodEdge Function

PeriodEdge (Date, Periods, First/Last, Containing/Following)

Returns the first or last day in a period. You can specify whether you want the day to be in the period, or before or after the period.

Date is any single date expression.

Periods is the parameter name of the date index that contains the period of interest.

First/Last requires the logical value True or False.

Enter True to get the last date.

Enter False to get the first date.

Containing/Following requires the logical value True or False.

Enter True to get a date within the defined period.

Enter False to get a date within the period that follows the defined period.

PeriodEnd Function

PeriodEnd(Period)

Returns the end date of a period defined by a set of bookend dates.

Period is expressed mm/dd/yy to mm/dd/yy (you cannot use a parameter reference for either date).

PeriodIntersection Function

PeriodIntersection (PeriodStream1, PeriodStream2)

Returns a period stream based on the intersecting dates of two other period streams.

PeriodStream1 is the parameter name of a date stream.

PeriodStream2 is the parameter name of a date stream.

PeriodInterval Function

PeriodInterval (Offset, Calendar)

Maps a numbers stream into a set of user-defined intervals.

If you need to use the period interval for a parameter with an Advance or Arrears prefix, use AccrueInterval.

Offset is an integer that defines the periods in which to return interval values.

A blank or 0 offset assumes an interval of each period containing a value.

A +1 offset assumes the interval of the next period of value, +2 includes the next two periods of value, and so on.

A −1 offset assumes the interval of the previous period of value, −2 includes the previous two intervals, and so on.

Calendar is a calendar method such as Actual_360, European_30_360, and so on.

If Calendar is omitted, the application applies its own calendar selection method.

PeriodLength Function

PeriodLength (Period, Calendar)

Returns the portion in years of a period according to specified calendar.

Period is a pair of dates expressed as mm/dd/yy to mm/dd/yy (do not use a parameter reference).

Calendar is a calendar method such as Actual_360, European_30_360, and so on.

If Calendar is omitted, the application applies its own calendar selection method.

Periods Function

Periods (IncomeStream)

Returns a stream of periods to which values in the given numbers stream are keyed.

IncomeStream is the parameter name of a payment or income stream.

PeriodStart Function

PeriodStart (Period)

Returns the start date of a period defined by a set of bookend dates.

Period is expressed mm/dd/yy to mm/dd/yy (you cannot use a parameter reference for either date).

PeriodStream Function

PeriodStream (StartDate, DateStream, EndDate)

Creates a period stream from a pair of bookend dates and an existing date stream.

StartDate is the first date of the first period in the stream to be created.

DateStream is the parameter name of the date stream that contains the periods to be used in the period stream following the given StartDate.

EndDate is the end date of the last period in the period stream to be created.

POWER Function

POWER(number,power)

Returns a number raised to the power you specify.

Number is any real number you want to raise to a power.

Power is the exponent to which you want to raise the number.

Prefix (Definition)

A prefix is a keyword you use at the beginning of a formula. The prefix applies to all the values in the formula and determines how the values apply to time periods.

Previous Function
Previous (Array, FirstValue)
Returns an array in which, relative to the current position, each value refers to the preceding value in a source array.

Array is the name of the current parameter or the name of a source array from which you want to retrieve the previous values.

The design of this function permits it to be self-referential without returning a circular reference error. See example.

FirstValue defines a value to assume for the first position in the resulting array.

The inverse of this function is the Next function.

Quarterly Keyword
Quarterly is a frequency keyword to define the interval between continuing dates in a date stream.

RegularAscendingArray Function
RegularAscendingArray (Start, Step, Number)
Creates an ascending array of in which each value increases by a specified increment.

Start is the first value of the array.

Step is the amount you want to add to the starting value and each resulting value to create the next value in the array.

Number is an optional number of values you want in the resulting array.

RegularDateStream Function
RegularDateStream (StartDate, Frequency, Number, SecondDate, LastDate, Term)
Creates a date stream or date index.

You can obtain the same results with natural stream language or the date stream composer.

All arguments are optional, but not all combinations of arguments are compatible.

For example, if you provide StartDate, Frequency, and Number, the SecondDate and Term arguments will either repeat or contradict what is already defined.

Use any single date expression to express StartDate, SecondDate, and LastDate.

StartDate is the first date in the stream.

Frequency is Monthly, Quarterly, Annual or Semiannual.

Number is the number of dates to be included in the stream.

SecondDate is the second date in the stream.

LastDate is the last date in the stream. Omit LastDate to create an unterminated stream.

Term is the elapsed time between StartDate and LastDate. It can be given as an elapsed time expression or in the form of the ElapsedTime function.

REPLACE Function
REPLACE(OldString,StartNum,NumChars,NewString)
Replaces a portion of a text string with another string.

OldString is the text string you want to replace. It can be given as a series of text characters or as a reference to a parameter that contains text characters.

Enclose OldString in quote marks.

StartNum is the position of the first character in OldString that you want to replace.

NumChars is the number of characters you want to replace starting with the character in the StartNum position.

NewString is the string you want to insert as a replacement for OldString.

REPT Function
REPT(String,NumberTimes)
Repeats a text string the number of times you specify.

String is a series of text characters or a reference to a parameter that contains text characters. String is the text string you want to repeat.

Enclose String in quote marks.

NumberTimes is the number of times you want to repeat String. If NumberTimes is zero, the application returns an empty text string.

RIGHT Function
RIGHT(String,NumChars)
Returns one or more rightmost characters of a text string.

String is a series of text characters or a reference to a parameter that contains text characters Enclose String in quote marks.

NumChars is the number of characters you want to extract starting with the last character. NumChars must be greater than or equal to zero.

If NumChars is greater than the length of String, the application returns all of String.

If you omit NumChars, the application uses 1.

Role (Definition)
A role is the name for the set of properties that defines Party interaction with an Instrument.

Roles are defined by the flow of connective endpoints of instruments.

For example, when a Rent instrument is drawn between two parties, the connector begins with the Lessee and terminates with the Lessor to reflect the direction of payments.

ROUND Function
ROUND(number,num_digits)
Returns a number rounded to the number of digits you specify.

Number is any number you want the application to round up or down.

Num_digits is the number of digits you want in the resulting number.

If Num_digits is greater than zero, then the application rounds Number to the number of decimal places you specify.

If Num_digits is zero, then the application rounds Number to the nearest integer.

If Num_digits is less than zero, then the application rounds Number to the left of the decimal point.

ROUNDDOWN Function ROUNDDOWN(number,num_digits)
Returns a number rounded down to the number of digits you specify.

Number is any number you want the application to round down.

Num_digits is the number of digits you want in the resulting number.

If Num_digits is greater than zero, then the application rounds Number down to the number of decimal places you specify.

If Num_digits is zero, then the application rounds the Number down to the nearest integer.

If Num_digits is less than zero, then the application rounds Number down to the left of the decimal point.

ROUNDUP Function

ROUNDUP(number,num_digits)

Returns a number rounded up (away from zero) to the number of digits you specify.

Number is any number you want the application to round up.

Num_digits is the number of digits you want in the resulting number.

If Num_digits is greater than zero, then the application rounds Number up to the number of decimal places you specify.

If Num_digits is 0, then the application rounds Number up to the nearest integer.

If Num_digits is less than 0, then the application rounds Number up to the left of the decimal point.

Scalar Parameter (Definition)

A scalar parameter defines a single quantity that does not change over time or other direction. A scalar parameter is not attached to a key position (such as a date) on an index, even if the scalar parameter happens to be located in the scope of an index.

To create a scalar parameter under an index, use the NoIndex prefix.

Search Prefix

The Search prefix tells the application to perform search and repetitive calculations to determine the value of a scalar parameter.

There are three ways to use the Search prefix:
1) Optimization search (also known as a multistep or 3-step search)
2) Targeted search (also known as a 5-step search)
3) Maximization search Optimization Search Search (LowerBound, UpperBound, SearchAccuracy):

In an optimization search, you set up the Search parameter formula, then you perform an optimization with an objective function.

Also known as a multistep search or a three-argument search.

Successive optimizations are performed until the best objective function is found. For example, "Find the best EBO date to meet the Present Value objective where PV objective is itself an optimized value."

LowerBound is the minimum value in the range of values you want to optimize within. For example, if you are looking for a percentage no smaller than 2%, enter 2%.

UpperBound is the maximum value in the range of values you want to optimize within. For example, if you are looking for a percentage no higher than 25%, enter 25%.

SearchAccuracy is the degree of accuracy your search requires.

For example, enter 0.1 to search for values within 10% of the target.

Targeted Search

Search (LowerBound, UpperBound, SearchAccuracy, TargetExpression, TargetValue, TargetAccuracy, InitialGuess):

Searches for a value for which the target expression equals the target value. For example:

"Find me an interest rate that will give me 200$ TV over this term of investment."

Interest rate=search prefix

200$ TV=target value term of investment=target expression

In this example, the search stops whenever a value is found for which the difference is less than the target accuracy.

LowerBound is the minimum value in the range of values you want to optimize within. For example, if you are looking for a percentage no smaller than 2%, enter 2%.

UpperBound is the maximum value in the range of values you want to optimize within. For example, if you are looking for a percentage no higher than 25%, enter 25%.

SearchAccuracy is the degree of accuracy your search requires.

For example, enter 0.1 to search for values within 10% of the target.

TargetExpression is the name of the parameter that will contain the target value.

TargetValue is the name of the parameter that defines objective of the search.

TargetAccuracy is the extent to which the search should continue, i.e. you can enter a value like ? to truncate the search (speed it up).

If not supplied, the search continues until the variable is known to be within the SearchAccuracy value.

InitialGuess is another way to accelerate the search by indicating a starting point—i.e. if you are expecting a value between 10% and 15%, set InitialGuess to 10%.

If InitialGuess is omitted, the search starts at the current value.

Semiannual Keyword

Semiannual (or Semiannually) is a frequency keyword used to define the interval between continuing dates in a date stream.

Semicolon (;) Keyword

The semicolon symbol (;)stops the current sequence of dates or values in a stream. The stream then continues or ends according what follows the semicolon in the formula.

In a date stream, use a semicolon to interrupt the stream of anniversaries at one frequency and continue them at a different frequency.

In a numbers stream, use multiple semicolons to omit values under key positions in an index.

If value; is the first portion of the formula, value is assumed to coincide with the first key position on the index.

SetResult Prefix

SetResult (Result, Party, Outcome):

The SetResult prefix lets you define a three-argument identity of sorts to bookmark a value. You can then retrieve the value, when needed, with the Get Result function.

The values you provide for Result, Party, and Outcome can be arbitrary, provided you follow rules for using quote marks as given below.

For example, the arguments("Amo", "Amas", "Amat") work just as well as ("MyResult", Lessor, "BaseOutcome").

Result is any alphanumeric text encased in quote marks.

Party is any alphanumeric text encased in quote marks, or it can be the name of a role (without quote marks) within the case. For example, you can use Lessor when a Rent instrument is present.

Outcome is any alphanumeric text encased in quote marks.

SIGN Function

SIGN(number)

Returns the sign of a number. If the number is positive, the application returns 1; if the number is 0, the application returns 0; if the number is negative, the application returns −1.

Number is any real number.

Source Parameter (Definition)

A source parameter is one that contains data you want to use in another parameter.

For example, in writing a formula to show accrued rent, you would refer to the parameter that contains actual rent levels as the source of data.

The formula that shows the accrued rent is the destination parameter.

SQRT Function

SQRT(number)

Returns the positive square root of a number.

Number is any numeric value.

If the number is negative, the application returns an error.

StartDates Prefix

Indicates that each date on the index (except the last date) represents the FIRST day of a period.

Each period begins as of the index date and ends on the day before the next index date.

The last date in the index is a bookend. It does not represent the start of a new period.

StartDates is the default when the date stream formula does not specify a period prefix.

The →symbol indicates the StartDates prefix.

StartDatesOf Function

StartDatesOf (First, Second, . . . )

Returns the combined dates used to organize a set of number streams, first converting them to start dates if necessary.

This lets you create an index comprising the date values of various indexed parameters without having to remember anything about the indexes themselves.

If an argued numbers stream is keyed to an StartDates: date index, the function returns the dates as they appear on that index.

If an argued numbers stream is keyed to an EndDates date index, the function first adds one day to each date to return it as a start date.

First (and so on) are the parameter names of numbers streams (tables, cash and income streams).

The similar StartDatesOfPeriods function slows down optimization performance, but it is more flexible in the types of arguments it accepts.

StartDatesOfPeriods Function

StartDatesOfPeriods (First, Second . . . )

Derives period end dates for one or more numbers streams and/or date indexes, then creates a date index of dates that reflect the start dates of the underlying periods. Also incorporates dates or date streams given as arguments.

To calculate dates for the result, the function adds one day each to the collected end dates.

First (and so on) can be any one or more of the following:

parameter name of an EndDates date index.

parameter name of a numbers stream (i.e. income or payment flow, table) that is keyed to a EndDates date index.

single date expression or date stream expression

Starting Keyword

Starting date

Defines the first date in a date stream or assigns the first value in a numbers stream to the given date.

SubArray Function

SubArray (Array, Start,Count)

Returns a portion of an existing array as of a specified key position.

Array is the name of any array parameter: a numbers stream, a date index, and so on.

Start specifies the key position in the source array that contains the first element you want to retrieve.

Count specifies the number of elements you want to retrieve from the source array.

SUBSTITUTE Function

SUBSTITUTE (String, OldString, NewString, InstanceNum)

Substitutes any number of instances of a text string with another text string.

String is the text string in which you want to substitute characters.

OldString is the text string you want to replace.

NewString is the text string you want to insert in place of OldString.

InstanceNum specifies the instance of OldString you want to replace. If you omit InstanceNum, the application changes every occurrence of OldString to NewString.

Subtotal Function

Subtotal (Heading, Index, Parameter)

Returns the total of all values in one or more indexed parameters of the same name under a given heading.

Heading is closest heading above the parameter.

Index is the name of the date index (or other index) to which the parameter is linked.

Parameter is the parameter name.

SUM Function

SUM(argument1,argument 2, . . . )

Returns the sum of all values in all of the arguments.

Argument1, argument2, can be numbers, logical values (such as True), or arrays that you want the application to add.

SumToDate Function

SumToDate (Value, Date)

Returns a single number that is the sum of an array up to, but not including, the specified date.

This function is useful in defining a truncation point for an accrued payment or income stream.

Value is the name of a numbers stream.

If Value is a non-accrued numbers stream, the function returns the sum of values on dates that precede the given date. See Result_1 in example.

If Value is an accrued numbers stream, the function returns the total accrual from the beginning of time up to (not including) the given date. See Result_2 in example.

Date is any single date expression.

Date is optional in the SumToDate function when it is nested inside the Truncate function (SumToDate defaults to the Truncate date).

Table Prefix

Table: values

The Table prefix tells the application to interpret each value in the parameter as a simple lookup value along a date index. When you reference the Table parameter in the formula to calculate values for a destination parameter, the application applies the table value in effect as of the Table parameter period that contains the destination parameter date.

If a date for the destination parameter falls outside the date range of the Table parameter, the application applies the Table value that occurs closest to the destination date.

In Smart Paper, the ▥symbol identifies a parameter with Table values.

TableValue Function

TableValue (Table, Value)

Extracts a value or values from a table.

Table is the name of any parameter with a Table or Interpolate prefix.

Value is any expression of a single value or array of values that is compatible with the index to which Table is keyed (usually dates).

Then Keyword

Stops the current sequence of continuing dates in a date stream. The stream re-continues or ends according what follows in the formula.

Use Then to create a date stream with different frequencies for different portions of the stream.

Thereafter Keyword

Assigns the given value to each remaining period on the current index according to the payment prefix, unless:

the Except keyword is added, or the formula also contains the Advance prefix, so that there is no value applicable to the last date of the index.

TimeSlice Function

TimeSlice (Timeline, StartDate, EndDate)

Returns a date stream using given dates and dates from another date stream.

Timeline is the name of a date stream parameter or a Time Organizer timeline.

The referenced Timeline must contain at least one date that falls between the argued StartDate and EndDate.

StartDate is any valid date expression.

EndDate is any valid date expression later than StartDate.

Today Function

Today

Returns the current date.

TRIM Function

TRIM(String)

Changes multiple blank spaces between words to a single space.

String is a series of text characters or a reference to a parameter that contains text characters. String is the text in which you want the application to delete spaces.

Enclose String in quote marks.

TRUE Function

TRUE

Returns the logical value True.

TRUNC Function

TRUNC(number)

Converts a number to an integer by removing the fractional part of the number. The application rounds the number down to the next integer toward zero.

Number is any numeric value.

Truncate Function

Truncate (Value, TruncationDate, TruncationValue)

Returns a numbers stream stops as of the index date that precedes the given truncation date.

Value is the name of a numbers stream.

TruncationDate is any single date expression.

TruncationValue is an extra amount to add in on the actual TruncationDate.

Union Function

Union(Argument1,Argument2 . . . )

Combines all values found within the given arguments and returns an ascending array with duplicates removed.

Typically used to combine multiple date indexes into a single date index.

Argument1, argument2, and so on are names of parameters or indexes. The arguments can be any scalar or array value, including constants or parameter references.

Until Keyword

Until date

Assigns the last value in a sorted numbers stream to the key position that contains the given date.

Unsorted Array (Definition)

An unsorted array is a type of array parameter that comprises a series of independent values. That is, the values are not keyed to an index (even if the unsorted array appears below an index).

You use the List: prefix to create an unsorted array.

You can give an unsorted array the appearance of an index, but it will not behave as an index.

For example, you cannot key values to unsorted array elements, and the application cannot calculate or measure the "value" of unsorted array elements.

UPPER Function

UPPER(String)

Converts a text string to upper case.

String is a series of text characters or a reference to a parameter that contains text characters.

Enclose String in quote marks.

US_30_360 Function

This is one of four calendar methods you can choose to evaluate intervals between dates for the purposes of calculation Consists of twelve 30-day months (each month is one $12^{th}$ of the year).

February is given two extra days.

The status of the $31^{st}$ depends on how dates relate to periods.

WhenActive Function

WhenActive(Parameter,Default)

If the first argument is active, the function returns the value of the first argument. If first argument is inactive, the function returns the second argument.

Parameter is any parameter name.

Default is a number or parameter name for the value(s) you want the function to return if the status of the first argument is inactive.

YEAR Function

YEAR(Date)

Determines the year for a given date.

Date is any single date expression.

As is readily apparent from the description of the invention above, the instant financial modeling and analysis tool provides a user friendly, effective and efficient tool for modeling financial or other mathematical scenarios of almost any kind. The graphical user interface combined with the powerful engine provide a greatly improved modeling tool as compared to the prior art.

It is noted that the invention is not limited to modeling financial scenarios or deals, but, instead, can be used to model any scenario involving mathematical values over time.

The implementations described above illustrate the characteristics, features and advantages of the present invention. These implementations, of course, are not exhaustive, and other implementations within the scope and spirit of the present invention will be apparent to those skilled in the art. In other words, while the invention has been described in connection with what is presently considered to be the most practical and preferred embodiments, it is to be understood that the invention is not to be limited to the disclosed embodiments, but on the contrary, is intended to cover various modifications and equivalent arrangements which fall within the true spirit and scope of the appended claims.

What is claimed is:

1. A financial scenario model creation and analysis tool that provides computer-aided design for financial transactions, comprising:

a graphical user interface which enables a user of said tool to create a diagram of a financial scenario conceived by the user on a display screen, wherein said graphical user interface enables creation of said financial scenario diagram by enabling said user to:

define parties involved in the financial scenario and add the parties to the diagram on the display in the form of graphical party objects; and define financial instruments involved in the financial scenario and add the financial instruments to the diagram in the form of graphical financial objects that each show a physical connection on the diagram between pairs of said graphical party objects in the diagram, wherein the user interface further enables the user to indicate a flow direction on the diagram between the pairs of said graphical party objects for an obligation related to the financial instrument connecting said pairs;

a software engine operable, in response to creation of the diagram of the financial scenario, to create a mathematical model for said financial scenario using data collected by said engine during the creation of said diagram by said user, wherein creation of said mathematical model includes creating variables and mathematical relationships between variables based on content of the diagram;

wherein said diagram and said mathematical model are linked within said tool, and said user interface enables the user to make changes to said graphical party objects and said graphical financial objects in said diagram, wherein when changes are made by the user to said diagram corresponding changes are made by said software engine to the mathematical model; and further wherein said user interface enables said user to perform an analysis of the financial scenario using the created mathematical model by changing values for the created variables within the mathematical model and viewing a result determined by the mathematical model.

2. The financial scenario model creation and analysis tool of claim 1, wherein said graphical financial objects indicate a relationship, relative to said financial instrument represented thereby, between said pairs of said graphical party objects.

3. The financial scenario model creation and analysis tool of claim 1, wherein said mathematical modeling includes financial instrument information for each of the financial instruments added to said diagram, and said graphical user interface enables said user to view and edit said financial instrument information.

4. The financial scenario model creation and analysis tool of claim 1, wherein said graphical user interface enables said user to enter and define date information relating to said financial scenario for use by said engine, and further wherein said graphical user interface is operable to display said date information in graphical form on said display screen.

5. The financial scenario model creation and analysis tool of claim 4, wherein said tool enables said date information to be entered using a natural date language, said engine being operable to process said date information from said natural date language.

6. The financial scenario model creation and analysis tool of claim 5, wherein said natural data language is used in said tool to specify either a single date or a series of dates relating to said financial scenario, and further wherein expressions used in said natural date language to define a series of dates include a start date, a frequency and an ending date.

7. The financial scenario model creation and analysis tool of claim 6, wherein said tool enables a plurality of possible outcomes to be modeled based on different date information provided by said user.

8. The financial scenario model creation and analysis tool of claim 1, wherein said engine is operable, in response to said addition of said financial instruments to said diagram, to define roles for parties represented by said graphical party objects which are connected by said graphical financial objects, wherein said roles are used by said engine to define said parties interaction with said financial instrument represented by said graphical financial object.

9. The financial scenario model creation and analysis tool of claim 1, wherein said engine is operable to determine an optimal result for said financial scenario relative to at least one aspect of the scenario, and to calculate optimal values for variables relating to said financial instruments represented in said diagram based on said optimal result.

10. The financial scenario model creation and analysis tool of claim 1, wherein said tool is operable to determine an optimal result for said financial scenario represented by said diagram.

11. The financial scenario model creation and analysis tool of claim 10, wherein said graphical user interface is operable to display said optimal result to said user.

12. The financial scenario model creation and analysis tool of claim 1, wherein said engine is operable, in response to creation of each of said graphical party objects, to generate a party-specific template for containing specific information on said party, a graphical user interface enabling said user to edit said information in said party-specific template.

13. The financial scenario model creation and analysis tool of claim 1, wherein said graphical user interface includes a worksheet section which enables said user to input scenario information, wherein said engine is operable to use said scenario information when creating said mathematical model of said financial scenario.

14. The financial scenario model creation and analysis tool of claim 13, wherein said worksheet is a non-cell based calculation interface wherein references used in calculations are based on a hierarchical outline and not on a positional reference.

15. The financial scenario model creation and analysis tool of claim 14, wherein said worksheet includes a formula language for use in creating scenario information, said formula language including a library of predefined functions and keywords.

16. The financial scenario model creation and analysis tool of claim 15, wherein said engine is operable upon entry of said scenario information in said worksheet section to establish links between related scenario information and between scenario information and date information, thereby establishing a dependence therebetween, and further wherein said engine is operable to use said links when creating said mathematical model of said financial scenario.

17. The financial scenario model creation and analysis tool of claim 15, wherein said formula language further includes a library of predefined prefixes for use in creating said scenario information.

18. The financial scenario model creation and analysis tool of claim 13, wherein said tool includes a library of predefined worksheets for use in said worksheet section, said graphical user interface enabling said user to select said predefined worksheets from said library of pre-defined worksheets.

* * * * *